US 12,393,611 B2

(12) United States Patent
Ploegert et al.

(10) Patent No.: US 12,393,611 B2
(45) Date of Patent: *Aug. 19, 2025

(54) BUILDING DATA PLATFORM WITH GRAPH BASED CAPABILITIES

(71) Applicant: Tyco Fire & Security GmbH, Schaffhausen (CH)

(72) Inventors: Justin J. Ploegert, Cudahy, WI (US); Dominick James O'Dierno, Mt Pleasant, WI (US); Brian Scott Otto, Menomonee Falls, WI (US)

(73) Assignee: TYCO FIRE & SECURITY GMBH, Neuhausen am Rheinfall (CH)

(*) Notice: Subject to any disclaimer, the term of this patent is extended or adjusted under 35 U.S.C. 154(b) by 0 days.

This patent is subject to a terminal disclaimer.

(21) Appl. No.: 18/483,430

(22) Filed: Oct. 9, 2023

(65) Prior Publication Data

US 2024/0121131 A1   Apr. 11, 2024

Related U.S. Application Data

(63) Continuation of application No. 17/833,407, filed on Jun. 6, 2022, now Pat. No. 11,968,059, which is a
(Continued)

(51) Int. Cl.
*G05B 15/02* (2006.01)
*G05B 13/02* (2006.01)
(Continued)

(52) U.S. Cl.
CPC ....... *G06F 16/288* (2019.01); *G05B 13/0265* (2013.01); *G05B 13/041* (2013.01);
(Continued)

(58) Field of Classification Search
CPC ... H04L 12/2827; H04L 12/282; H04L 43/04; G06F 16/9024; G06F 16/288;
(Continued)

(56) References Cited

U.S. PATENT DOCUMENTS 5,301,109 A   4/1994   Landauer et al.
5,446,677 A   8/1995   Jensen et al.
(Continued)

FOREIGN PATENT DOCUMENTS

AU   2019226217 A1   11/2020
AU   2019226264 A1   11/2020
(Continued)

OTHER PUBLICATIONS

Adiono et al., "Design of Database and Secure Communication Protocols for Internet-of-Things-Based Smart Home System," 2017 IEEE Region 10 Conference (TENCON), Malaysia, Nov. 5-8, 2017, pp. 1273-1278.
(Continued)

*Primary Examiner* — Tuan A Vu
(74) *Attorney, Agent, or Firm* — Foley & Lardner LLP

(57) ABSTRACT

A building system of a building including one or more memory devices having instructions thereon, that, when executed by one or more processors, cause the one or more processors to identify a capability of an entity in a building graph, the building graph including a plurality of nodes and a plurality of edges, the plurality of nodes representing entities of the building including the entity and the capability, the plurality of edges representing relationships between the entities of the building and the capability. The instructions cause the one or more processors to receive a command to perform an operation associated with the entity, the operation associated with the capability of the entity and provide the command to perform the operation associated with the entity to an operating system.

20 Claims, 29 Drawing Sheets

Related U.S. Application Data continuation of application No. 17/134,664, filed on Dec. 28, 2020, now Pat. No. 11,356,292.

(60) Provisional application No. 62/955,856, filed on Dec. 31, 2019, provisional application No. 63/005,841, filed on Apr. 6, 2020, provisional application No. 63/105,754, filed on Oct. 26, 2020.

(51) Int. Cl.

| | | |
|---|---|---|
| *G05B 13/04* | (2006.01) | |
| *G05B 17/02* | (2006.01) | |
| *G05B 19/042* | (2006.01) | |
| *G06F 9/54* | (2006.01) | |
| *G06F 16/21* | (2019.01) | |
| *G06F 16/23* | (2019.01) | |
| *G06F 16/2452* | (2019.01) | |
| *G06F 16/2457* | (2019.01) | |
| *G06F 16/25* | (2019.01) | |
| *G06F 16/27* | (2019.01) | |
| *G06F 16/28* | (2019.01) | |
| *G06F 16/901* | (2019.01) | |
| *G06F 21/60* | (2013.01) | |
| *G06F 30/13* | (2020.01) | |
| *G06Q 30/04* | (2012.01) | |
| *G06Q 50/00* | (2012.01) | |
| *G06Q 50/06* | (2012.01) | |
| *H04L 12/28* | (2006.01) | |
| *H04L 67/12* | (2022.01) | |
| *H04L 67/561* | (2022.01) | |
| *H04L 43/062* | (2022.01) | |

(52) U.S. Cl.
CPC ........... *G05B 13/047* (2013.01); *G05B 15/02* (2013.01); *G05B 17/02* (2013.01); *G05B 19/0428* (2013.01); *G06F 9/542* (2013.01); *G06F 9/547* (2013.01); *G06F 16/212* (2019.01); *G06F 16/2358* (2019.01); *G06F 16/24526* (2019.01); *G06F 16/24575* (2019.01); *G06F 16/258* (2019.01); *G06F 16/27* (2019.01); *G06F 16/9024* (2019.01); *G06F 21/60* (2013.01); *G06F 30/13* (2020.01); *G06Q 30/04* (2013.01); *G06Q 50/00* (2013.01); *G06Q 50/06* (2013.01); *H04L 12/282* (2013.01); *H04L 12/2827* (2013.01); *H04L 67/12* (2013.01); *H04L 67/561* (2022.05); *G05B 2219/163* (2013.01); *G05B 2219/25011* (2013.01); *G05B 2219/2614* (2013.01); *G05B 2219/2642* (2013.01); *G05B 2219/2652* (2013.01); *H04L 12/2803* (2013.01); *H04L 12/2807* (2013.01); *H04L 43/062* (2013.01)

(58) Field of Classification Search
CPC ........... G05B 15/02; G05B 2219/2652; G05B 2219/25011; G06N 3/006
See application file for complete search history.

(56) References Cited

U.S. PATENT DOCUMENTS

| | | |
|---|---|---|
| 5,581,478 A | 12/1996 | Cruse et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,716,685 B2 | 5/2010 | Schechter et al. |
| 7,818,249 B2 | 10/2010 | Lovejoy et al. |
| 7,822,708 B1 | 10/2010 | Mathew et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,265,979 B2 | 9/2012 | Golani et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,738,414 B1 | 5/2014 | Nagar et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,189,567 B1 | 11/2015 | Goldman et al. |
| 9,196,009 B2 | 11/2015 | Drees et al. |
| 9,219,736 B1 | 12/2015 | Lewis et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,817,383 B1 | 11/2017 | Sinha et al. |
| 9,838,844 B2 | 12/2017 | Emeis et al. |
| 9,870,413 B1 | 1/2018 | Saulpaugh et al. |
| 9,886,478 B2 | 2/2018 | Mukherjee |
| 9,948,359 B2 | 4/2018 | Horton |

(56) References Cited

U.S. PATENT DOCUMENTS

| | | |
|---|---|---|
| 10,055,114 B2 | 8/2018 | Shah et al. |
| 10,055,206 B2 | 8/2018 | Park et al. |
| 10,095,756 B2 | 10/2018 | Park et al. |
| 10,116,461 B2 | 10/2018 | Fairweather et al. |
| 10,169,454 B2 | 1/2019 | Ait-Mokhtar et al. |
| 10,169,486 B2 | 1/2019 | Park et al. |
| 10,171,297 B2 | 1/2019 | Stewart et al. |
| 10,171,586 B2 | 1/2019 | Shaashua et al. |
| 10,187,258 B2 | 1/2019 | Nagesh et al. |
| 10,417,245 B2 | 9/2019 | Park et al. |
| 10,417,451 B2 | 9/2019 | Park et al. |
| 10,505,756 B2 | 12/2019 | Park et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,564,993 B2 | 2/2020 | Deutsch et al. |
| 10,678,866 B1 | 6/2020 | Ranganathan et al. |
| 10,684,033 B2 | 6/2020 | Sinha et al. |
| 10,705,492 B2 | 7/2020 | Harvey |
| 10,708,078 B2 | 7/2020 | Harvey |
| 10,739,029 B2 | 8/2020 | Sinha et al. |
| 10,747,183 B2 | 8/2020 | Sinha et al. |
| 10,760,815 B2 | 9/2020 | Janakiraman et al. |
| 10,762,475 B2 | 9/2020 | Song et al. |
| 10,798,175 B1 | 10/2020 | Knight et al. |
| 10,824,120 B2 | 11/2020 | Ahmed |
| 10,845,771 B2 | 11/2020 | Harvey |
| 10,853,146 B1 | 12/2020 | Talayco |
| 10,854,194 B2 | 12/2020 | Park et al. |
| 10,859,984 B2 | 12/2020 | Park |
| 10,862,928 B1 | 12/2020 | Badawy et al. |
| 10,901,373 B2 | 1/2021 | Locke et al. |
| 10,921,760 B2 | 2/2021 | Harvey |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,041,650 B2 | 6/2021 | Li et al. |
| 11,042,144 B2 | 6/2021 | Park et al. |
| 11,054,796 B2 | 7/2021 | Holaso |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,238,065 B1 | 2/2022 | Tang |
| 11,314,726 B2 | 4/2022 | Park et al. |
| 11,314,788 B2 | 4/2022 | Park et al. |
| 11,556,105 B2 | 1/2023 | Cooley et al. |
| 11,561,522 B2 | 1/2023 | Cooley et al. |
| 11,561,523 B2 | 1/2023 | Cooley et al. |
| 11,573,551 B2 | 2/2023 | Cooley et al. |
| 11,586,167 B2 | 2/2023 | Cooley et al. |
| 11,663,375 B2 | 5/2023 | Brett et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2004/0210348 A1 | 10/2004 | Imhof et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0248573 A1 | 11/2006 | Pannu et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2009/0287736 A1 | 11/2009 | Shike et al. |
| 2010/0045439 A1 | 2/2010 | Tak et al. |
| 2010/0058248 A1 | 3/2010 | Park |
| 2010/0070981 A1 | 3/2010 | Hadar et al. |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0093424 A1 | 4/2011 | Zimmermann et al. |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2011/0270853 A1 | 11/2011 | Curbera et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0221581 A1 | 8/2012 | Narayanan et al. |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |

(56) References Cited

U.S. PATENT DOCUMENTS

| | | |
|---|---|---|
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0332387 A1 | 12/2013 | Mirra et al. |
| 2013/0332862 A1 | 12/2013 | Mirra et al. |
| 2013/0338970 A1 | 12/2013 | Reghetti |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0129660 A1 | 5/2014 | Vaynblat et al. |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0168977 A1 | 6/2015 | Oswald et al. |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | McFarland et al. |
| 2016/0014070 A1 | 1/2016 | Adkins |
| 2016/0019228 A1 | 1/2016 | Hong et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0147243 A1 | 5/2016 | Micali et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0180557 A1 | 6/2016 | Yousaf et al. |
| 2016/0195856 A1 | 7/2016 | Spero |
| 2016/0212165 A1 | 7/2016 | Singla et al. |
| 2016/0234186 A1 | 8/2016 | Leblond et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0255139 A1 | 9/2016 | Rathod |
| 2016/0260063 A1 | 9/2016 | Harris et al. |
| 2016/0292303 A1 | 10/2016 | Hong et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0320758 A1 | 11/2016 | Park |
| 2016/0335865 A1 | 11/2016 | Sayavong et al. |
| 2016/0342906 A1 | 11/2016 | Shaashua et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0214646 A1 | 7/2017 | Longo et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0272458 A1 | 9/2017 | Muddu et al. |
| 2017/0277769 A1 | 9/2017 | Pasupathy et al. |
| 2017/0278003 A1 | 9/2017 | Liu |
| 2017/0286572 A1 | 10/2017 | Hershey et al. |
| 2017/0294132 A1 | 10/2017 | Colmenares |
| 2017/0300593 A1 | 10/2017 | Inoue |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | MacMillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2017/0364618 A1 | 12/2017 | Gardner |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gartner et al. |
| 2018/0048485 A1 | 2/2018 | Pelton et al. |
| 2018/0069932 A1 | 3/2018 | Tiwari et al. |
| 2018/0113897 A1 | 4/2018 | Donlan et al. |
| 2018/0114140 A1 | 4/2018 | Chen et al. |
| 2018/0137288 A1 | 5/2018 | Polyakov |
| 2018/0150753 A1 | 5/2018 | Farrell et al. |
| 2018/0157930 A1 | 6/2018 | Rutschman et al. |
| 2018/0159756 A1 | 6/2018 | Matthews et al. |
| 2018/0159876 A1 | 6/2018 | Park et al. |

(56) References Cited

U.S. PATENT DOCUMENTS

| | | |
|---|---|---|
| 2018/0162400 A1 | 6/2018 | Abdar |
| 2018/0176241 A1 | 6/2018 | Manadhata et al. |
| 2018/0195749 A1 | 7/2018 | Sinha et al. |
| 2018/0198627 A1 | 7/2018 | Mullins |
| 2018/0203961 A1 | 7/2018 | Aisu et al. |
| 2018/0232459 A1 | 8/2018 | Park et al. |
| 2018/0238575 A1 | 8/2018 | Park et al. |
| 2018/0239982 A1 | 8/2018 | Rutschman et al. |
| 2018/0246988 A1 | 8/2018 | Johnson et al. |
| 2018/0260442 A1 | 9/2018 | Vaidhyanathan et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0313561 A1 | 11/2018 | Sinha et al. |
| 2018/0331916 A1 | 11/2018 | DaMaggio et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0017719 A1 | 1/2019 | Sinha et al. |
| 2019/0025771 A1 | 1/2019 | Park et al. |
| 2019/0026359 A1 | 1/2019 | Park et al. |
| 2019/0026710 A1 | 1/2019 | Chow et al. |
| 2019/0037135 A1 | 1/2019 | Hedge |
| 2019/0042988 A1 | 2/2019 | Brown et al. |
| 2019/0050264 A1 | 2/2019 | Chintalapally et al. |
| 2019/0074011 A1* | 3/2019 | Saxena ............... H04L 12/282 |
| 2019/0088106 A1 | 3/2019 | Grundstrom |
| 2019/0094824 A1 | 3/2019 | Xie et al. |
| 2019/0095259 A1 | 3/2019 | Nakamura |
| 2019/0095644 A1 | 3/2019 | Park et al. |
| 2019/0095820 A1 | 3/2019 | Pourmohammad |
| 2019/0095821 A1 | 3/2019 | Pourmohammad |
| 2019/0096014 A1 | 3/2019 | Pourmohammad et al. |
| 2019/0096212 A1 | 3/2019 | Pourmohammad et al. |
| 2019/0096213 A1 | 3/2019 | Pourmohammad et al. |
| 2019/0096214 A1 | 3/2019 | Pourmohammad |
| 2019/0096217 A1 | 3/2019 | Pourmohammad et al. |
| 2019/0102840 A1 | 4/2019 | Perl et al. |
| 2019/0109821 A1 | 4/2019 | Clark et al. |
| 2019/0121801 A1 | 4/2019 | Jethwa et al. |
| 2019/0138333 A1 | 5/2019 | Deutsch et al. |
| 2019/0138512 A1 | 5/2019 | Pourmohammad et al. |
| 2019/0138662 A1 | 5/2019 | Deutsch et al. |
| 2019/0138970 A1 | 5/2019 | Deutsch et al. |
| 2019/0147883 A1 | 5/2019 | Mellenthin et al. |
| 2019/0155238 A1 | 5/2019 | Srivastava et al. |
| 2019/0158309 A1 | 5/2019 | Park et al. |
| 2019/0163152 A1 | 5/2019 | Worrall et al. |
| 2019/0182119 A1 | 6/2019 | Ratkovic et al. |
| 2019/0182273 A1 | 6/2019 | Walsh et al. |
| 2019/0220546 A1 | 7/2019 | Cohen et al. |
| 2019/0243813 A1 | 8/2019 | Pourmohammad et al. |
| 2019/0253427 A1 | 8/2019 | Kling et al. |
| 2019/0260831 A1 | 8/2019 | Milev et al. |
| 2019/0268178 A1 | 8/2019 | Fairweather et al. |
| 2019/0281010 A1 | 9/2019 | Teverovsky et al. |
| 2019/0288866 A1 | 9/2019 | Smith et al. |
| 2019/0289038 A1 | 9/2019 | Li et al. |
| 2019/0294978 A1 | 9/2019 | Sachs |
| 2019/0310979 A1 | 10/2019 | Masuzaki et al. |
| 2019/0325329 A1 | 10/2019 | Rais-Ghasem et al. |
| 2019/0354544 A1 | 11/2019 | Hertz et al. |
| 2019/0354922 A1 | 11/2019 | Berti et al. |
| 2019/0361411 A1 | 11/2019 | Park et al. |
| 2019/0361412 A1* | 11/2019 | Park ....................... G06N 3/006 |
| 2019/0370671 A1 | 12/2019 | Martinez Canedo et al. |
| 2019/0377306 A1 | 12/2019 | Harvey |
| 2020/0004216 A1 | 1/2020 | Park et al. |
| 2020/0050605 A1 | 2/2020 | Tung et al. |
| 2020/0064007 A1 | 2/2020 | Escapa et al. |
| 2020/0090085 A1 | 3/2020 | Martinez Canedo et al. |
| 2020/0097493 A1 | 3/2020 | Gawrys et al. |
| 2020/0128036 A1 | 4/2020 | Sarzynski et al. |
| 2020/0137119 A1 | 4/2020 | Jin et al. |
| 2020/0142365 A1 | 5/2020 | Sharma et al. |
| 2020/0184792 A1 | 6/2020 | Pourmohammad et al. |
| 2020/0210481 A1 | 7/2020 | Niebielski et al. |
| 2020/0226156 A1 | 7/2020 | Borra et al. |
| 2020/0285203 A1 | 9/2020 | Thakur et al. |
| 2020/0336328 A1 | 10/2020 | Harvey |
| 2020/0348632 A1 | 11/2020 | Harvey |
| 2020/0366697 A1 | 11/2020 | Vittal |
| 2020/0387576 A1 | 12/2020 | Brett et al. |
| 2020/0393157 A1 | 12/2020 | Turney et al. |
| 2020/0396208 A1 | 12/2020 | Brett et al. |
| 2020/0409931 A1 | 12/2020 | Zang et al. |
| 2020/0412810 A1* | 12/2020 | Knight ................... H04L 43/04 |
| 2021/0034357 A1 | 2/2021 | Kesavan et al. |
| 2021/0042299 A1 | 2/2021 | Migliori |
| 2021/0043221 A1 | 2/2021 | Yelchuru et al. |
| 2021/0055944 A1 | 2/2021 | Hinton et al. |
| 2021/0133670 A1 | 5/2021 | Cella et al. |
| 2021/0173969 A1 | 6/2021 | Abbey et al. |
| 2021/0191826 A1 | 6/2021 | Duraisingh et al. |
| 2021/0200764 A1 | 7/2021 | Ploegert et al. |
| 2021/0325070 A1 | 10/2021 | Endel et al. |
| 2021/0342961 A1 | 11/2021 | Winter et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2021/0405629 A1 | 12/2021 | Malakuti et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0147000 A1 | 5/2022 | Cooley et al. |
| 2022/0150124 A1 | 5/2022 | Cooley et al. |
| 2022/0165143 A1 | 5/2022 | Pourmohammad |
| 2022/0215264 A1 | 7/2022 | Harvey et al. |
| 2022/0223023 A1 | 7/2022 | Pourmohammad et al. |
| 2022/0284362 A1 | 9/2022 | Bellinger et al. |
| 2022/0335184 A1 | 10/2022 | Wesley et al. |
| 2022/0391373 A1 | 12/2022 | Pourmohammad et al. |
| 2022/0413460 A1 | 12/2022 | Park et al. |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0083703 A1 | 3/2023 | Meiners |
| 2023/0110131 A1 | 4/2023 | Smith et al. |
| 2023/0169220 A1 | 6/2023 | Ramanasankaran et al. |
| 2023/0214555 A1 | 7/2023 | Harvey et al. |
| 2023/0252205 A1 | 8/2023 | Harvey et al. |
| 2023/0334200 A1 | 10/2023 | Meiners |
| 2023/0419807 A1 | 12/2023 | Pourmohammad |
| 2024/0338002 A1 | 10/2024 | Park et al. |

FOREIGN PATENT DOCUMENTS

| | | |
|---|---|---|
| CN | 101415011 A | 4/2009 |
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |

(56) References Cited

FOREIGN PATENT DOCUMENTS

| | | |
|---|---|---|
| CN | 104919484 A | 9/2015 |
| CN | 106204392 A | 12/2016 |
| CN | 106406806 A | 2/2017 |
| CN | 106960269 A | 7/2017 |
| CN | 107077476 A | 8/2017 |
| CN | 107147639 A1 | 9/2017 |
| CN | 107598928 A | 1/2018 |
| CN | 110622139 A | 12/2019 |
| EP | 2 528 033 A1 | 11/2012 |
| EP | 3 268 821 B1 | 1/2018 |
| EP | 3 324 306 A1 | 5/2018 |
| EP | 4 226 263 A1 | 8/2023 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| JP | 6959164 B2 | 11/2021 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |
| WO | WO-2020/061621 A1 | 4/2020 |
| WO | WO 2021/067731 A2 | 4/2021 |
| WO | WO-2022/042925 A1 | 3/2022 |
| WO | WO-2022/103812 A1 | 5/2022 |
| WO | WO-2022/103813 A1 | 5/2022 |
| WO | WO-2022/103820 A1 | 5/2022 |
| WO | WO-2022/103822 A1 | 5/2022 |
| WO | WO-2022/103824 A1 | 5/2022 |
| WO | WO-2022/103829 A1 | 5/2022 |
| WO | WO-2022/103831 A1 | 5/2022 |

OTHER PUBLICATIONS

Balaji et al, "Brick: Metadata schema for portable smart building applications," Applied Energy, 2018 (20 pages).
Balaji et al, "Brick: Metadata schema for portable smart building applications," Applied Energy, Sep. 15, 2018, 3 pages, (Abstract).
Balaji et al, "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema For Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. Ser. No. 201780003995.9 dated Apr. 8, 2021 (21 pages with English language translation).
Chinese Office action on CN Appl. Ser. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
European Office Action EP Appl. No. 20845822.4 dated May 25, 2023 (9 pages).
European Office Action on EP Appl. No. 19707156.6 dated Jul. 5, 2022 (9 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering

(56) References Cited

OTHER PUBLICATIONS and Computer Sciences, University of California at Berkeley, Technical Report No. UCB/EECS-2019-106, Jun. 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT Appl. No. PCT/US2022/034101 dated Oct. 10, 2022 (21 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 15 pages.
International Search Report and Written Opinion on PCT/US2020/058381, dated Jan. 27, 2021, 30 pages.
International Search Report and Written Opinion on PCT/US2020/067130, dated Apr. 30, 2021, 33 pages.
Japanese Office Action on JP Appl. Ser. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Maryasin, O., "Home Automation System Ontology for Digital Building Twin," 2019 XXI International Conference Complex Systems: Control and Modeling Problems (CSCMP), IEEE, Sep. 2019 (pp. 70-74).
Microsoft, "Azure Digital Twins: Next-generation IoT solutions that model the real world," URL: https://azure.microsoft.com/en-us/services/digital-twins/, Retrieved Jan. 8, 2021, 12 pages.

Nissin Electric Co., Ltd., "Smart power supply system (SPSS)," Outline of the scale verification plan, Nissin Electric Technical Report, Japan, Apr. 23, 2014, vol. 59, No. 1 (23 pages with English language abstract).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, First ed. published 2020 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2023 (7 pages).
US Final Office Action on U.S. Appl. No. 17/134,661 dated Oct. 25, 2022 (54 pages).
US Final Office Action on U.S. Appl. No. 17/134,661 dated Sep. 29, 2023 (50 pages).
US Final Office Action on U.S. Appl. No. 17/134,671 dated Jan. 20, 2023 (62 pages).
US Final Office Action on U.S. Appl. No. 17/134,671 dated Mar. 17, 2022 (48 pages).
US Final Office Action on U.S. Appl. No. 17/134,691 dated Feb. 23, 2023 (60 pages).
US Final Office Action on U.S. Appl. No. 17/134,691 dated Oct. 19, 2023 (67 pages).
US Final Office Action on U.S. Appl. No. 17/134,973 dated May 26, 2022 (48 pages).
US Final Office Action on U.S. Appl. No. 17/134,999 dated Apr. 28, 2023 (36 pages).
US Final Office Action on U.S. Appl. No. 17/135,023 dated Aug. 10, 2022 (15 pages).
US Final Office Action on U.S. Appl. No. 17/135,056 dated Nov. 17, 2022 (15 pages).
US Final Office Action on U.S. Appl. No. 17/833,407 dated Jun. 23, 2023 (28 pages).
US Final Office Action on U.S. Appl. No. 18/098,554 dated Aug. 17, 2023 (9 pages).
US Non-Final Office Action on U.S. Appl. No. 17/134,691 dated Jun. 6, 2023 (62 pages).
US Non-Final Office Action on U.S. Appl. No. 17/135,056 dated Jun. 14, 2022 (15 pages).
US Non-Final Office Action on U.S. Appl. No. 17/134,659 dated Mar. 8, 2021 (11 pages).
US Non-Final Office Action on U.S. Appl. No. 17/134,661 dated Dec. 30, 2021 (35 pages).
US Non-Final Office Action on U.S. Appl. No. 17/134,661 dated Jul. 27, 2022 (62 pages).
US Non-Final Office Action on U.S. Appl. No. 17/134,661 dated May 31, 2023 (52 pages).
US Non-Final Office Action on U.S. Appl. No. 17/134,664 dated Mar. 12, 2021 (21 pages).
US Non-Final Office Action on U.S. Appl. No. 17/134,664 dated Nov. 29, 2021 (22 pages).
US Non-Final Office Action on U.S. Appl. No. 17/134,671 dated Apr. 13, 2023 (33 pages).

(56) References Cited

OTHER PUBLICATIONS

US Non-Final Office Action on U.S. Appl. No. 17/134,671 dated Aug. 16, 2022 (51 pages).
US Non-Final Office Action on U.S. Appl. No. 17/134,671 dated Oct. 27, 2021 (47 pages).
US Non-Final Office Action on U.S. Appl. No. 17/134,691 dated Aug. 16, 2022 (56 pages).
US Non-Final Office Action on U.S. Appl. No. 17/134,973 dated Jan. 6, 2022, (47 pages).
US Non-Final Office Action on U.S. Appl. No. 17/134,973 dated Mar. 12, 2021 (28 pages).
US Non-Final Office Action on U.S. Appl. No. 17/134,999 dated Jan. 11, 2023 (35 pages).
US Non-Final Office Action on U.S. Appl. No. 17/134,999 dated Sep. 18, 2023 (29 pages).
US Non-Final Office Action on U.S. Appl. No. 17/135,023 dated Dec. 7, 2022 (16 pages).
US Non-Final Office Action on U.S. Appl. No. 17/135,023 dated Mar. 25, 2022 (27 pages).
US Non-Final Office Action on U.S. Appl. No. 17/833,407 dated May 2, 2023 (27 pages).
US Non-Final Office Action on U.S. Appl. No. 18/098,554 dated Jun. 22, 2023 (13 pages).
US Notice of Allowance for U.S. Appl. No. 17/135,009 dated May 25, 2022 (9 pages).
US Notice of Allowance on U.S. Appl. No. 17/134,659 dated Jun. 16, 2021 (7 pages).
US Notice of Allowance on U.S. Appl. No. 17/134,664 dated Mar. 24, 2022 (12 pages).
US Notice of Allowance on U.S. Appl. No. 17/134,671 dated Aug. 17, 2023 (25 pages).
US Notice of Allowance on U.S. Appl. No. 17/135,009 dated May 3, 2023 (5 pages).
US Notice of Allowance on U.S. Appl. No. 17/135,009 dated Sep. 16, 2022 (5 pages).
US Notice of Allowance on U.S. Appl. No. 17/135,023 dated May 9, 2023 (16 pages).
US Notice of Allowance on U.S. Appl. No. 17/135,056 dated Jun. 27, 2023 (7 pages).
US Notice of Allowance on U.S. Appl. No. 17/135,056 dated Mar. 1, 2023 (8 pages).
US Notice of Allowance on U.S. Appl. No. 17/504,121 dated Feb. 4, 2022 (12 pages).
US Notice of Allowance on U.S. Appl. No. 17/678,260 dated Jun. 5, 2023 (7 pages).
US Notice of Allowance on U.S. Appl. No. 17/678,260 dated Mar. 14, 2023 (7 pages).
US Notice of Allowance on U.S. Appl. No. 17/678,260 dated May 24, 2022 (7 pages).
US Notice of Allowance on U.S. Appl. No. 17/678,260 dated Sep. 2, 2022 (7 pages).
US Notice of Allowance on U.S. Appl. No. 17/828,887 dated Jun. 6, 2023 (7 pages).
US Notice of Allowance on U.S. Appl. No. 17/828,887 dated Mar. 14, 2023 (7 pages).
US Notice of Allowance on U.S. Appl. No. 17/833,407 dated Aug. 16, 2023 (11 pages).
US Notice of Allowance on U.S. Appl. No. 17/853,352 dated Sep. 22, 2023 (13 pages).
US Notice of Allowance on U.S. Appl. No. 18/098,554 dated Nov. 17, 2023 (5 pages).
US Office Action on U.S. Appl. No. 17/134,664 dated Jun. 25, 2021 (24 pages).
US Office Action on U.S. Appl. No. 17/134,973 dated Jul. 26, 2021 (44 pages).
Valtolina et al., "Ontology-Based Consistent Specification of Sensor Data Acquisition Plans in Cross-Domain IoT Platforms," IEEE Access, Dec. 2019, vol. 7 (pp. 176141-176169).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wang et al., "Linking energy-cyber-physical systems with occupancy prediction and interpretation through WiFi probe-based ensemble classification," Applied Energy, 2019, vol. 236 (pp. 55-69).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).
Yao et al., "State of the art review on model predictive control (MPC) in Heating Ventilation and Air-conditioning (HVAC) field," Building and Environment, 2021, vol. 200 (18 pages).
Zhou, Q. et al., "Knowledge-infused and Consistent Complex Event Processing over Real-time and Persistent Streams," Further Generation Computer Systems, 2017, 76 (pp. 391-406).
US Notice of Allowance on U.S. Appl. No. 17/134,691 dated Jan. 16, 2024 (6 pages).
US Notice of Allowance on U.S. Appl. No. 18/375,823 dated May 7, 2024 (8 pages).
Australian Office Action on AU Appl. No. 2019304871 dated Feb. 19, 2024 (4 pages).
Chinese Office Action on CN Appl. No. 202080097068.X dated Feb. 21, 2024 (23 pages with English language translation).
US Notice of Allowance on U.S. Appl. No. 17/134,661 dated Mar. 8, 2024 (8 pages).
US Final Office Action on U.S. Appl. No. 17/134,999 dated Jan. 29, 2024 (31 pages).
US Notice of Allowance on U.S. Appl. No. 17/853,359 dated Feb. 21, 2024 (12 pages).
Chinese Office Action on CN Appl. No. 202080097068.X dated Jul. 17, 2024 (20 pages with English language translation).
US Non-Final Office Action on U.S. Appl. No. 18/543,290 dated Jul. 31, 2024 (13 pages).
US Notice of Allowance on U.S. Appl. No. 18/375,850 dated Jul. 31, 2024 (9 pages).
US Notice of Allowance on U.S. Appl. No. 17/134,999 dated Sep. 5, 2024 (18 pages).
Australian Examination Report No. 1 on AU Appl. No. 2024219353 dated Sep. 20, 2024 (3 pages).
US Notice of Allowance on U.S. Appl. No. 18/543,290 dated Dec. 5, 2024 (10 pages).
Extended European Search Report on EP Appl. No. 24194840.5 dated Feb. 10, 2025 (9 pages).
Office Action on Canadian Appl. No. 3106434 dated Mar. 19, 2025 (5 pages).

\* cited by examiner

BUILDING DATA PLATFORM WITH GRAPH BASED CAPABILITIES

CROSS-REFERENCE TO RELATED PATENT APPLICATIONS

This application is a continuation of U.S. patent application Ser. No. 17/833,407 filed Jun. 6, 2022, which is a continuation of U.S. patent application Ser. No. 17/134,664 filed Dec. 28, 2020, which claims the benefit of and priority to U.S. Provisional Patent Application No. 62/955,856 filed Dec. 31, 2019, U.S. Provisional Patent Application No. 63/005,841 filed Apr. 6, 2020, and U.S. Provisional Patent Application No. 63/105,754 filed Oct. 26, 2020. The entirety of each of these applications are incorporated by reference herein.

BACKGROUND

The present disclosure relates generally to the management of building systems of a building. The present disclosure relates more particularly to the control of building systems through a cloud based system. A building can include various types of building subsystems, e.g., heating, ventilation, and air conditioning (HVAC) systems, security systems, fire response systems, etc. Discrete predefined controlling systems may operate each subsystem individually without knowledge of the building. However, discrete predefined controlling systems may not allow for dynamic, scalable, and adjustable solutions that can provide holistic management of a building.

SUMMARY

Event Enrichment with Contextual Information

One implementation of the present disclosure is a building system including one or more memory devices having instructions thereon, that, when executed by one or more processors, cause the one or more processors to receive an event from an event source, the event indicating a data value associated with the piece of building equipment occurring at a particular time. The instructions cause the one or more processors to identify contextual data of a database that provides a contextual description of the event, generate an enriched event by enriching the event with the contextual data, the enriched event including the data value, the particular time, and the contextual data, and provide the enriched event to a consuming application configured to operate based on the enriched event.

In some embodiments, the instructions cause the one or more processors to retrieve one or more schemas from a schema database, the one or more schemas indicating available schema formats for events, determine whether a schema that the event is formatted in matches the one or more schemas, generate the enriched event in response to determining that the schema that the event is formatted in matches the one or more schemas, and perform at least one of adding the event into a dead letter storage in response to a determination that the schema that the event is formatted in does not match the one or more schemas or adding the schema that the event is formatted in into the schema database in response to determining that the schema that the event is formatted in does not match the one or more schemas and in response to determining that the building system is operating in a discovery mode to discover new schemas.

In some embodiments, the instructions cause the one or more processors cause the enriched event to be added to a topic subscribed to by the consuming application.

In some embodiments, the instructions cause the one or more processors to persist the enriched event in an event database.

In some embodiments, the instructions cause the one or more processors to identify the contextual data based on one or more enrichment rules associated with the consuming application. In some embodiments, the instructions cause the one or more processors to identify second contextual data of the database based on one or more second enrichment rules associated with a second consuming application, generate a second enriched event by enriching the event with the second contextual data, the data value, and the particular time, and provide the second enriched event to the second consuming application.

In some embodiments, the event is received from a piece of building equipment of a building. In some embodiments, the instructions cause the one or more processors to identify the contextual data by searching a graph projection that includes the contextual description of the piece of building equipment.

In some embodiments, the graph projection includes nodes and edges. In some embodiments, the nodes represent entities of the building and the edges represent relationships between the entities of the building. In some embodiments, the nodes include a node representing the piece of building equipment. In some embodiments, the instructions cause the one or more processors to identify the contextual data by identifying one or more nodes of the nodes related to the node representing the piece of building equipment based on one or more edges of the edges between the node representing the piece of building equipment and the one or more nodes.

In some embodiments, the contextual data includes one or more capabilities of the piece of building equipment.

In some embodiments, the contextual description includes at least one of a location where the piece of building equipment is located, another piece of building equipment related to the piece of building equipment, a point of the piece of building equipment, and a person associated with the piece of building equipment.

In some embodiments, the location is at least one of the building that the piece of building equipment is located in or a space that the piece of building equipment is located in.

Another implementation of the present disclosure is a method including receiving, by a processing circuit, an event from a piece of building equipment of a building, the event indicating a data value associated with the piece of building equipment occurring at a particular time. The method further includes identifying, by the processing circuit, contextual data of a database that provides a contextual description of the event, generating, by the processing circuit, an enriched event by enriching the event with the contextual data, the enriched event including the data value, the particular time, and the contextual data, and providing, by the processing circuit, the enriched event to a consuming application configured to operate based on the enriched event.

In some embodiments, the method includes retrieving, by the processing circuit, one or more schemas from a schema database, the one or more schemas indicating available schema formats for events, determining, by the processing circuit, whether a schema that the event is formatted in matches the one or more schemas, and generating, by the processing circuit, the enriched event in response to determining that the schema that the event is formatted in matches the one or more schemas. In some embodiments, the method includes performing, by the processing circuit, at least one of adding the event into a dead letter storage in response to a determination that the schema that the event is formatted in does not match the one or more schemas or adding the schema that the event is formatted in into the schema database in response to determining that the schema that the event is formatted in does not match the one or more schemas and in response to determining that the building system is operating in a discovery mode to discover new schemas.

In some embodiments, the method includes causing, by the processing circuit, the enriched event to be added to a topic subscribed to by the consuming application.

In some embodiments, the method includes persisting, by the processing circuit, the enriched event in an event database.

In some embodiments, the method includes identifying, by the processing circuit, the contextual data is based on one or more enrichment rules associated with the consuming application. In some embodiments, the method further includes identifying, by the processing circuit, second contextual data of the database based on one or more second enrichment rules associated with a second consuming application, generating, by the processing circuit, a second enriched event by enriching the event with the second contextual data, the data value, and the particular time, and providing, by the processing circuit, the second enriched event to the second consuming application.

In some embodiments, the method further includes identifying, by the processing circuit, the contextual data by searching a graph projection that includes the contextual description of the piece of building equipment.

In some embodiments, the graph projection includes nodes and edges. In some embodiments, the nodes represent entities of the building and the edges represent relationships between the entities of the building. In some embodiments, the nodes include a node representing the piece of building equipment. In some embodiments, the method includes identifying, by the processing circuit, the contextual data includes identifying one or more nodes of the nodes related to the node representing the piece of building equipment based on one or more edges of the edges between the node representing the piece of building equipment and the one or more nodes.

In some embodiments, the contextual data includes one or more capabilities of the piece of building equipment.

In some embodiments, the contextual description includes at least one of a location where the piece of building equipment is located, another piece of building equipment related to the piece of building equipment, a point of the piece of building equipment, and a person associated with the piece of building equipment.

Another implementation of the present disclosure is a building system including one or more memory devices having instructions thereon and one or more processors configured to execute the instructions causing the one or more processors to receive an event from a piece of building equipment of a building, the event indicating a data value associated with the piece of building equipment occurring at a particular time, identify contextual data of a database that provides a contextual description of the event, generate an enriched event by enriching the event with the contextual data, the enriched event including the data value, the particular time, and the contextual data, and provide the enriched event to a consuming application configured to operate based on the enriched event.

Building Graph Change Feed

One implementation of the present disclosure is a building system of a building including one or more memory devices having instructions thereon, that, when executed by one or more processors, cause the one or more processors to receive a modification to a graph, the graph including nodes and edges between the nodes, the nodes representing entities of the building and the edges representing relationships between the entities of the building. The instructions cause the one or more processors to generate a change feed event, the change feed event recording the modification to the graph and add the change feed event to a change feed including change feed events representing modifications to the graph at different times.

In some embodiments, the entities of the building are at least one of building equipment, locations of the building, users of the building, and events of the building.

In some embodiments, the instructions cause the one or more processors to construct the graph at points in time including a first time and a second time by selecting a first set of the change feed events occurring up to the first time, generating the graph at the first time based on the first set of the change feed events, selecting a second set of the change feed events occurring up to the second time, and generating the graph at the second time based on the second set of the change feed events.

In some embodiments, the modification is at least one of adding a new node to the nodes of the graph, adding a new edge to the edges of the graph, deleting an existing node of the nodes of the graph, deleting an existing edge of the edges of the graph, modifying the existing node of the nodes of the graph, or modifying the existing edge of the edges of the graph.

In some embodiments, the instructions cause the one or more processors to communicate the change feed event of the change feed to one or more consuming applications.

In some embodiments, the instructions cause the one or more processors to add the change feed event to a change feed topic, wherein the one or more consuming applications are subscribed to the change feed topic and receive the change feed event in response to the change feed event being added to the change feed topic.

In some embodiments, the one or more consuming applications update the graph stored by the one or more consuming applications based on the change feed event.

Another implementation of the present disclosure is a method including receiving, by a processing circuit, a modification to a graph, the graph including nodes and edges between the nodes, the nodes representing entities of a building and the edges representing relationships between the entities of the building. The method includes generating, by the processing circuit, a change feed event, the change feed event recording the modification to the graph and adding, by the processing circuit, the change feed event to a change feed including change feed events representing modifications to the graph at different times.

In some embodiments, the entities of the building are at least one of building equipment, locations of the building, users of the building, and events of the building.

In some embodiments, the method includes constructing, by the processing circuit, the graph at points in time including a first time and a second time by selecting a first set of the change feed events occurring up to the first time, generating the graph at the first time based on the first set of the change feed events, selecting a second set of the change feed events occurring up to the second time, and generating the graph at the second time based on the second set of the change feed events.

In some embodiments, the modification is at least one of adding a new node to the nodes of the graph, adding a new edge to the edges of the graph, deleting an existing node of the nodes of the graph, deleting an existing edge of the edges of the graph, modifying the existing node of the nodes of the graph, or modifying the existing edge of the edges of the graph.

In some embodiments, the method further includes communicating, by the processing circuit, the change feed event of the change feed to one or more consuming applications.

In some embodiments, the method further includes adding, by the processing circuit, the change feed event to a change feed topic, wherein the one or more consuming applications are subscribed to the change feed topic and receive the change feed event in response to the change feed event being added to the change feed topic.

In some embodiments, the one or more consuming applications update the graph stored by the one or more consuming applications based on the change feed event.

Another implementation of the present disclosure is one or more memory devices having instructions thereon and one or more processors configure to execute the instructions causing the one or more processors to receive a modification to a graph, the graph including nodes and edges between the nodes, the nodes representing entities of the building and the edges representing relationships between the entities of the building. The instructions cause the one or more processors to generate a change feed event, the change feed event recording the modification to the graph and add the change feed event to a change feed including change feed events representing modifications to the graph at different times.

In some embodiments, the entities of the building are at least one of building equipment, locations of the building, users of the building, and events of the building.

In some embodiments, the instructions cause the one or more processors to construct the graph at points in time including a first time and a second time by selecting a first set of the change feed events occurring up to the first time, generating the graph at the first time based on the first set of the change feed events, selecting a second set of the change feed events occurring up to the second time, and generating the graph at the second time based on the second set of the change feed events.

In some embodiments, the modification is at least one of adding a new node to the nodes of the graph, adding a new edge to the edges of the graph, deleting an existing node of the nodes of the graph, deleting an existing edge of the edges of the graph, modifying the existing node of the nodes of the graph, or modifying the existing edge of the edges of the graph.

In some embodiments, the instructions cause the one or more processors to communicate the change feed event of the change feed to one or more consuming applications.

In some embodiments, the instructions cause the one or more processors to add the change feed event to a change feed topic, wherein the one or more consuming applications are subscribed to the change feed topic and receive the change feed event in response to the change feed event being added to the change feed topic.

Building Graph Based Capabilities

One implementation of the present disclosure is a building system of a building including one or more memory devices having instructions thereon, that, when executed by one or more processors, cause the one or more processors to identify a capability of an entity in a building graph, the building graph including nodes and edges, the nodes representing entities of the building including the entity and the capability, the edges representing relationships between the entities of the building and the capability, wherein a first node of the nodes represents the entity and a second node of the nodes related to the first node by one or more edges of the edges represents the capability. The instructions cause the one or more processors to receive a command to perform an operation associated with the entity, the operation associated with the capability of the entity and provide the command to perform the operation associated with the entity to an operating system.

In some embodiments, the instructions cause the one or more processors to identify the capability of the entity by identifying the first node of the nodes of the building graph representing the entity and identifying at least one of one or more nodes or the one or more edges between the first node and the second node representing the capability of the entity.

In some embodiments, the entity is a piece of building equipment of the building. In some embodiments, the capability is a control operation that the piece of building equipment is configured to perform.

In some embodiments, the entity is a user of the building. In some embodiments, the capability is an action associated with the user that a system is configured to perform.

In some embodiments, the instructions cause the one or more processors to receive the command to perform the operation associated with the entity from a requesting system. In some embodiments, the instructions cause the one or more processors to identify whether the requesting system has a policy to make the command to perform the operation based on the building graph, wherein the building graph indicates the policy to make the command. In some embodiments, the instructions cause the one or more processors to provide the command to perform the operation associated with the entity to the operating system in response to identifying that the requesting system has the policy to make the command.

In some embodiments, the instructions cause the one or more processors to identify whether a requesting system has a policy to make the command to perform the operation based on the building graph by identifying a third node of the nodes representing the requesting system and identifying one or more particular edges of the edges between the third node and a fourth node of the nodes representing the policy to make the command.

In some embodiments, the instructions cause the one or more processors to determine that the operating system is a piece of building equipment of the building, identify a device hub configured to facilitate messaging between the building system and the piece of building equipment based on the building graph, wherein the nodes includes a node representing the device hub, and send the command to the piece of building equipment through the device hub.

In some embodiments, the entity is a piece of building equipment. In some embodiments, the instructions cause the one or more processors to determine that the operating system is an external system separate from the building system, identify a connection broker configured to facilitate a connection between the building system and the external system, wherein the nodes includes a node representing the connection broker and the external system, and send the command to the piece of building equipment through the connection broker.

Another implementation of the present disclosure is a method including identifying, by a processing circuit, a capability of an entity in a building graph of a building, the building graph including nodes and edges, the nodes representing entities of the building including the entity and the capability, the edges representing relationships between the entities of the building and the capability, wherein a first node of the nodes represents the entity and a second node of the nodes related to the first node by one or more edges of the edges represents the capability. The method includes receiving, by the processing circuit, a command to perform an operation associated with the entity, the operation associated with the capability of the entity and providing, by the processing circuit, the command to perform the operation associated with the entity to an operating system.

In some embodiments, identifying, by the processing circuit, the capability of the entity includes identifying the first node of the nodes of the building graph representing the entity and identifying at least one of one or more nodes or the one or more edges between the first node and the second node representing the capability of the entity.

In some embodiment, the entity is a piece of building equipment of the building. In some embodiments, the capability is a control operation that the piece of building equipment is configured to perform.

In some embodiments, the entity is a user of the building. In some embodiments, the capability is an action associated with the user that a system is configured to perform.

In some embodiments, the method includes receiving, by the processing circuit, the command to perform the operation associated with the entity includes receiving the command from a requesting system. In some embodiments, the method includes identifying, by the processing circuit, whether the requesting system has a policy to make the command to perform the operation based on the building graph, wherein the building graph indicates the policy to make the command. In some embodiments, the method includes providing, by the processing circuit, the command to perform the operation associated with the entity to the operating system in response to identifying that the requesting system has the policy to make the command.

In some embodiments, the method includes identifying, by the processing circuit, whether a requesting system has a policy to make the command to perform the operation based on the building graph by identifying a third node of the nodes representing the requesting system and identifying one or more particular edges of the edges between the third node and a fourth node of the nodes representing the policy to make the command.

In some embodiments, the method includes determining, by the processing circuit, that the operating system is a piece of building equipment of the building, identifying, by the processing circuit, a device hub configured to facilitate messaging between the processing circuit and the piece of building equipment based on the building graph, wherein the nodes includes a node representing the device hub, and sending, by the processing circuit, the command to the piece of building equipment through the device hub.

In some embodiments, the entity is a piece of building equipment. In some embodiments, the method includes determining, by the processing circuit, that the operating system is an external system separate from the building system, identifying, by the processing circuit, a connection broker configured to facilitate a connection between the building system and the external system, wherein the nodes includes a node representing the connection broker and the external system, and sending, by the processing circuit, the command to the piece of building equipment through the connection broker.

One implementation of the present disclosure is one or more memory devices having instructions thereon, that, when executed by one or more processors, cause the one or more processors to identify a capability of an entity in a building graph of a building, the building graph including nodes and edges, the nodes representing entities of the building including the entity and the capability, the edges representing relationships between the entities of the building and the capability, wherein a first node of the nodes represents the entity and a second node of the nodes related to the first node by one or more edges of the edges represents the capability. The instructions cause the one or more processors to receive a command to perform an operation associated with the entity, the operation associated with the capability of the entity and provide the command to perform the operation associated with the entity to an operating system.

In some embodiments, the instructions cause the one or more processors to identify the capability of the entity by identifying the first node of the nodes of the building graph representing the entity and identifying at least one of one or more nodes or the one or more edges between the first node and the second node representing the capability of the entity.

In some embodiments, the entity is a piece of building equipment of the building. In some embodiments, the capability is a control operation that the piece of building equipment is configured to perform.

In some embodiments, the entity is a user of the building. In some embodiments, the capability is an action associated with the user that a system is configured to perform.

Building Graph Based Communication Actions

One implementation of the present disclosure is a building system of a building including one or more memory devices having instructions thereon, that, when executed by one or more processors, cause the one or more processors to receive a command to perform an action for an entity. The instructions cause the one or more processors to identify a service configured to perform the action based on a building graph, the building graph including nodes and edges, wherein the nodes represent entities of the building, the service, and one or more other services, wherein the edges represent relationships between the entities and communication actions of the service with the one or more other services and cause the service to perform the action by causing the service to perform one or more communication actions with the one or more other services indicated by the building graph.

In some embodiments, the communication actions are application programming interface (API) calls to the one or more other services.

In some embodiments, the entities of the building are at least one of building equipment, locations of the building, users of the building, and events of the building.

In some embodiments, a first node of the nodes represents the service and a second node of the nodes represents a second service of the one or more other services. In some embodiments, an edge of the edges relates the first node to the second node and indicates a communication action that the service can make to the second service.

In some embodiments, the service is a connection broker configured to broker a connection between the building system and an external system separate from the building system. In some embodiments, the action is an operation performed by the external system. In some embodiments, the one or more communication actions are API calls that the connection broker makes with the one or more other services to cause the external system to perform the operation.

In some embodiments, the service is a device hub configured to handle messages between the building system and a piece of building equipment. In some embodiments, the action is an operation performed by the piece of building equipment. In some embodiments, the one or more communication actions are API calls that the device hub makes with the one or more other services to cause the piece of building equipment to perform the operation.

In some embodiments, the instructions cause the one or more processors to identify a capability of the entity in the building graph, the capability indicating that the entity can perform the action and cause the service to perform the action based on the one or more communication actions indicated by the building graph responsive to identifying the capability of the entity.

In some embodiments, the instructions cause the one or more processors to receive the command to perform the action from a requesting system. In some embodiments, the instructions cause the one or more processors to identify whether the requesting system has a policy to make the command to perform the action based on the building graph, wherein the building graph indicates the policy to make the command. In some embodiments, the instructions cause the one or more processors to cause the service to perform the action in response to identifying the policy to make the command.

In some embodiments, the instructions cause the one or more processors to identify whether a requesting system that the building system receives the request to perform the command from has a policy to make the command by identifying a first node of the nodes representing the requesting system in the building graph and identifying one or more edges between the first node and a second node of the nodes representing the policy to make the command.

Another implementation of the present disclosure is a method including receiving, by a processing circuit, a command to perform an action for an entity, identifying, by the processing circuit, a service configured to perform the action based on a building graph, the building graph including nodes and edges, wherein the nodes represent entities of the building, the service, and one or more other services, wherein the edges represent relationships between the entities and communication actions of the service with the one or more other services, and causing, by the processing circuit, the service to perform the action by causing the service to perform one or more communication actions with the one or more other services indicated by the building graph.

In some embodiments, the communication actions are application programming interface (API) calls to the one or more other services.

In some embodiments, the entities of the building are at least one of building equipment, locations of the building, users of the building, and events of the building.

In some embodiments, a first node of the nodes represents the service and a second node of the nodes represents a second service of the one or more other services. In some embodiments, an edge of the edges relates the first node to the second node and indicates a communication action that the service can make to the second service.

In some embodiments, the service is a connection broker configured to broker a connection between the building system and an external system separate from the building system. In some embodiments, the action is an operation performed by the external system. In some embodiments, the one or more communication actions are API calls that the connection broker makes with the one or more other services to cause the external system to perform the operation.

In some embodiments, the service is a device hub configured to handle messages between the building system and a piece of building equipment. In some embodiments, the action is an operation performed by the piece of building equipment. In some embodiments, the one or more communication actions are API calls that the device hub makes with the one or more other services to cause the piece of building equipment to perform the operation.

In some embodiments, the method includes identifying, by the processing circuit, a capability of the entity in the building graph, the capability indicating that the entity can perform the action and causing, by the processing circuit, the service to perform the action based on the one or more communication actions indicated by the building graph responsive to identifying the capability of the entity.

In some embodiments, the method includes receiving, by the processing circuit, the command to perform the action from a requesting system. In some embodiments, the method includes identifying, by the processing circuit, whether the requesting system has a policy to make the command to perform the action based on the building graph, wherein the building graph indicates the policy to make the command. In some embodiments, the method includes causing, by the processing circuit, the service to perform the action in response to identifying the policy to make the command.

In some embodiments, the method includes identifying, by the processing circuit, whether a requesting system that the building system receives the request to perform the command from has a policy to make the command includes identifying a first node of the nodes representing the requesting system in the building graph and identifying one or more edges between the first node and a second node of the nodes representing the policy to make the command.

Another implementation of the present disclosure is one or more memory devices having instructions thereon, that, when executed by one or more processors, cause the one or more processors to receive a command to perform an action for an entity. The instructions cause the one or more processors to identify a service configured to perform the action based on a building graph, the building graph including nodes and edges, wherein the nodes represent entities of the building, the service, and one or more other services, wherein the edges represent relationships between the entities and communication actions of the service with the one or more other services and cause the service to perform the action by causing the service to perform one or more communication actions with the one or more other services indicated by the building graph.

In some embodiments, the communication actions are application programming interface (API) calls to the one or more other services.

Building Graph Based Policies

One implementation of the present disclosure is a building system of a building including one or more memory devices having instructions thereon, that, when executed by one or more processors, cause the one or more processors to receive a request to access a portion of a building graph of the building from a system, the building graph including nodes and edges, the nodes representing entities of the building and the edges representing relationships between the entities of the building. The instructions cause the one or more processors to determine whether the system has access to the portion of the building graph based on a policy indicated by the nodes and edges of the building graph and provide the portion of the building graph to the system in response to a determination that the system has access to the portion of the building graph.

In some embodiments, the building graph includes a first node representing the policy. In some embodiments, the building graph includes a second node indicating a read policy to read events related to the first node by a first edge of the edges. In some embodiments, the building graph includes a third node indicating a command policy to send commands related to the first node by a second edge of the edges.

In some embodiments, the instructions cause the one or more processors to determine whether the system has access to the portion of the building graph based on the policy by identifying a first node of the nodes representing the system and identifying an edge of the edges between the first node and a second node representing the policy to access the portion of the building graph.

In some embodiments, the policy to access the portion of the building graph is an access policy to access events associated with a particular entity. In some embodiments, the nodes include a first node representing the policy and a second node representing the particular entity. In some embodiments, an edge of the edges links the first node to the second node.

In some embodiments, the policy to access the events associated with the particular entity is a particular access policy to access other events of other entities, the other entities related to the particular entity. In some embodiments, the nodes include other nodes representing the other entities. In some embodiments, the edges include one or more edges relating the other nodes to the second node representing the particular entity.

In some embodiments, the instructions cause the one or more processors to receive a command to perform an action for an entity from a requesting system and identify whether the system has a command policy to make the command to perform the action based on the building graph by identifying a first node of the nodes representing the requesting system and identifying one or more edges between the first node and a second node of the nodes representing the command policy to make the command.

In some embodiments, the instructions cause the one or more processors to identify a capability of the entity in the building graph and provide the command to perform the action associated with the entity to an operating system in response to identifying the capability.

In some embodiments, the instructions cause the one or more processors to identify the capability of the entity by identifying a node of the nodes of the building graph representing the entity and identifying at least one of one or more nodes or one or more particular edges between the node and a third node representing the capability of the entity.

In some embodiments, the entity is a piece of building equipment of the building. In some embodiments, the capability is an operation that the piece of building equipment is configured to perform.

Another implementation of the present disclosure is a method including receiving, by a processing circuit, a request to access a portion of a building graph of a building from a system, the building graph including nodes and edges, the nodes representing entities of the building and the edges representing relationships between the entities of the building. The method includes determining, by the processing circuit, whether the system has access to the portion of the building graph based on a policy indicated by the nodes and edges of the building graph and providing, by the processing circuit, the portion of the building graph to the system in response to a determination that the system has access to the portion of the building graph.

In some embodiments, the building graph includes a first node representing the policy. In some embodiments, the building graph includes a second node indicating a read policy to read events related to the first node by a first edge of the edges. In some embodiments, the building graph includes a third node indicating a command policy to send commands related to the first node by a second edge of the edges.

In some embodiments, determining, by the processing circuit, whether the system has access to the portion of the building graph based on the policy includes identifying a first node of the nodes representing the system and identifying an edge of the edges between the first node and a second node representing the policy to access the portion of the building graph.

In some embodiments, the policy to access the portion of the building graph is an access policy to access events associated with a particular entity. In some embodiments, the nodes include a first node representing the policy and a second node representing the particular entity. In some embodiments, an edge of the edges links the first node to the second node.

In some embodiments, the policy to access the events associated with the particular entity is a particular access policy to access other events of other entities, the other entities related to the particular entity. In some embodiments, the nodes include other nodes representing the other entities. In some embodiments, the edges include one or more edges relating the other nodes to the second node representing the particular entity.

In some embodiments, the method includes receiving, by the processing circuit, a command to perform an action for an entity from a requesting system and identifying, by the processing circuit, whether the system has a command policy to make the command to perform the action based on the building graph by identifying a first node of the nodes representing the requesting system and identifying one or more edges between the first node and a second node of the nodes representing the command policy to make the command.

In some embodiments, the method includes identifying, by the processing circuit, a capability of the entity in the building graph and providing, by the processing circuit, the command to perform the action associated with the entity to an operating system in response to identifying the capability.

In some embodiments, the method includes identifying, by the processing circuit, the capability of the entity by identifying a node of the nodes of the building graph representing the entity and identifying at least one of one or more nodes or one or more particular edges between the node and a third node representing the capability of the entity.

In some embodiments, the entity is a piece of building equipment of the building. In some embodiments, the capability is an operation that the piece of building equipment is configured to perform.

One implementation of the present disclosure is one or more memory devices having instructions thereon, that, when executed by one or more processors, cause the one or more processors to receive a request to access a portion of a building graph of a building from a system, the building graph including nodes and edges, the nodes representing entities of the building and the edges representing relationships between the entities of the building, determine whether the system has access to the portion of the building graph based on a policy indicated by the nodes and edges of the building graph, and provide the portion of the building graph to the system in response to a determination that the system has access to the portion of the building graph.

In some embodiments, the building graph includes a first node representing the policy. In some embodiments, the building graph includes a second node indicating a read policy to read events related to the first node by a first edge of the edges. In some embodiments, the building graph includes a third node indicating a command policy to send commands related to the first node by a second edge of the edges.

Building Graph Projections

One implementation of the present disclosure is a building system of a building including one or more memory devices having instructions thereon, that, when executed by one or more processors, cause the one or more processors to retrieve projection rules for generating a building graph projection. The instructions cause the one or more processors to retrieve entities representing elements of the building and relationships between the entities representing relationships between the entities, construct the building graph projection including nodes and edges based on the entities, the relationships, and the projection rules, and perform one or more operations based on the building graph projection.

In some embodiments, the instructions cause the one or more processors to construct the building graph projection by generating one node of the nodes for each of the entities, generate an edge of the edges for each relationship of the relationships, and connecting the edge from a first node of the nodes to a second node of the nodes to illustrate a particular relationship of the relationships between a first entity of the entities and a second entity of the entities.

In some embodiments, the projection rules indicate permissions for a subscriber, wherein the permissions identify a set of the entities and a set of the relationships. In some embodiments, the instructions cause the one or more processors to construct the building graph projection based on the set of the entities and the set of the relationships.

In some embodiments, the projection rules indicate an ontology indicating allowed relationships between types of entities. In some embodiments, the instructions cause the one or more processors to construct the building graph projection based on the types of entities and the allowed relationships between the types of entities.

In some embodiments, the instructions cause the one or more processors to retrieve, for a subscriber, the projection rules for generating the building graph projection from graph projection rules stored in a database, wherein the graph projection rules associated with sub scribers.

In some embodiments, the instructions cause the one or more processors to retrieve second projection rules for a second subscriber of the subscribers, construct a second building graph projection including a second plurality of nodes and a second plurality of edges based on the at least some of the entities, at least some of the relationships, and the second projection rules, and store the building graph projection and the second building graph projection in a graph projection database.

In some embodiments, the instructions cause the one or more processors to receive a modification to the building graph projection, generate a change feed event, the change feed event recording the modification to the building graph projection, and add the change feed event to a change feed including change feed events representing modifications to the building graph projection at different times.

In some embodiments, the modification is at least one of adding a new node to the nodes of the building graph projection, adding a new edge to the edges of the building graph projection, deleting an existing node of the nodes of the building graph projection, deleting an existing edge of the edges of the building graph projection, modifying the existing node of the nodes of the building graph projection, or modifying the existing edge of the edges of the building graph projection.

In some embodiments, the instructions cause the one or more processors to, receive an event from a piece of building equipment of the building, the event indicating a data value associated with the piece of building equipment occurring at a particular time, identify contextual data of a database that provides a contextual description of the event, generate an enriched event by enriching the event with the contextual data, the enriched event including the data value, the particular time, and the contextual data, and provide the enriched event to a consuming application configured to operate based on the enriched event.

In some embodiments, the instructions cause the one or more processors to identify the contextual data by searching the building graph projection that includes the contextual description of the piece of building equipment.

In some embodiments, the nodes represent the entities and the edges represent relationships between the entities. In some embodiments, the nodes include a node representing the piece of building equipment. In some embodiments, the instructions cause the one or more processors to identify the contextual data by identifying one or more nodes of the nodes related to the node representing the piece of building equipment based on one or more edges of the edges between the node representing the piece of building equipment and the one or more nodes.

Another implementation of the present disclosure is a method including retrieving, by a processing circuit, projection rules for generating a building graph projection. The method includes retrieving, by the processing circuit, entities representing elements of a building and relationships between the entities representing relationships between the entities, constructing, by the processing circuit, the building graph projection including nodes and edges based on the entities, the relationships, and the projection rules, and performing, by the processing circuit, one or more operations based on the building graph projection.

In some embodiments, the method includes generating, by the processing circuit, one node of the nodes for each of the entities, generating, by the processing circuit, an edge of the edges for each relationship of the relationships, and connecting, by the processing circuit, the edge from a first node of the nodes to a second node of the nodes to illustrate a particular relationship of the relationships between a first entity of the entities and a second entity of the entities.

In some embodiments, the projection rules indicate permissions for a subscriber, wherein the permissions identify a set of the entities and a set of the relationships. In some embodiments, the method further includes constructing, by the processing circuit, the building graph projection based on the set of the entities and the set of the relationships.

In some embodiments, the projection rules indicate an ontology indicating allowed relationships between types of entities. In some embodiments, the method further includes constructing, by the processing circuit, the building graph projection based on the types of entities and the allowed relationships between the types of entities.

In some embodiments, the method further includes retrieving, by the processing circuit, for a subscriber, the projection rules for generating the building graph projection from graph projection rules stored in a database, wherein the graph projection rules associated with sub scribers.

In some embodiments, the method further includes retrieving, by the processing circuit, second projection rules for a second subscriber of the subscribers. In some embodiments, the method further includes constructing, by the processing circuit, a second building graph projection including a second plurality of nodes and a second plurality of edges based on the at least some of plurality of entities, at least some of the relationships, and the second projection rules and storing, by the processing circuit, the building graph projection and the second building graph projection in a graph projection database.

In some embodiments, the method further includes receiving, by the processing circuit, a modification to the building graph projection, generating, by the processing circuit, a change feed event, the change feed event recording the modification to the building graph projection, and adding, by the processing circuit, the change feed event to a change feed including change feed events representing modifications to the building graph projection at different times.

In some embodiments, the modification is at least one of adding a new node to the nodes of the building graph projection, adding a new edge to the edges of the building graph projection, deleting an existing node of the nodes of the building graph projection, deleting an existing edge of the edges of the building graph projection, modifying the existing node of the nodes of the building graph projection, or modifying the existing edge of the edges of the building graph projection.

Another implementation of the present disclosure is one or more memory devices having instructions thereon, that, when executed by one or more processors, cause the one or more processors to retrieve projection rules for generating a building graph projection, retrieve entities representing elements of a building and relationships between the entities representing relationships between the entities, construct the building graph projection including nodes and edges based on the entities, the relationships, and the projection rules, and perform one or more operations based on the building graph projection.

Event Based Building Graph Queries

One implementation of the present disclosure is a building including one or more memory devices having instructions thereon, that, when executed by one or more processors, cause the one or more processors to receive a query for information of a building graph of the building from a system, the query including an indication of an entity and an indication of an event associated with the entity. The instructions cause the one or more processors to query the building graph with the indication of the entity and the indication of the event associated with the entity for the information of the building graph, the building graph including nodes and edges, the nodes representing entities and events including the entity and the event, the edges representing relationships between the entities and the events and generate a query response based on the information and provide the query response to the system.

In some embodiments, the indication of the entity is an indication of an entity type of the entity. In some embodiments, the instructions cause the one or more processors to query the building graph with the indication of the entity and the event by identifying a node of the nodes corresponding to the entity type of the entity, the node representing the entity and identifying one or more edges between the node representing the entity and a second node of the nodes representing the event. In some embodiments, the instructions cause the one or more processors to generate the query response by causing the query response to include the entity in response to identifying the node and identifying the one or more edges between the node and the second node.

In some embodiments, the system includes a user application. In some embodiments, the instructions cause the one or more processors to receive the query from the user application where a user provides a request for the information to the user application and the user application generates and provides the query to the building system.

In some embodiments, the instructions cause the one or more processors to provide the query response to the user application. In some embodiments, the user application generates a display indicating the information of the query response.

In some embodiments, one or more edges of the edges between a first node representing a particular event and a second node representing a particular building entity indicates that the particular event is associated with the particular building entity.

In some embodiments, the particular building entity is a piece of building equipment that generates the particular event.

In some embodiments, the instructions cause the one or more processors to determine whether the system has access to the information of the building graph based on a policy indicated by the nodes and edges of the building graph and provide the information of the building graph to the system in response to a determination that the system has access to the information of the building graph.

In some embodiments, the instructions cause the one or more processors to determine whether the system has access to the information of the building graph based on the policy by identifying a first node of the nodes representing the system and identifying an edge of the edges between the first node and a second node representing the policy to access the information of the building graph.

In some embodiments, the instructions cause the one or more processors to receive a request from the system for a capability of the entity responsive to providing the query response to the system, identify the capability of the entity in the building graph, receive a command to perform an operation associated with the entity, the command performing an action associated with the capability of the entity, and provide the command to perform the operation associated with the entity to an operating system.

In some embodiments, the instructions cause the one or more processors to identify the capability of the entity by identifying a first node of the nodes of the building graph representing the entity and identifying at least one of one or more nodes or one or more edges between the first node and a second node representing the capability of the entity.

Another implementation of the present disclosure is a method including receiving, by a processing circuit, a query for information of a building graph of a building from a system, the query including an indication of an entity and an indication of an event associated with the entity. The method includes querying, by the processing circuit, the building graph with the indication of the entity and the indication of the event associated with the entity for the information of the building graph, the building graph including nodes and edges, the nodes representing entities and events including the entity and the event, the edges representing relationships between the entities and the events and generating, by the processing circuit, a query response based on the information and provide the query response to the system.

In some embodiments, the indication of the entity is an indication of an entity type of the entity. In some embodiments, querying, by the processing circuit, the building graph with the indication of the entity and the event includes identifying a node of the nodes corresponding to the entity type of the entity, the node representing the entity and identifying one or more edges between the node representing the entity and a second node of the nodes representing the event. In some embodiments, generating, by the processing circuit, the query response includes causing the query response to include the entity in response to identifying the node and identifying the one or more edges between the node and the second node.

In some embodiments, the method includes receiving, by the processing circuit, a request from the system for a capability of the entity responsive to providing the query response to the system. In some embodiments, the method includes identifying, by the processing circuit, the capability of the entity in the building graph, receiving, by the processing circuit, a command to perform an operation associated with the entity, the command performing an action associated with the capability of the entity, and providing, by the processing circuit, the command to perform the operation associated with the entity to an operating system.

In some embodiments, the method include receiving, the query from a user application where a user provides a request for the information to the user application and the user application generates and provides the query to a building system.

In some embodiments, the method includes providing, by the processing circuit, the query response to the user application. In some embodiments, the user application generates a display indicating the information of the query response.

In some embodiments, one or more edges of the edges between a first node representing a particular event and a second node representing a particular building entity indicates that the particular event is associated with the particular building entity.

In some embodiments, the particular building entity is a piece of building equipment that generates the particular event.

In some embodiments, the method includes determining, by the processing circuit, whether the system has access to the information of the building graph based on a policy indicated by the nodes and edges of the building graph and providing, by the processing circuit, the information of the building graph to the system in response to a determination that the system has access to the information of the building graph.

In some embodiments, the method includes determining, by the processing circuit, whether the system has access to the information of the building graph based on the policy by identifying a first node of the nodes representing the system and identifying an edge of the edges between the first node and a second node representing the policy to access the information of the building graph.

Another implementation of the present disclosure is one or more memory devices having instructions thereon, that, when executed by one or more processors, cause the one or more processors to receive a query for information of a building graph of a building from a system, the query including an indication of an entity and an indication of an event associated with the entity. The instructions cause the one or more processors to query the building graph with the indication of the entity and the indication of the event associated with the entity for the information of the building graph, the building graph including nodes and edges, the nodes representing entities and events including the entity and the event, the edges representing relationships between the entities and the events and generate a query response based on the information and provide the query response to the system.

Zone Based Tenant Entitlement Model

One implementation of the present disclosure is a building including one or more memory devices having instructions thereon, that, when executed by one or more processors, cause the one or more processors to manage entitlements for subscriptions of one or more buildings with a building entitlement model, wherein a first subscription of the subscriptions is linked to first zone via the building entitlement model and a second subscription of the subscriptions is linked to a second zone via the building entitlement model. The instructions cause the one or more processors to receive a first request to perform a first operation for the first subscription and a second request to perform a second operation for the second subscription, determine, based on the building entitlement model, whether the first subscription has a first entitlement for the first operation and whether the second subscription has a second entitlement for the second operation, and implement the first operation on first computing resources of the first zone based on the building entitlement model in response to a first determination that the first subscription has the first entitlement and implement the second operation on second computing resources of the second zone based on the building entitlement model in response to a second determination that the second subscription has the second entitlement.

In some embodiments, the entitlements indicate whether the subscriptions have authorization to utilize functional resources of the building system.

In some embodiments, the instructions cause the one or more processors to receive first operational data associated with the first subscription, the first operational data indicating actions of the first subscription utilizing first computing resources, determine a resource utilization metric of the first subscription based on the first operational data, determine to throttle the actions of the first subscription in response to determining that the resource utilization metric exceeds a level, and throttle the actions of the first subscription to reduce an amount of the actions of the first subscription in response to determining that the resource utilization metric exceeds the level.

In some embodiments, the instructions cause the one or more processors to receive first operational data associated with the first subscription, the first operational data indicating first actions of the first subscription utilizing first computing resources, receive second operational data associated with the second subscription, the second operational data indicating second actions of the second subscription utilizing the second computing resources, determine first resource utilization metrics of the first subscription based on the first operational data, and determine second resource utilization metrics of the second subscription based on the second operational data.

In some embodiments, the instructions cause the one or more processors to generate a first bill in an amount proportional to first resource utilization of the first subscription based on the first resource utilization metrics and generate a second bill in a second amount proportional to a second resource utilization of the second subscription based on the second resource utilization metrics.

In some embodiments, the first zone represents a first geographic boundary and the first computing resources are located within the first geographic boundary. In some embodiments, the second zone represents a second geographic boundary and the second computing resources are located within the second geographic boundary.

In some embodiments, the first computing resources include computational resources and storage resources. In some embodiments, the second computing resources include second computational resources and second storage resources.

In some embodiments, the building entitlement model includes a tenant, wherein the tenant represents an entity associated with a billing boundary. In some embodiments, the tenant is linked to the subscriptions by the building entitlement model.

In some embodiments, the building entitlement model includes a second tenant, wherein the second tenant represents a second entity associated with a second billing boundary. In some embodiments, the second tenant is linked, by the building entitlement model, to a second plurality of subscriptions of the building entitlement model.

Another implementation of the present disclosure is a method including managing, by a processing circuit, entitlements for subscriptions of one or more buildings with a building entitlement model, wherein a first subscription of the subscriptions is linked to first zone via the building entitlement model and a second subscription of the subscriptions is linked to a second zone via the building entitlement model. The method includes receiving, by the processing circuit, a first request to perform a first operation for the first subscription and a second request to perform a second operation for the second subscription, determining, by the processing circuit, based on the building entitlement model, whether the first subscription has a first entitlement for the first operation and whether the second subscription has a second entitlement for the second operation, and implementing, by the processing circuit, the first operation on first computing resources of the first zone based on the building entitlement model in response to a first determination that the first subscription has the first entitlement and implement the second operation on second computing resources of the second zone based on the building entitlement model in response to a second determination that the second subscription has the second entitlement.

In some embodiments, the entitlements indicate whether the subscriptions have authorization to utilize functional resources of a building system.

In some embodiments, the method further includes receiving, by the processing circuit, first operational data associated with the first subscription, the first operational data indicating actions of the first subscription utilizing first computing resources and determining, by the processing circuit, a resource utilization metric of the first subscription based on the first operational data. In some embodiments, the method further includes determining, by the processing circuit, to throttle the actions of the first subscription in response to determining that the resource utilization metric exceeds a level and throttling, by the processing circuit, the actions of the first subscription to reduce an amount of the actions of the first subscription in response to determining that the resource utilization metric exceeds the level.

In some embodiments, the method includes receiving, by the processing circuit, first operational data associated with the first subscription, the first operational data indicating first actions of the first subscription utilizing first computing resources, receiving, by the processing circuit, second operational data associated with the second subscription, the second operational data indicating second actions of the second subscription utilizing the second computing resources, determining, by the processing circuit, first resource utilization metrics of the first subscription based on the first operational data, and determining, by the processing circuit, second resource utilization metrics of the second subscription based on the second operational data.

In some embodiments, the method further includes generating, by the processing circuit, a first bill in an amount proportional to first resource utilization of the first subscription based on the first resource utilization metrics and generating, by the processing circuit, a second bill in a second amount proportional to a second resource utilization of the second subscription based on the second resource utilization metrics.

In some embodiments, the first zone represents a first geographic boundary and the first computing resources are located within the first geographic boundary. In some embodiments, the second zone represents a second geographic boundary and the second computing resources are located within the second geographic boundary.

In some embodiments, the first computing resources include computational resources and storage resources. In some embodiments, the second computing resources include second computational resources and second storage resources.

In some embodiments, the building entitlement model includes a tenant, wherein the tenant represents an entity associated with a billing boundary. In some embodiments, the tenant is linked to the subscriptions by the building entitlement model.

In some embodiments, the building entitlement model includes a second tenant, wherein the second tenant represents a second entity associated with a second billing boundary. In some embodiments, the second tenant is linked, by the building entitlement model, to a second plurality of subscriptions of the building entitlement model.

Another implementation of the present disclosure is one or more memory devices having instructions thereon, that, when executed by one or more processors, cause the one or more processors to manage entitlements for subscriptions of one or more buildings with a building entitlement model, wherein a first subscription of the subscriptions is linked to first zone via the building entitlement model and a second subscription of the subscriptions is linked to a second zone via the building entitlement model. The instructions cause the one or more processors to receive a first request to perform a first operation for the first subscription and a second request to perform a second operation for the second subscription, determine, based on the building entitlement model, whether the first subscription has a first entitlement for the first operation and whether the second subscription has a second entitlement for the second operation, and implement the first operation on first computing resources of the first zone based on the building entitlement model in response to a first determination that the first subscription has the first entitlement and implement the second operation on second computing resources of the second zone based on the building entitlement model in response to a second determination that the second subscription has the second entitlement.

In some embodiments, the entitlements indicate whether the subscriptions have authorization to utilize functional resources of a building system.

Edge Based Event Enrichment

One implementation of the present disclosure is an edge platform of a building communicatively coupled to a cloud system, the edge platform including one or more memory devices having instructions stored thereon, the one or more memory devices located on-premises within the building and one or more processors located on-premises within the building, the one or more processors executing the instructions causing the one or more processors to receive an event from a piece of building equipment of the building, the event indicating a data value associated with the piece of building equipment occurring at a particular time. The instructions cause the one or more processors to identify contextual data of a data structure that provides a contextual description of the event, generate an enriched event by enriching the event with the contextual data, the enriched event including the data value, the particular time, and the contextual data, and communicate the enriched event to the cloud system configured to operate based on the enriched event.

In some embodiments, the instructions cause the one or more processors to train one or more machine learning models stored locally by the edge platform based on the enriched event and perform one or more operations with the piece of building equipment based on the one or more machine learning models.

In some embodiments, the instructions cause the one or more processors to identify the contextual data based on one or more enrichment rules. In some embodiments, the instructions cause the one or more processors to identify second contextual data of the data structure based on one or more second enrichment rules, generate a second enriched event by enriching the event with the second contextual data, the data value, and the particular time, and provide the second enriched event to the cloud system.

In some embodiments, the data structure is a graph. In some embodiments, the instructions cause the one or more processors to identify the contextual data by searching the graph that includes the contextual description of the event.

In some embodiments, the graph includes nodes and edges. In some embodiments, the nodes represent entities of the building and the edges represent relationships between the entities of the building. In some embodiments, the nodes include a node representing the piece of building equipment. In some embodiments, the instructions cause the one or more processors to identify the contextual data by identifying one or more nodes of the nodes related to the node representing the piece of building equipment based on one or more edges of the edges between the node representing the piece of building equipment and the one or more nodes.

In some embodiments, the data structure is a digital twin stored by the edge platform. In some embodiments, the digital twin of the edge platform is updated based on changes made to a second digital twin stored by the cloud system to synchronize the second digital twin stored by the cloud system with the digital twin of the edge platform.

In some embodiments, the instructions cause the one or more processors to receive a change feed of change feed events indicating the changes to the second digital twin and update the digital twin stored by the edge platform with the change feed by making the changes to the digital twin stored by the edge platform.

In some embodiments, the second digital twin is a graph including nodes represent entities of the building and plurality of edges represent relationships between the entities of the building. In some embodiments, the changes include at least one of adding a new node to the nodes of the graph, adding a new edge to the edges of the graph, deleting an existing node of the nodes of the graph, deleting an existing edge of the edges of the graph, modifying the existing node of the nodes of the graph, or modifying the existing edge of the edges of the graph.

In some embodiments, the instructions cause the one or more processors to read the change feed events from a change feed topic, wherein the edge platform is subscribed to the change feed topic and receives the change feed events in response to the change feed events being added to the change feed topic by the cloud system.

Another implementation of the present disclosure is a method including receiving, by an edge platform, an event from a piece of building equipment of a building, the event indicating a data value associated with the piece of building equipment occurring at a particular time, the edge platform located on-premises within the building and communicatively coupled to a cloud system, identifying, by the edge platform contextual data of a data structure that provides a contextual description of the event, generating, by the edge platform an enriched event by enriching the event with the contextual data, the enriched event including the data value, the particular time, and the contextual data, and communicating, by the edge platform, the enriched event to the cloud system configured to operate based on the enriched event.

In some embodiments, the method includes training, by the edge platform one or more machine learning models stored locally by the edge platform based on the enriched event and performing, by the edge platform one or more operations with the piece of building equipment based on the one or more machine learning models.

In some embodiments, the method includes identifying, by the edge platform, the contextual data based on one or more enrichment rules, identifying, by the edge platform, second contextual data of the data structure based on one or more second enrichment rules, generating, by the edge platform, a second enriched event by enriching the event with the second contextual data, the data value, and the particular time, and providing, by the edge platform, the second enriched event to the cloud system.

In some embodiments, the data structure is a graph. In some embodiments, the method further includes identifying, by the edge platform, the contextual data by searching the graph that includes the contextual description of the event.

In some embodiments, the graph includes nodes and edges. In some embodiments, the nodes represent entities of the building and the edges represent relationships between the entities of the building. In some embodiments, the nodes include a node representing the piece of building equipment. In some embodiments, the method further includes identifying, by the edge platform, the contextual data by identifying one or more nodes of the nodes related to the node representing the piece of building equipment based on one or more edges of the edges between the node representing the piece of building equipment and the one or more nodes.

In some embodiments, the data structure is a digital twin stored by the edge platform. In some embodiments, the method further includes updating the digital twin of the edge platform based on changes made to a second digital twin stored by the cloud system to synchronize the second digital twin stored by the cloud system with the digital twin of the edge platform.

In some embodiments, the method includes receiving, by the edge platform, a change feed of change feed events indicating the changes to the second digital twin and updating, by the edge platform, the digital twin stored by the edge platform with the change feed by making the changes to the digital twin stored by the edge platform.

In some embodiments, the second digital twin is a graph including nodes represent entities of the building and plurality of edges represent relationships between the entities of the building. In some embodiments, the changes include at least one of adding a new node to the nodes of the graph, adding a new edge to the edges of the graph, deleting an existing node of the nodes of the graph, deleting an existing edge of the edges of the graph, modifying the existing node of the nodes of the graph, or modifying the existing edge of the edges of the graph.

In some embodiments, the method includes reading, by edge platform, the change feed events from a change feed topic, wherein the edge platform is subscribed to the change feed topic and receives the change feed events in response to the change feed events being added to the change feed topic by the cloud system.

Another implementation of the present disclosure is an edge platform of a building communicatively coupled to a cloud system, the edge platform including one or more memory devices having instructions stored thereon and one or more processors, the one or more processors executing the instructions causing the one or more processors to receive an event from a piece of building equipment of the building, the event indicating a data value associated with the piece of building equipment occurring at a particular time. The instructions cause the one or more processors to identify contextual data of a data structure that provides a contextual description of the event, generate an enriched event by enriching the event with the contextual data, the enriched event including the data value, the particular time, and the contextual data, and communicate the enriched event to the cloud system configured to operate based on the enriched event.

In some embodiments, the data structure is a graph. In some embodiments, the instructions cause the one or more processors to identify the contextual data by searching the graph that includes the contextual description of the event.

Digital Twin Synchronization with External Systems

One implementation of the present disclosure is a building system of a building including one or more memory devices having instructions thereon, that, when executed by one or more processors, cause the one or more processors to store a digital twin of the building including a graph data structure, the graph data structure including nodes representing entities of the building and edges between the nodes representing relationships between the entities of the building. The instructions cause the one or more processors to receive an modification to the digital twin of the building, the update modifying at least one of the nodes or the edges, generate a change feed event of a change feed, the change feed event recording the modification to the graph data structure, the change feed including change feed events representing modifications to the graph data structure at different times, and synchronize, based on the change feed event, an external digital twin of the building of an external system with the digital twin of the building by communicating with the external system.

In some embodiments, the entities of the building are at least one of building equipment, locations of the building, users of the building, and events of the building.

In some embodiments, the instructions cause the one or more processors to receive the modification to the digital twin of the building by receiving an event from a piece of building equipment of the building and determining, based on the event, the modification to the digital twin of the building.

In some embodiments, the instructions cause the one or more processors to synchronize, based on the change feed event, the external digital twin of the building of the external system with the digital twin of the building by communicating the change feed event to the external system, wherein the external system updates the external digital twin of the building based on the change feed event.

In some embodiments, the instructions cause the one or more processors to receive the modification to the digital twin of the building from a second external system, wherein the modification to the digital twin of the building is based on a second modification made by the second external system to a second external digital twin of the building stored by the second external system.

In some embodiments, the modification is at least one of adding a new node to the nodes of the graph data structure, adding a new edge to the edges of the graph data structure, deleting an existing node of the nodes of the graph data structure, deleting an existing edge of the edges of the graph data structure, modifying the existing node of the nodes of the graph data structure, or modifying the existing edge of the edges of the graph data structure.

In some implementations, the instructions cause the one or more processors to add the change feed event to a change feed topic, wherein the external system is subscribed to the change feed topic and receives the change feed event in response to the change feed event being added to the change feed topic.

In some implementations, the instructions cause the one or more processors to synchronize, based on the change feed event, the external digital twin of the building of the external system with the digital twin of the building by communicating with the external system, wherein the external digital twin of the building is in a first format different than a format of the digital twin of the building.

In some implementations, the instructions cause the one or more processors to synchronize, based on the change feed event, a second external digital twin of a second external system, the second external digital twin in a second format different than the first format of the external digital twin and the format of the digital twin of the building.

In some implementations, the instructions cause the one or more processors to generate a first update for the external digital twin of the building in the first format for the external digital twin of the building of the external system based on the change feed event, generate a second update for the second external digital twin of the building in the second format for the second external digital twin of the building of the second external system based on the change feed event, communicate the first update for the external digital twin of the building to the external system, wherein the external system updates the external digital twin of the building based on the first update, and communicate the second update for the second external digital twin of the building to the second external system, wherein the second external system updates the external digital twin of the building based on the second update.

Another implementation of the present disclosure is a method including storing, by a processing circuit, a digital twin of the building including a graph data structure, the graph data structure including nodes representing entities of the building and edges between the nodes representing relationships between the entities of the building. The method includes receiving, by the processing circuit, an modification to the digital twin of the building, the update modifying at least one of the nodes or the edges, generating, by the processing circuit, a change feed event of a change feed, the change feed event recording the modification to the graph data structure, the change feed including change feed events representing modifications to the graph data structure at different times, and synchronizing, by the processing circuit, based on the change feed event, an external digital twin of the building of an external system with the digital twin of the building by communicating with the external system.

In some embodiments, the entities of the building are at least one of building equipment, locations of the building, users of the building, and events of the building.

In some embodiments, receiving, by the processing circuit, the modification to the digital twin of the building includes receiving an event from a piece of building equipment of the building and determining, based on the event, the modification to the digital twin of the building.

In some embodiments, synchronizing, by the processing circuit, based on the change feed event, the external digital twin of the building of the external system with the digital twin of the building includes communicating the change feed event to the external system, wherein the external system updates the external digital twin of the building based on the change feed event.

In some embodiments, the method includes receiving, by the processing circuit, the modification to the digital twin of the building from a second external system, wherein the modification to the digital twin of the building is based on a second modification made by the second external system to a second external digital twin of the building stored by the second external system.

In some embodiments, the modification is at least one of adding a new node to the nodes of the graph data structure, adding a new edge to the edges of the graph data structure, deleting an existing node of the nodes of the graph data structure, deleting an existing edge of the edges of the graph data structure, modifying the existing node of the nodes of the graph data structure, or modifying the existing edge of the edges of the graph data structure.

In some embodiments, the method further includes adding, by the processing circuit, the change feed event to a change feed topic, wherein the external system is subscribed to the change feed topic and receives the change feed event in response to the change feed event being added to the change feed topic.

In some embodiments, synchronizing, by the processing circuit, based on the change feed event, the external digital twin of the building of the external system with the digital twin of the building includes communicating with the external system, wherein the external digital twin of the building is in a first format different than a format of the digital twin of the building.

In some embodiments, the method includes synchronizing, by the processing circuit, based on the change feed event, a second external digital twin of a second external system, the second external digital twin in a second format different than the first format of the external digital twin and the format of the digital twin of the building.

Another implementation of the present disclosure is one or more memory devices having instructions thereon, that, when executed by one or more processors, cause the one or more processors to store a digital twin of a building including a graph data structure, the graph data structure including nodes representing entities of the building and edges between the nodes representing relationships between the entities of the building. The instructions cause the one or more processors to receive an modification to the digital twin of the building, the update modifying at least one of the nodes or the edges, generate a change feed event of a change feed, the change feed event recording the modification to the graph data structure, the change feed including change feed events representing modifications to the graph data structure at different times, and synchronize, based on the change feed event, an external digital twin of the building of an external system with the digital twin of the building by communicating with the external system.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
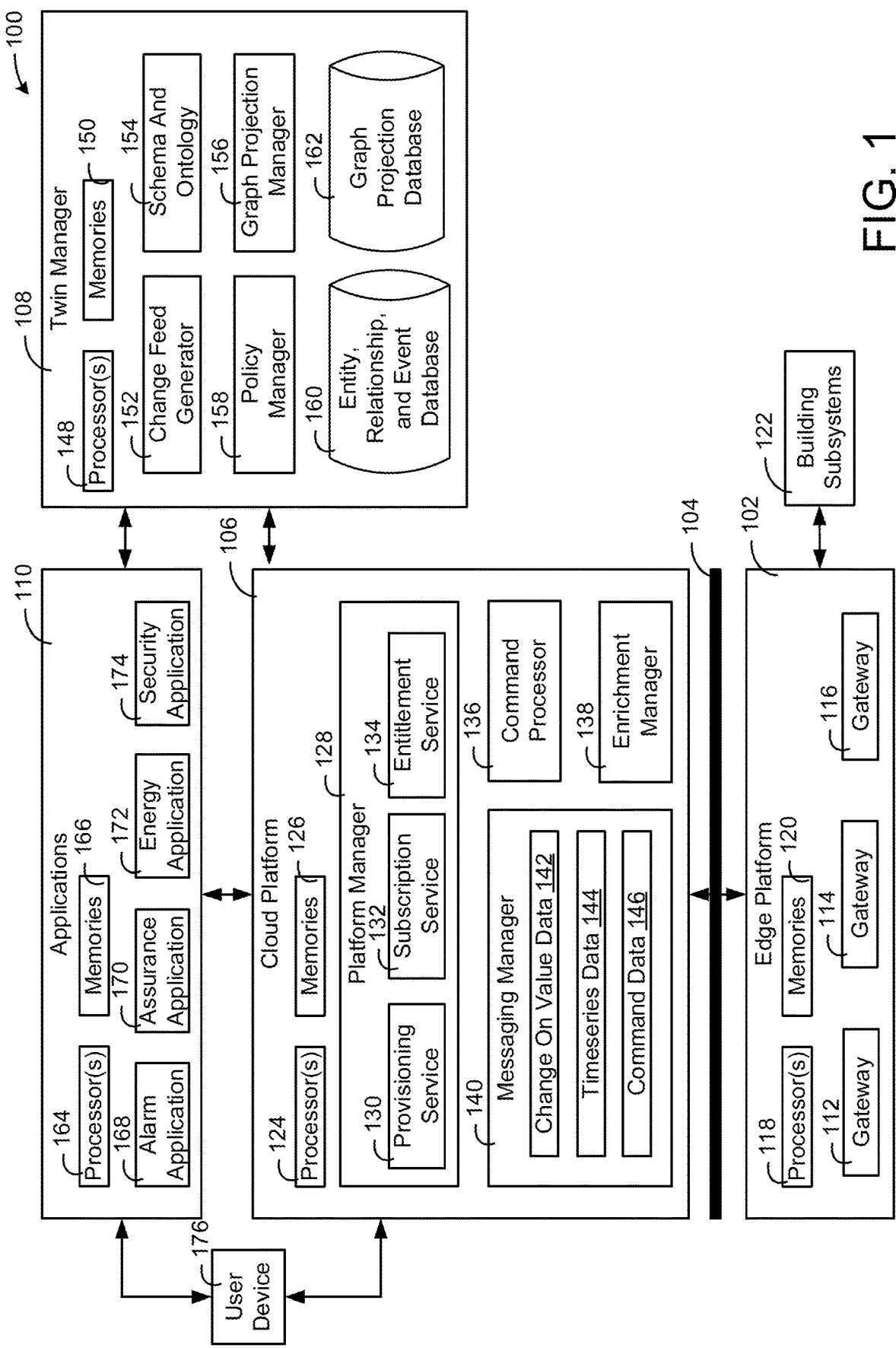
FIG. 1 is a block diagram of a building data platform including an edge platform, a cloud platform, and a twin manager, according to an exemplary embodiment.

Referring generally to the FIGURES, a building data platform is shown, according to various exemplary embodiments. The building data platform described herein can be configured to facilitate the management and control of a building. The building data platform can provide agility, flexibility, and scalability for building management, enabling buildings to be dynamic spaces.

The building data platform can allow users to be able to manage operations systemically with buildings that have memory, intelligence, and unique identities. The building data platform can be configured to perform energy and space optimization, predictive maintenance, and/or remote operations. Although the building data platform is described for a building, e.g., for building subsystems of a building (e.g., for HVAC systems, security systems, access control systems, elevator systems, fire response systems, etc.), the building data platform can be applied to other industries, e.g., motor vehicles, airports, manufacturing systems, transit systems, airplanes, and/or any other type of system where the management of devices is desired. The building data platform can provide seamless integration of devices regardless of brand, make, model, or subsystem.

The building data platform can include multiple components, e.g., an edge platform, a cloud platform, and a twin manager. The edge platform can be configured to facilitate connection for the building data platform directly to the building systems. The edge platform can facilitate receiving, collecting, and/or retrieving data from the building subsystems. In some embodiments, the edge platform can facilitate the command and control of the building systems for the building data platform.

The cloud platform can be configured to facilitate message control for the building data platform. The cloud platform can be configured to receive messages of the building subsystems through the edge platform and manage the messages. The cloud platform can route messages around the building data platform. Furthermore, the cloud platform can facilitate directing operational commands for the building subsystems to the building subsystems through the edge platform. In some embodiments, the cloud platform is configured to enrich messages received from the building subsystems. The cloud platform can be configured to add contextual information to event messages received from the building subsystems via the edge platform. The contextual information can be utilized by applications that consume the event messages and can allow for the applications to immediately have access to the contextual information instead of requiring the applications to query another system to receive contextual information.

The twin manager can facilitate the management of a digital twin of the building, e.g., the building subsystems. Digital twins can be digital replicas of physical entities that enable an in-depth analysis of data of the physical entities and provide the potential to monitor systems to mitigate risks, manage issues, and utilize simulations to test future solutions. Digital twins can play an important role in helping technicians find the root cause of issues and solve problems faster, in supporting safety and security protocols, and in supporting building managers in more efficient use of energy and other facilities resources. Digital twins can be used to enable and unify security systems, employee experience, facilities management, sustainability, etc.

The twin manager can be configured to track the building subsystems by storing entities (e.g., data representing equipment, buildings, spaces, floors, software services, policies, etc.), relationships (e.g., relationships between equipment and their locations, API calls between software services, etc.), and events (e.g., data that has occurred, measurements, commands, statuses, etc.). The twin manager can create graph projections, e.g., a graph with nodes for the entities and events of the building and edges for the relationships between the entities and/or events. The graph projections can be built on particular policies (e.g., what entities, events, and/or relationships should be included within the graph) and/or ontologies (the types of relationships that should be made with different types of entities and/or events). In this regard, particular graph projections can be generated for particular subscribers, users, systems, etc.

Referring now to FIG. 1, a building data platform 100 including an edge platform 102, a cloud platform 106, and a twin manager 108 are shown, according to an exemplary embodiment. The edge platform 102, the cloud platform 106, and the twin manager 108 can each be separate services deployed on the same or different computing systems. In some embodiments, the cloud platform 106 and the twin manager 108 are implemented in off premises computing systems, e.g., outside a building. The edge platform 102 can be implemented on-premises, e.g., within the building.

The building data platform 100 includes applications 110. The applications 110 can be various applications that operate to manage the building subsystems 122. The applications 110 can be remote or on-premises applications that run on various computing systems. The applications 110 can include an alarm application 168 configured to manage alarms for the building subsystems 122. The applications 110 include an assurance application 170 that implements assurance services for the building subsystems 122. In some embodiments, the applications 110 include an energy application 172 configured to manage the energy usage of the building subsystems 122. The applications 110 include a security application 174 configured to manage security systems of the building.

In some embodiments, the applications 110 and/or the cloud platform 106 interacts with a user device 176. In some embodiments, a component or an entire application of the applications 110 runs on the user device 176. The user device 176 may be a laptop computer, a desktop computer, a smartphone, a tablet, and/or any other device with an input interface (e.g., touch screen, mouse, keyboard, etc.) and an output interface (e.g., a speaker, a display, etc.).

The applications 110, the twin manager 108, the cloud platform 106, and the edge platform 102 can be implemented on one or more computing systems, e.g., on processors and/or memory devices. For example, the edge platform 102 includes processor(s) 118 and memories 120, the cloud platform 106 includes processor(s) 124 and memories 126, the applications 110 include processor(s) 164 and memories 166, and the twin manager 108 includes processor(s) 148 and memories 150.

The processors can be a general purpose or specific purpose processor, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.).

The memories can include one or more devices (e.g., memory units, memory devices, storage devices, etc.) for storing data and/or computer code for completing and/or facilitating the various processes described in the present disclosure. The memories can include random access memory (RAM), read-only memory (ROM), hard drive storage, temporary storage, non-volatile memory, flash memory, optical memory, or any other suitable memory for storing software objects and/or computer instructions. The memories can include database components, object code components, script components, or any other type of information structure for supporting the various activities and information structures described in the present disclosure. The memories can be communicably connected to the processors and can include computer code for executing (e.g., by the processors) one or more processes described herein.

The edge platform 102 can be configured to provide connection to the building subsystems 122. The edge platform 102 can receive messages from the building subsystems 122 and/or deliver messages to the building subsystems 122. The edge platform 102 includes one or multiple gateways, e.g., the gateways 112-116. The gateways 112-116 can act as a gateway between the cloud platform 106 and the building subsystems 122. The gateways 112-116 can be the gateways described in U.S. Provisional Patent Application No. 62/951,897 filed Dec. 20, 2019, the entirety of which is incorporated by reference herein. In some embodiments, the applications 110 can be deployed on the edge platform 102. In this regard, lower latency in management of the building subsystems 122 can be realized.

The edge platform 102 can be connected to the cloud platform 106 via a network 104. The network 104 can communicatively couple the devices and systems of building data platform 100. In some embodiments, the network 104 is at least one of and/or a combination of a Wi-Fi network, a wired Ethernet network, a ZigBee network, a Bluetooth network, and/or any other wireless network. The network 104 may be a local area network or a wide area network (e.g., the Internet, a building WAN, etc.) and may use a variety of communications protocols (e.g., BACnet, IP, LON, etc.). The network 104 may include routers, modems, servers, cell towers, satellites, and/or network switches. The network 104 may be a combination of wired and wireless networks.

The cloud platform 106 can be configured to facilitate communication and routing of messages between the applications 110, the twin manager 108, the edge platform 102, and/or any other system. The cloud platform 106 can include a platform manager 128, a messaging manager 140, a command processor 136, and an enrichment manager 138. In some embodiments, the cloud platform 106 can facilitate messaging between the building data platform 100 via the network 104.

The messaging manager 140 can be configured to operate as a transport service that controls communication with the building subsystems 122 and/or any other system, e.g., managing commands to devices (C2D), commands to connectors (C2C) for external systems, commands from the device to the cloud (D2C), and/or notifications. The messaging manager 140 can receive different types of data from the applications 110, the twin manager 108, and/or the edge platform 102. The messaging manager 140 can receive change on value data 142, e.g., data that indicates that a value of a point has changed. The messaging manager 140 can receive timeseries data 144, e.g., a time correlated series of data entries each associated with a particular time stamp. Furthermore, the messaging manager 140 can receive command data 146. All of the messages handled by the cloud platform 106 can be handled as an event, e.g., the data 142-146 can each be packaged as an event with a data value occurring at a particular time (e.g., a temperature measurement made at a particular time).

The cloud platform 106 includes a command processor 136. The command processor 136 can be configured to receive commands to perform an action from the applications 110, the building subsystems 122, the user device 176, etc. The command processor 136 can manage the commands, determine whether the commanding system is authorized to perform the particular commands, and communicate the commands to the commanded system, e.g., the building subsystems 122 and/or the applications 110. The commands could be a command to change an operational setting that control environmental conditions of a building, a command to run analytics, etc.

The cloud platform 106 includes an enrichment manager 138. The enrichment manager 138 can be configured to enrich the events received by the messaging manager 140. The enrichment manager 138 can be configured to add contextual information to the events. The enrichment manager 138 can communicate with the twin manager 108 to retrieve the contextual information. In some embodiments, the contextual information is an indication of information related to the event. For example, if the event is a timeseries temperature measurement of a thermostat, contextual information such as the location of the thermostat (e.g., what room), the equipment controlled by the thermostat (e.g., what VAV), etc. can be added to the event. In this regard, when a consuming application, e.g., one of the applications 110 receives the event, the consuming application can operate based on the data of the event, the temperature measurement, and also the contextual information of the event.

The enrichment manager 138 can solve a problem that when a device produces a significant amount of information, the information may contain simple data without context. An example might include the data generated when a user scans a badge at a badge scanner of the building subsystems 122. This physical event can generate an output event including such information as "DeviceBadgeScannerID," "BadgeID," and/or "Date/Time." However, if a system sends this data to a consuming application, e.g., Consumer A and a Consumer B, each customer may need to call the building data platform knowledge service to query information with queries such as, "What space, build, floor is that badge scanner in?" or "What user is associated with that badge?"

By performing enrichment on the data feed, a system can be able to perform inferences on the data. A result of the enrichment may be transformation of the message "DeviceBadgeScannerId, BadgeId, Date/Time," to "Region, Building, Floor, Asset, DeviceId, BadgeId, UserName, EmployeeId, Date/Time Scanned." This can be a significant optimization, as a system can reduce the number of calls by 1/n, where n is the number of consumers of this data feed.

By using this enrichment, a system can also have the ability to filter out undesired events. If there are 100 building in a campus that receive 100,000 events per building each hour, but only 1 building is actually commissioned, only 1/10 of the events are enriched. By looking at what events are enriched and what events are not enriched, a system can do traffic shaping of forwarding of these events to reduce the cost of forwarding events that no consuming application wants or reads.

An example of an event received by the enrichment manager 138 may be:

```
{
"id": "someguid",
"eventType": "Device_Heartbeat",
"eventTime": "2018-01-27T00:00:00+00:00"
"eventValue": 1,
"deviceID": "someguid"
}
```

An example of an enriched event generated by the enrichment manager 138 may be:

```
{
"id": "someguid",
"eventType": "Device_Heartbeat",
"eventTime": "2018-01-27T00:00:00+00:00"
"eventValue": 1,
"deviceID": "someguid",
"buildingName": "Building-48",
"buildingID": "SomeGuid",
"panelID": "SomeGuid",
"panelName": "Building-48-Panel-13",
"cityID": 371,
"cityName": "Milwaukee",
"stateID": 48,
"stateName": "Wisconsin (WI)",
"countryID": 1,
"countryName": "United States"
}
```

By receiving enriched events, an application of the applications 110 can be able to populate and/or filter what events are associated with what areas. Furthermore, user interface generating applications can generate user interfaces that include the contextual information based on the enriched events.

The cloud platform 106 includes a platform manager 128. The platform manager 128 can be configured to manage the users and/or subscriptions of the cloud platform 106. For example, what subscribing building, user, and/or tenant utilizes the cloud platform 106. The platform manager 128 includes a provisioning service 130 configured to provision the cloud platform 106, the edge platform 102, and the twin manager 108. The platform manager 128 includes a subscription service 132 configured to manage a subscription of the building, user, and/or tenant while the entitlement service 134 can track entitlements of the buildings, users, and/or tenants.

The twin manager 108 can be configured to manage and maintain a digital twin. The digital twin can be a digital representation of the physical environment, e.g., a building. The twin manager 108 can include a change feed generator 152, a schema and ontology 154, a projection manager 156, a policy manager 158, an entity, relationship, and event database 160, and a graph projection database 162.

Figure 11:
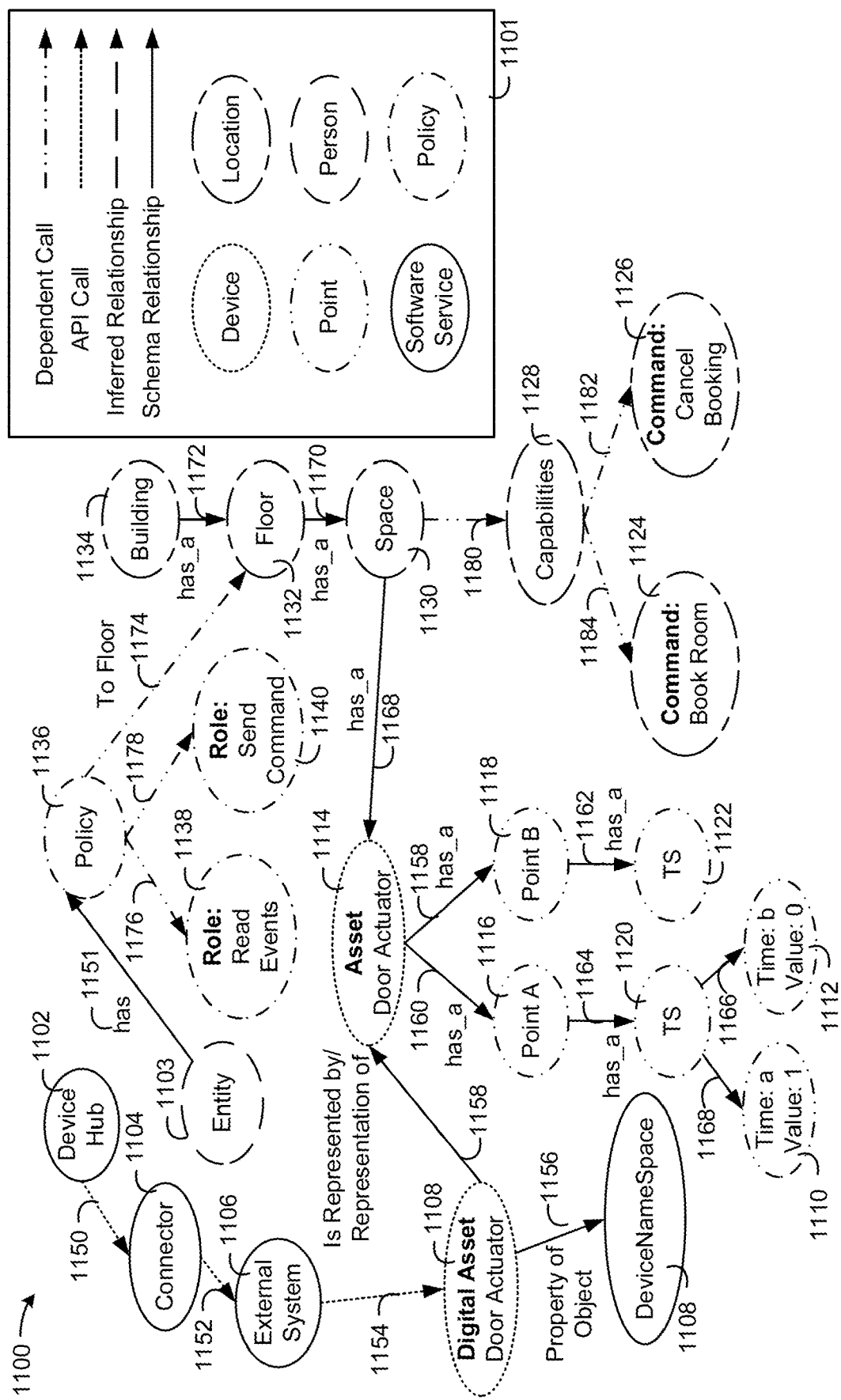
FIG. 11 is a graph projection of the twin manager of FIG. 1 including application programming interface (API) data, capability data, policy data, and services, according to an exemplary embodiment.
Figure 12:
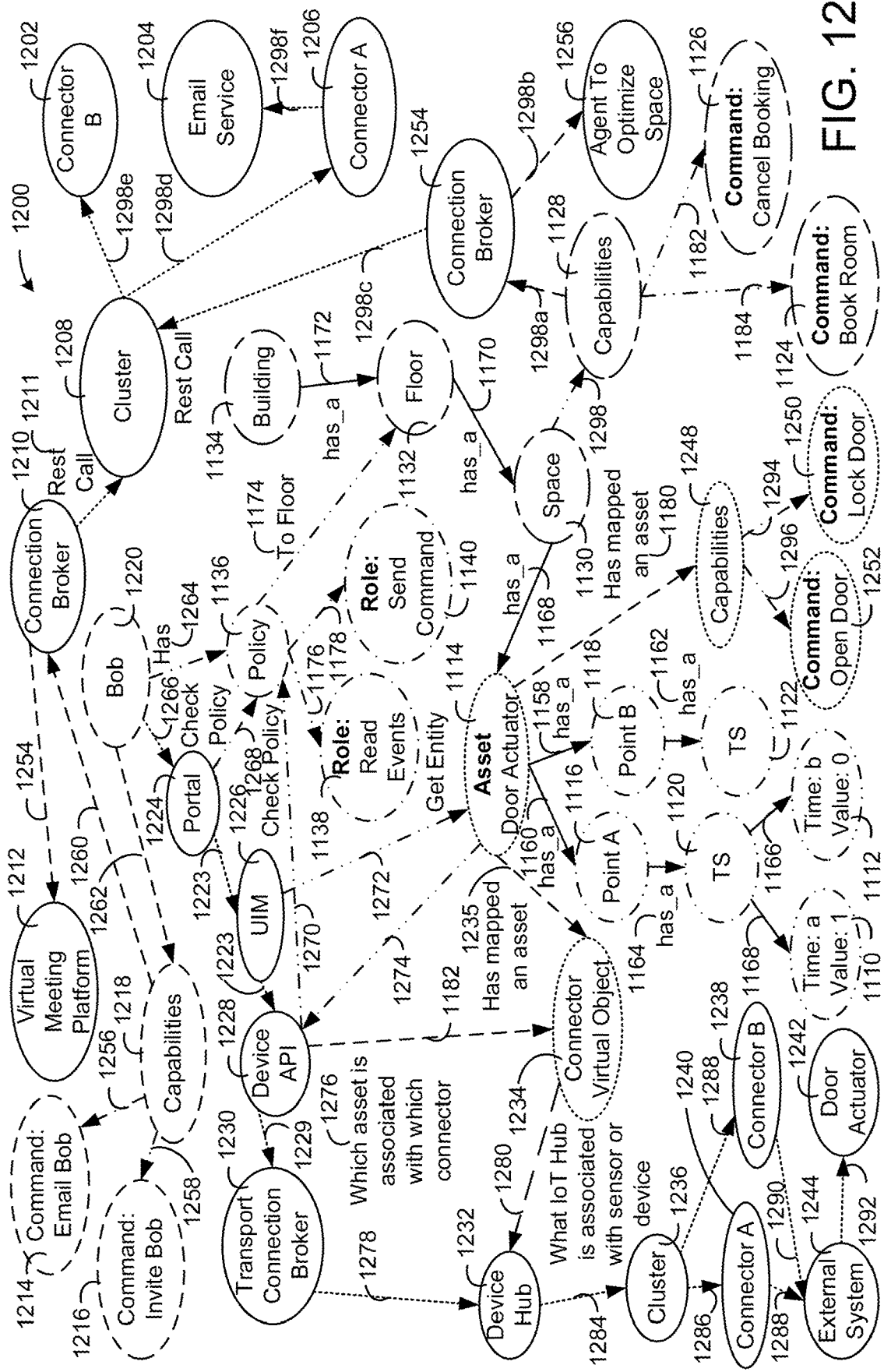
FIG. 12 is another graph projection of the twin manager of FIG. 1 including application programming interface (API) data, capability data, policy data, and services, according to an exemplary embodiment.
Figure 13:
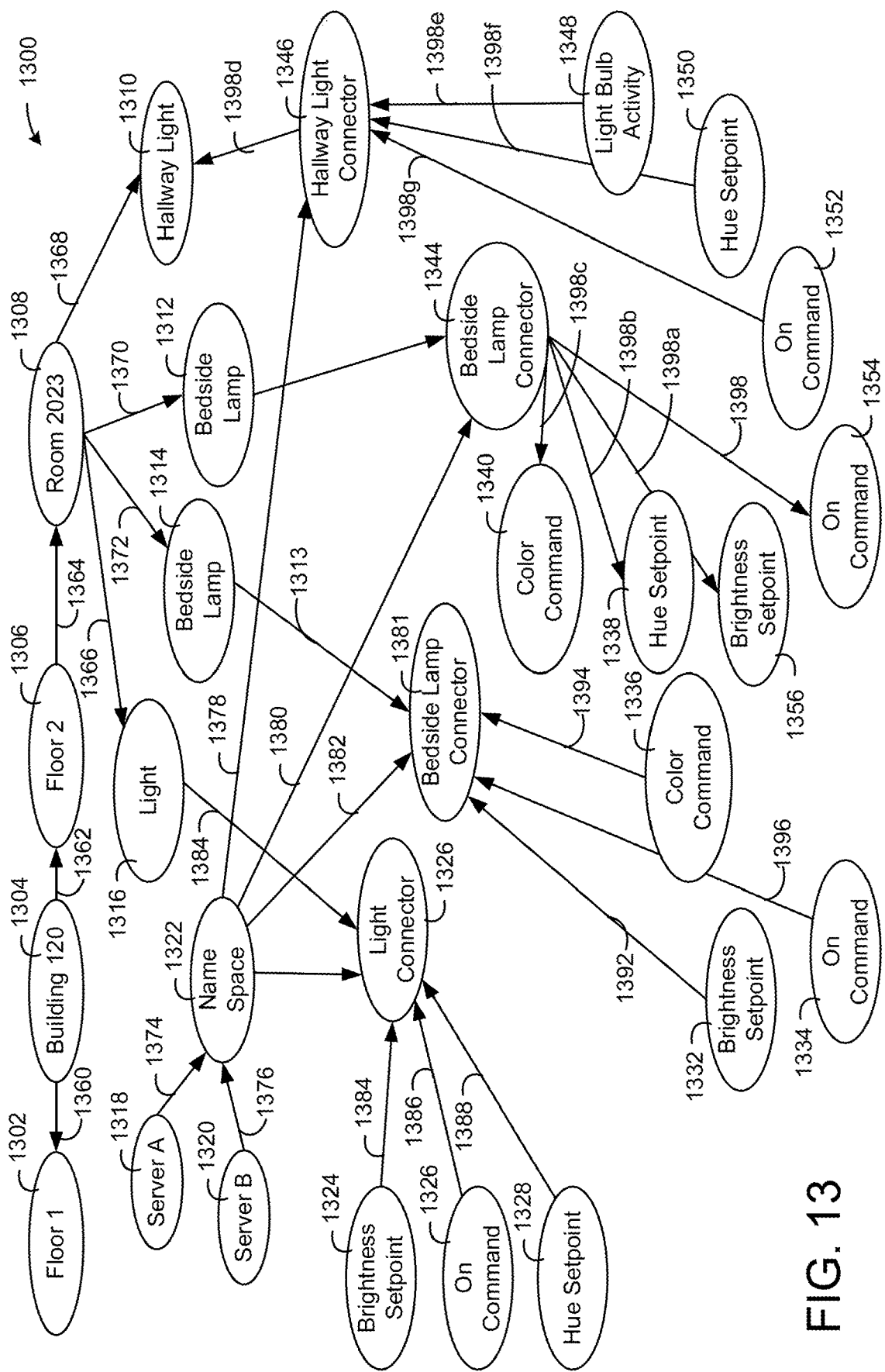
FIG. 13 is a graph projection of the twin manager of FIG. 1 including equipment and capability data for the equipment, according to an exemplary embodiment.

The graph projection manager 156 can be configured to construct graph projections and store the graph projections in the graph projection database 162. Examples of graph projections are shown in FIGS. 11-13. Entities, relationships, and events can be stored in the database 160. The graph projection manager 156 can retrieve entities, relationships, and/or events from the database 160 and construct a graph projection based on the retrieved entities, relationships and/or events. In some embodiments, the database 160 includes an entity-relationship collection for multiple subscriptions. Subscriptions can be subscriptions of a particular tenant as described in FIG. 24.

In some embodiment, the graph projection manager 156 generates a graph projection for a particular user, application, subscription, and/or system. In this regard, the graph projection can be generated based on policies for the particular user, application, and/or system in addition to an ontology specific for that user, application, and/or system. In this regard, an entity could request a graph projection and the graph projection manager 156 can be configured to generate the graph projection for the entity based on policies and an ontology specific to the entity. The policies can indicate what entities, relationships, and/or events the entity has access to. The ontology can indicate what types of relationships between entities the requesting entity expects to see, e.g., floors within a building, devices within a floor, etc. Another requesting entity may have an ontology to see devices within a building and applications for the devices within the graph.

The graph projections generated by the graph projection manager 156 and stored in the graph projection database 162 can be a knowledge graph and is an integration point. For example, the graph projections can represent floor plans and systems associated with each floor. Furthermore, the graph projections can include events, e.g., telemetry data of the building subsystems 122. The graph projections can show application services as nodes and API calls between the services as edges in the graph. The graph projections can illustrate the capabilities of spaces, users, and/or devices. The graph projections can include indications of the building subsystems 122, e.g., thermostats, cameras, VAVs, etc. The graph projection database 162 can store graph projections that keep up a current state of a building.

In some embodiments the enrichment manager 138 can use a graph projection of the graph projection database 162 to enrich events. In some embodiments, the enrichment manager 138 can identify nodes and relationships that are associated with, and are pertinent to, the device that generated the event. For example, the enrichment manager 138 could identify a thermostat generating a temperature measurement event within the graph. The enrichment manager 138 can identify relationships between the thermostat and spaces, e.g., a zone that the thermostat is located in. The enrichment manager 138 can add an indication of the zone to the event.

Furthermore, the command processor 136 can be configured to utilize the graph projections to command the building subsystems 122. The command processor 136 can identify a policy for a commanding entity within the graph projection to determine whether the commanding entity has the ability to make the command. For example, the command processor 136, before allowing a user to make a command, determine, based on the graph projection database 162, to determine that the user has a policy to be able to make the command.

In some embodiments, the policies can be conditional based policies. For example, the building data platform 100 can apply one or more conditional rules to determine whether a particular system has the ability to perform an action. In some embodiments, the rules analyze a behavioral based biometric. For example, a behavioral based biometric can indicate normal behavior and/or normal behavior rules for a system. In some embodiments, when the building data platform 100 determines, based on the one or more conditional rules, that an action requested by a system does not match a normal behavior, the building data platform 100 can deny the system the ability to perform the action and/or request approval from a higher level system.

For example, a behavior rule could indicate that a user has access to log into a system with a particular IP address between 8 A.M. through 5 P.M. However, if the user logs in to the system at 7 P.M., the building data platform 110 may contact an administrator to determine whether to give the user permission to log in.

The change feed generator 152 can be configured to generate a feed of events that indicate changes to the digital twin, e.g., to the graph. The change feed generator 152 can track changes to the entities, relationships, and/or events of the graph. For example, the change feed generator 152 can detect an addition, deletion, and/or modification of a node or edge of the graph, e.g., changing the entities, relationships, and/or events within the database 160. In response to detecting a change to the graph, the change feed generator 152 can generate an event summarizing the change. The event can indicate what nodes and/or edges have changed and how the nodes and edges have changed. The events can be posted to a topic by the change feed generator 152.

The change feed generator 152 can implement a change feed of a knowledge graph. The building data platform 100 can implement a subscription to changes in the knowledge graph. When the change feed generator 152 posts events in the change feed, subscribing systems or applications can receive the change feed event. By generating a record of all changes that have happened, a system can stage data in different ways, and then replay the data back in whatever order the system wishes. This can include running the changes sequentially one by one and/or by jumping from one major change to the next. For example, to generate a graph at a particular time, all change feed events up to the particular time can be used to construct the graph.

The change feed can track the changes in each node in the graph and the relationships related to them, in some embodiments. If a user wants to subscribe to these changes and the user has proper access, the user can simply submit a web API call to have sequential notifications of each change that happens in the graph. A user and/or system can replay the changes one by one to reinstitute the graph at any given time slice. Even though the messages are "thin" and only include notification of change and the reference "id/seq id," the change feed can keep a copy of every state of each node and/or relationship so that a user and/or system can retrieve those past states at any time for each node. Furthermore, a consumer of the change feed could also create dynamic "views" allowing different "snapshots" in time of what the graph looks like from a particular context. While the twin manager 108 may contain the history and the current state of the graph based upon schema evaluation, a consumer can retain a copy of that data, and thereby create dynamic views using the change feed.

The schema and ontology 154 can define the message schema and graph ontology of the twin manager 108. The message schema can define what format messages received by the messaging manager 140 should have, e.g., what parameters, what formats, etc. The ontology can define graph projections, e.g., the ontology that a user wishes to view. For example, various systems, applications, and/or users can be associated with a graph ontology. Accordingly, when the graph projection manager 156 generates an graph projection for a user, system, or subscription, the graph projection manager 156 can generate a graph projection according to the ontology specific to the user. For example, the ontology can define what types of entities are related in what order in a graph, for example, for the ontology for a subscription of "Customer A," the graph projection manager 156 can create relationships for a graph projection based on the rule:

Region ⇄ Building ⇄ Floor ⇄ Space ⇄ Asset

For the ontology of a subscription of "Customer B," the graph projection manager 156 can create relationships based on the rule:

Building ⇄ Floor ⇄ Asset

The policy manager 158 can be configured to respond to requests from other applications and/or systems for policies. The policy manager 158 can consult a graph projection to determine what permissions different applications, users, and/or devices have. The graph projection can indicate various permissions that different types of entities have and the policy manager 158 can search the graph projection to identify the permissions of a particular entity. The policy manager 158 can facilitate fine grain access control with user permissions. The policy manager 158 can apply permissions across a graph, e.g., if "user can view all data associated with floor 1" then they see all subsystem data for that floor, e.g., surveillance cameras, HVAC devices, fire detection and response devices, etc.

Figure 2:
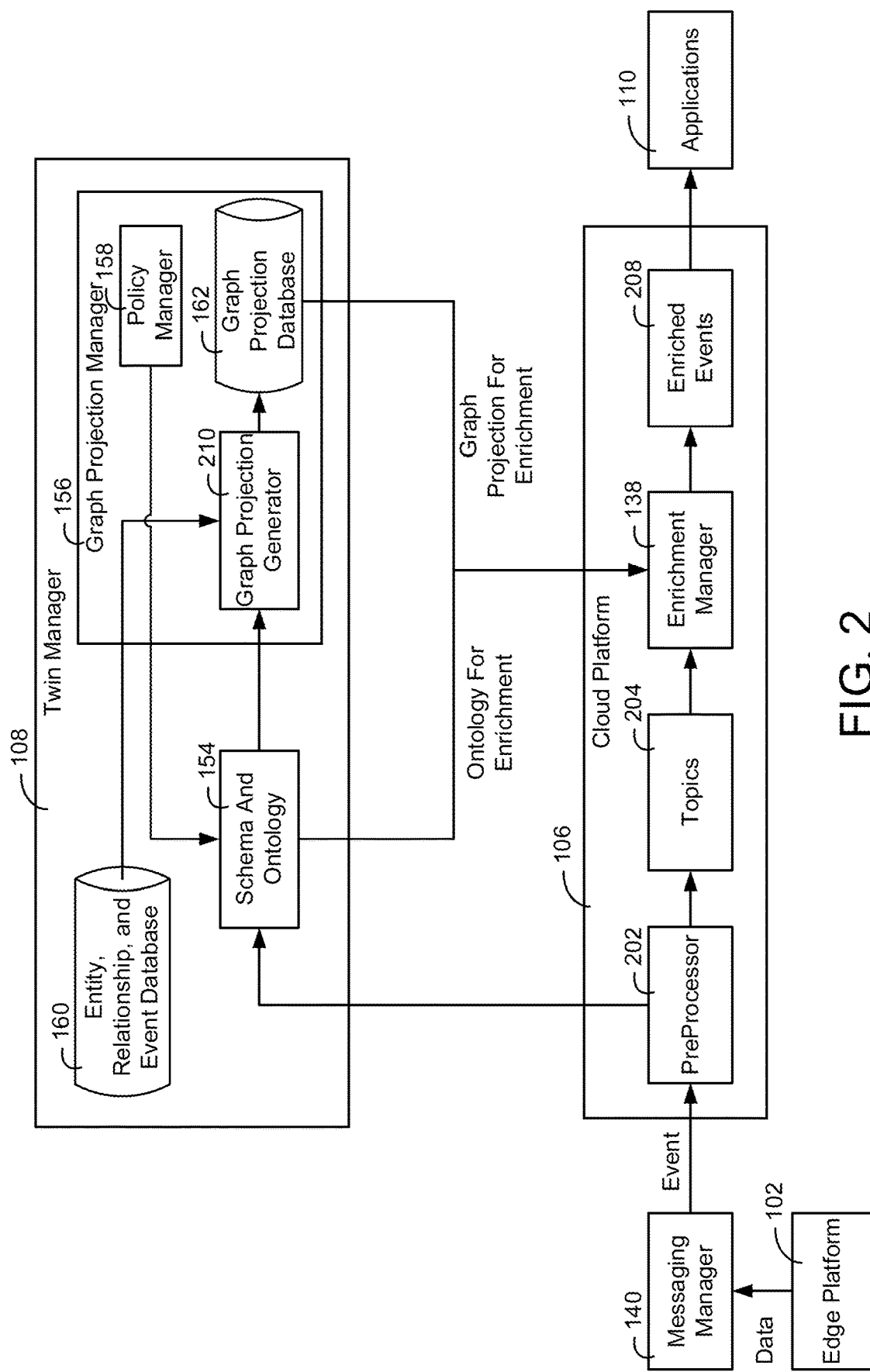
FIG. 2 is a block diagram of the cloud platform and the twin manager of FIG. 1 processing an event received from the edge platform of FIG. 1, according to an exemplary embodiment.

Referring now to FIG. 2, the cloud platform 106 and the twin manager 108 processing an event received from the edge platform 102 is shown, according to an exemplary embodiment. The cloud platform 106 includes a preprocessor 202, topics 204, the enrichment manager 138, and enriched events 208. The twin manager 108 is shown to include the entity, relationship, and event database 160, the schema and ontology 154, and the projection manager 156. The projection manager 156 includes the policy manager 158, a graph projection generator 210, and the graph projection database 162.

Data received from the edge platform 102, or any other system described herein, can be converted into an event if the data is not already formatted as an event by the messaging manager 140. The messaging manager 140 can provide events to the preprocessor 202. The preprocessor 202 can analyze the events to make sure the events are formatted properly. For example, the preprocessor 202 can make a call to the schema and ontology 154 of the twin manager 108 to identify the schema for the event. The preprocessor 202 can determine whether the format of the event is correct based on the schema.

Furthermore, the preprocessor 202 can identify what topic the event belongs to, e.g., whether the event relates to a change for the graph projection database 162 or whether the event relates to telemetry data of a building. The preprocessor 202 can provide the event to the appropriate topics of the topics 204.

The enrichment manager 138 can be configured to enrich the events of one or more particular topics of the topics 204. The enrichment manager 138 can receive a schema for enrichment and a graph projection for enrichment. In some embodiments, the ontology received by the enrichment manager 138 can define enrichment rules for particular types of events, e.g., what information should be shown for particular events. For example, for an event of a thermostat, the rules may define that location and equipment being controlled by the thermostat should be enriched into the event.

The graph projection including all of the nodes and edges that define the contextual information associated with the event can be received by the enrichment manager 138 from the graph projection database 162. The received projection can include the information that is added into the events as part of the enrichment. The enriched events 208 are then provided to the applications 110 for processing where the applications 110 operate based on the original data of the event as well as the contextual information enriched into the event.

The graph projection generator 210 is shown to receive data from the entity, relationship, and event database 160. Furthermore, the graph projection generator 210 can receive an ontology from the schema and ontology 154. The graph projection generator 210 can generate a graph projection based on the ontology and the data received from the database 160. The graph projection can be stored in the graph projection database 162. Furthermore, the policy manager 158 can select different ontologies to provide to the graph projection generator 210 and/or the enrichment manager 138. In this regard, based on the entity (e.g., application or system) that will be consuming a graph projection and/or receiving an enriched event, the policy manager 158 can select an ontology specific to the entity.

Figure 3:
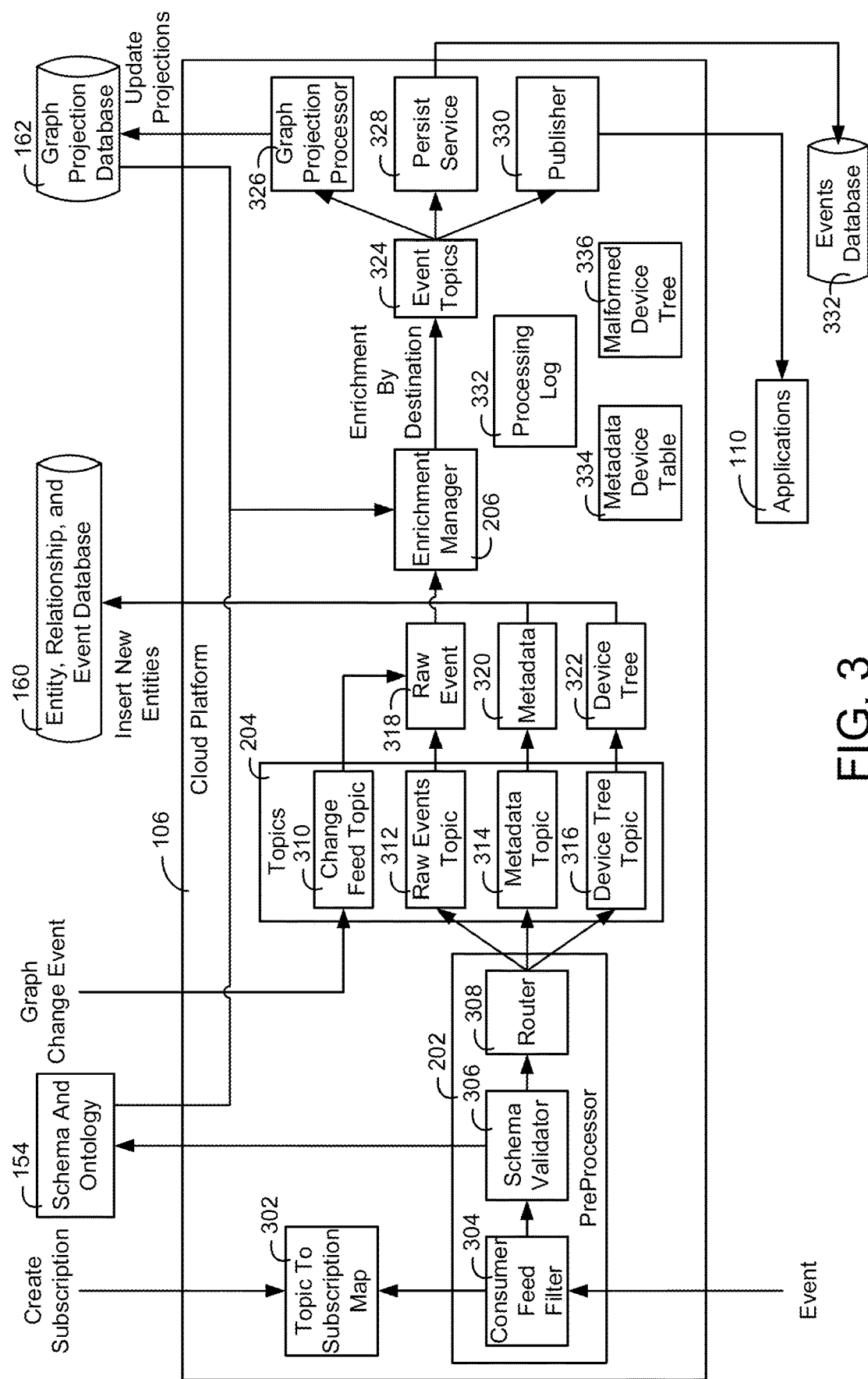
FIG. 3 is a block diagram of the cloud platform of FIG. 1 processing events shown in greater detail, according to an exemplary embodiment.

Referring now to FIG. 3, the cloud platform 106 processing events is shown, according to an exemplary embodiment. The preprocessor 202 receives events and processes the events through a consumer feed filter. The consumer feed filter can filter events into particular topics for consumption by various consumers, e.g., for particular event topics 324. In this regard, a particular application or system can create a subscription in the topic to subscription map 302 and the corresponding events of a topic can be added to the topic of the event topics 324.

The preprocessor 202 includes a schema validator 306. The schema validator can make a call to the schema and ontology 154 and receive a schema or set of schemas for validating the events to determine whether the event is formatted in an allowed schema and/or includes the minimum fields. If the event is properly formatted (e.g., matches an approved schema of the schema and ontology 154), the event can be provided to a router 308. If the event is not properly formatted, the event can be added to the malformed device tree 336. A user and/or analysis system can review the malformed device tree 336 to determine system configuration errors. For example, the cloud platform 106 could identify improper graph configurations where nodes or relationships are missing within the graph.

The router 308 can add the event to one or more topics of the topic 204. One topic of the topics 310 is a change feed topic 310. Graph change feed events are created by the change feed generator 152 and added to the change feed topic 310. The topics 204 further include raw events topic 312, metadata topic 314, and device tree topic 316. The router can fan the event into various topics based on a type of the event.

The metadata topic 314 can include metadata 320. The metadata may be data describing entities (e.g., equipment) and/or capabilities and/or policies associated with the entities. During a discovery phase that the cloud platform 106 can be configured to operate in, where equipment is discovered by the cloud platform 106, or during a normal operating mode of the cloud platform 106, metadata events can be added to the metadata topic 314 to update the entities, relationships, and events of the database 160, e.g., build up the graph projections.

In some embodiments, all events are added into the raw event topic. In some embodiments, if an event relates to how the graph is represented, the event is added into the metadata topic 314. In some embodiments, if the event represents a new device or set of devices, the device is added to the device tree topic 316. In some embodiments, the device tree data of the device tree topic 316 can be a type of event that describes an object or asset discovered by the cloud platform 106 that contains the relationship of that object to other objects of similar context A raw event 318 of the raw events topic 312 can be provided to the enrichment manager 206 for enrichment. The enrichment manager 206 can receive a graph projection from the graph projection database 162 and enrich the raw event 318 based on context of the graph projection. In some embodiments, the enrichment manager 206 can enrich the raw event 318 based on one or more user rules. For example, the rules could be to enrich indications of assets shown within a field of view of a camera where the event is a frame or set of frames captured by the camera. The enriched events can be enriched based on destination. For example, the event can be enriched according to the system that will be receiving the event. In this regard, the event can be enriched multiple different times for multiple different receiving systems.

Enrichment may help systems operate quickly. For example, a person may scan a badge at a door. An application may look up the user of the badge with the badge number. Furthermore, the application may look up what equipment and what place the scanner is associated with. However, by performing multiple searches, the processing of the applications may be slow. However, with the enrichment of the enrichment manager 206, a telemetry event such as scanning a door badge can add floor indications, user identifications, etc. so that the receiving application can operate on the event and contextual information without needing to search for and/or retrieve the contextual information.

The enriched event can be added to the event topics 324. The event topics 324 can be subscribed to by various systems. For example, a graph projection processor 326 can make updates to projections of the graph projection database 162 based on the enriched event. For examples telemetry data could be added to the graph projection database 162, statuses of equipment could be added to the graph projection database 162, etc. The persist service 328 can persist the enriched events in an events database 332. Furthermore, a publisher 330 can provide the enriched events to the applications 110, e.g., to particular applications subscribed to the enriched events.

Figure 4:
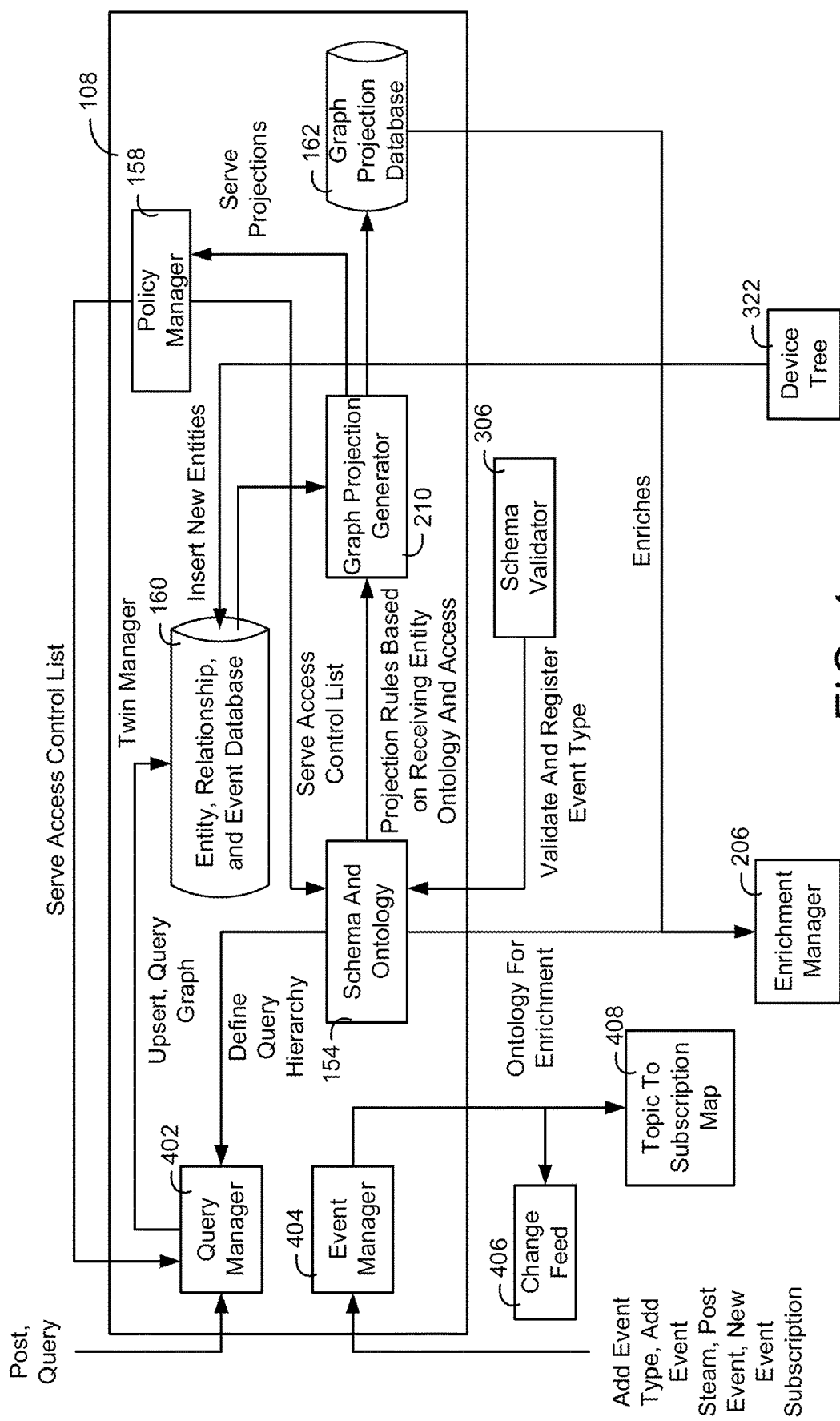
FIG. 4 is a block diagram of the twin manager of FIG. 1 generating projections and operating with components of the cloud platform of FIG. 1 to enrich events, according to an exemplary embodiment.

Referring now to FIG. 4, the twin manager 108 generating projections and operating with components of the cloud platform 106 to enrich events is shown, according to an exemplary embodiment. The twin manager 108 includes an event manager 404. The event manager can receive data from a user device and/or another system. The event manager 404 can receive an addition of an event type, an addition of an event stream, a new event, and/or a new event subscription. Based on the received information, the event manager 404 can be configured to update the topic to subscription map 408. Furthermore, if the received information indicates changes to the graph projections of the graph projection database 162, the event manager 404 can be configured to generate a change event for a change feed.

The twin manager 108 includes a query manager 402. The query manager 402 can receive a query or a post from a user device or another system. The query manager 402 can be configured to query the entity, relationship, and/or event database 160 based on the query. An ontology received from the schema and ontology 154 can define the query that the query manager 402 makes to the database 160. In some embodiments, the query manager 402 can be configured to upsert new entities, relationships, and/or events into the database 160. In some embodiments, the query manager 402 constructs a query or determines whether to upsert information to the database 160 based on an access control list received from the policy manager 158. In this regard, the entity requesting information through a query or sending a post of new information can be verified for having the proper access policy by the policy manager 158 and the query manager 402.

The policy manager 158 is shown to receive projections from the graph projection generator 210. In some embodiments, the policy manager 158 can receive the projections from the graph projection database 162. The policy manager 158 can be configured to receive a request for access to information and can review the graph to determine whether the requesting entity has the proper access to the information. The policy manager 158 can serve access control lists determined from the graph projections to the query manager 402. The policy manager 158 can serve the access control list to the schema and ontology 154 for use in providing an ontology to the enrichment manager 206 and/or for user in determining projection rules for the graph projection generator 210.

Figure 5:
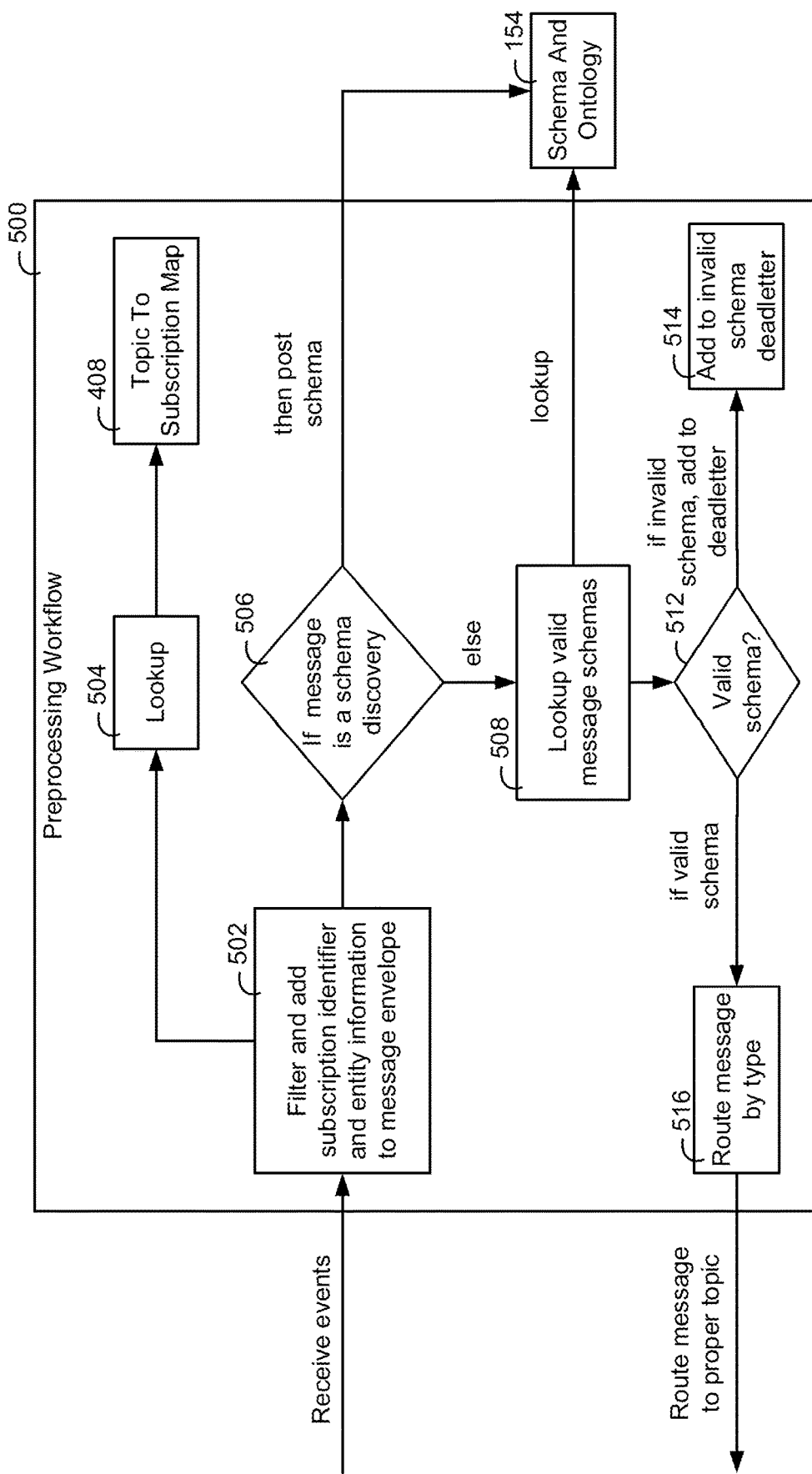
FIG. 5 is a flow diagram of a preprocessing workflow performed by the cloud platform of FIG. 1 to preprocess events, according to an exemplary embodiment.

Referring now to FIG. 5, a preprocessing workflow 500 performed by the cloud platform 106 to preprocess events is shown, according to an exemplary embodiment. Events can be received by the platform 106. The cloud platform 106 can filter the events in step 502. The events can be filtered into schema discovery, e.g., a new message schema, for filtering into an existing schema message category. Furthermore, in step 502, the cloud platform 106 can add subscription identifier and entity information to the event. For example, the subscription identifier can be looked up in step 504 via the topic to subscription map 408. The entity information can indicate the entity related to the event, e.g., the entity that created the event. For example, a thermostat, the entity, may have generated a temperature measurement, the event.

If the message is for a schema discovery (step 506), the cloud platform 106 can post the schema used in the message in the schema and ontology 154 or alternatively proceed to step 512. In step 508, the cloud platform 106 can lookup valid message schemas from the schema and ontology 154. In step 512, the cloud platform 106 can determine whether the schema of the event is valid or invalid based on the valid message schemas. In step 514, if the schema is invalid, the event can be added to an invalid schema deadletter where invalid schema events are stored. If the schema is valid, the event can be routed to message topics based on a type of the message in step 516, e.g., whether the event is metadata, a raw event, etc.

Figure 6:
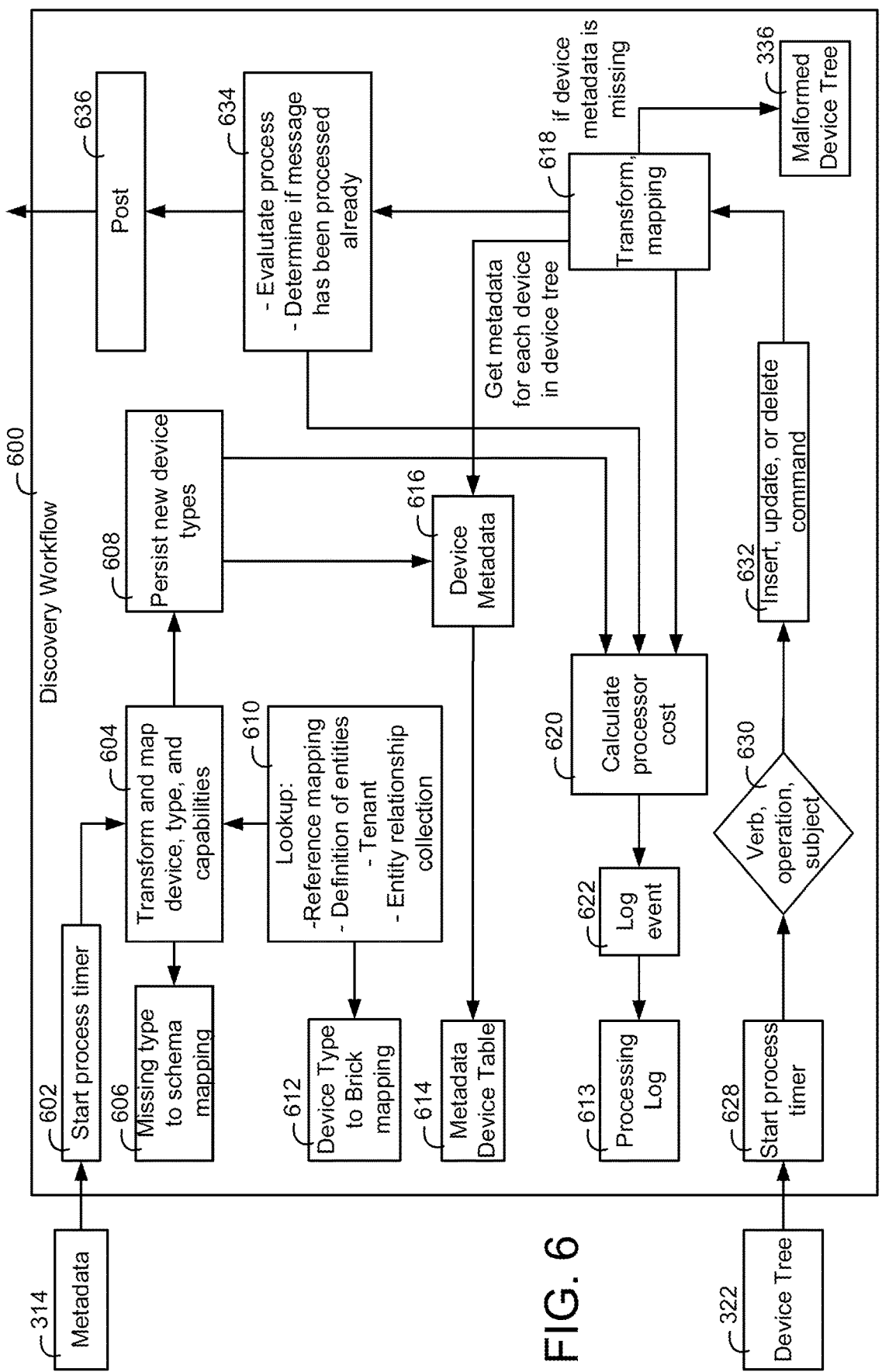
FIG. 6 is a flow diagram of a discovery workflow discovering new entities from metadata and a device tree that is performed by the cloud platform of FIG. 1, according to an exemplary embodiment.

Referring now to FIG. 6, a discovery workflow 600 discovering new entities from metadata 314 and a device tree 322 that is performed by the cloud platform 106 is shown, according to an exemplary embodiment. The cloud platform 106 can receive the metadata 314 and start a process timer in step 602. In step 604, the cloud platform 106 can transform and map device, type, and capabilities. The cloud platform 106 can reference a missing type to schema mapping. In step 610, the cloud platform 106 can look up a reference mapping for the metadata, definitions of entities for the metadata, a tenant associated with the metadata, and/or other information of an entity relationship collection. In step 608, the new device types can be persisted as metadata 616 and added to a metadata device table 614.

In step 628, the cloud platform 106 can start a process timer in response to receiving the device tree 322. The device tree 322 can be analyzed to determine what action, e.g., verb, operation, or subject included within the device tree 322 is to be performed. The action may be an insert, update, or delete command for the graph projections. In step 618, the cloud platform 106 can transform or map the device tree based on metadata stored in the device metadata 616. In step 634, the cloud platform 106 can evaluate the process and determine if a message has already been processed. In step 620 the processor cost can be calculated and in step 622 the event can be logged in the processing log 613. In step 636 the new data for insertion, updating, and/or deletion can be posted.

In response to receiving the device tree 322, the cloud platform 106 can start a process timer in step 628. The cloud platform 106 can analyze the device tree 322 for a verb, operation, and/or subject to construct an insert command, an update command, and/or a delete command 632.

Figure 7:
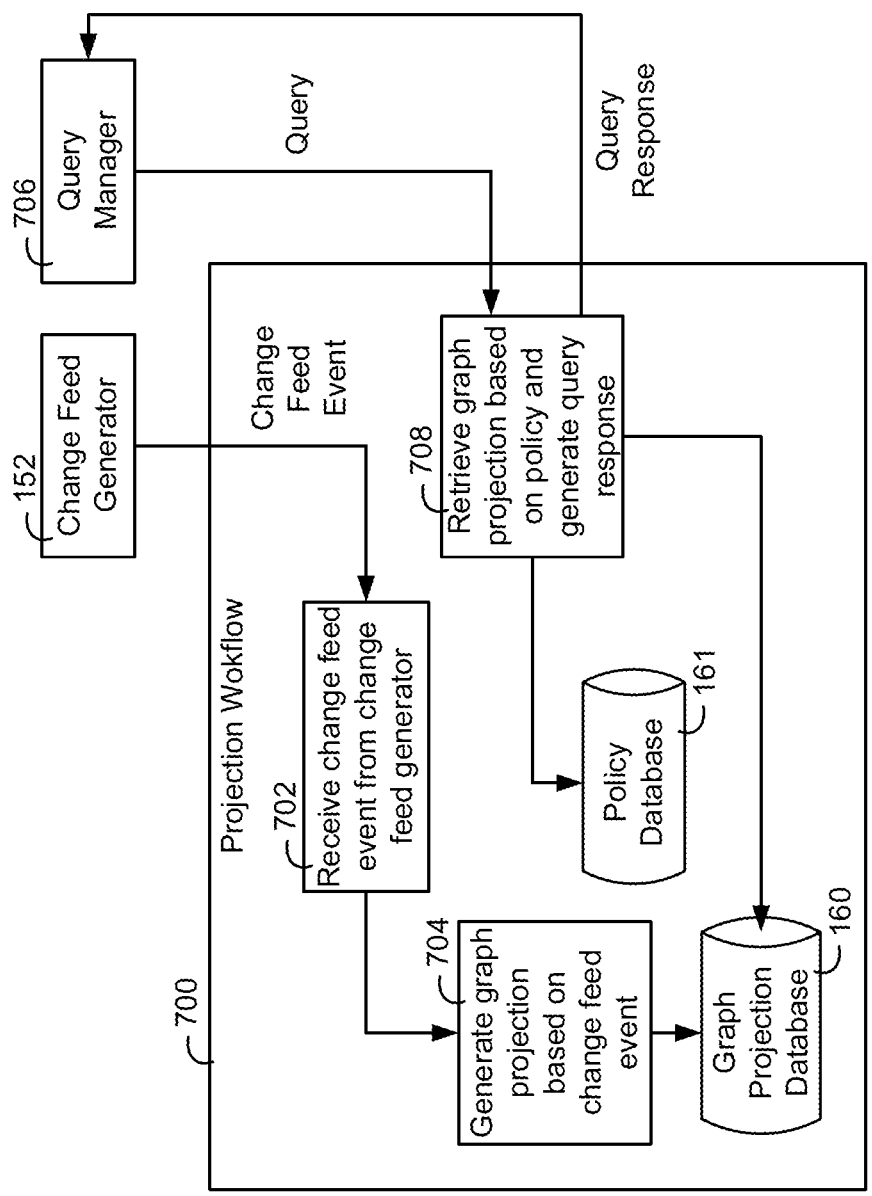
FIG. 7 is a flow diagram of a projection workflow performed by the twin manager of FIG. 1 generating a projection, according to an exemplary embodiment.

Referring now to FIG. 7, a projection workflow 700 performed by the twin manager 108 is shown, according to an exemplary embodiment. In step 702, the twin manager 108 can receive a change feed event from the change feed generator 152. Based on the change feed event, in step 704, the twin manager 108 can generate a graph projection and store the graph projection. The twin manager 108 can edit existing graph projections of the graph projection database 162 based on the change feed event. The twin manager 108 can replace an existing graph projection of the graph projection database 162 with a new graph projection created responsive to receiving the change feed event.

The twin manager 108 can receive a query from the query manager 706. The query may be a query for information of a graph projection and/or a query for a graph projection itself. The query can originate from a requesting application, system, or user device. The twin manager 108 can, in step 708, retrieve a graph projection based on a policy for the requesting system.

The twin manager 108 can retrieve policies from a policy database 161 to determine which graph projection the querying system has access to. In response to retrieving the appropriate graph projection from the graph projection database 162, the twin manager 108 can construct a query response including the specific information from the graph projection and/or the graph projection itself. The twin manager 108 can return the query response to the query manager 706.

Figure 8:
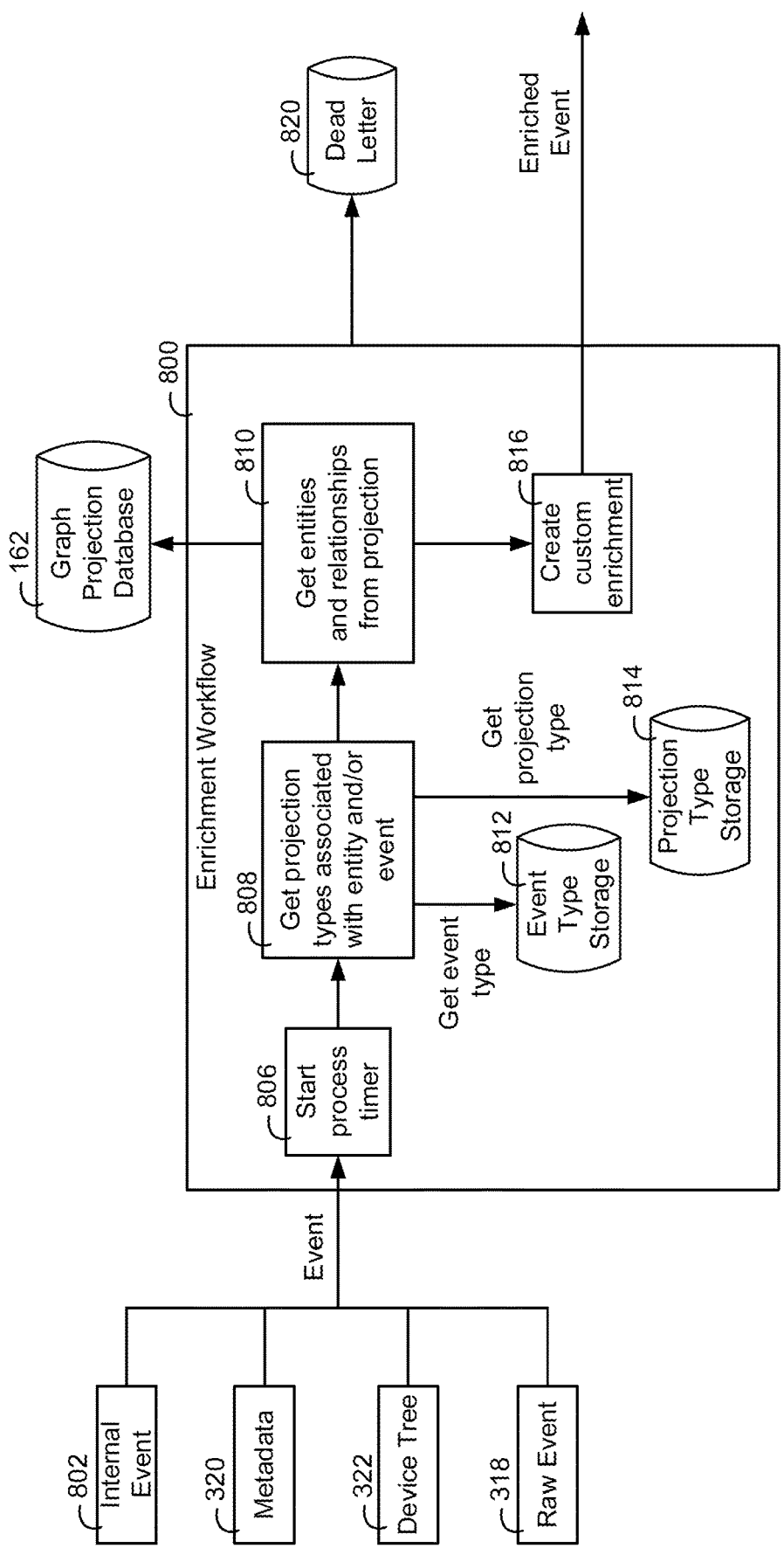
FIG. 8 is a flow diagram of an enrichment workflow performed by the cloud platform of FIG. 1 enriching events with contextual information, according to an exemplary embodiment.

Referring now to FIG. 8, an enrichment workflow 800 performed by the cloud platform 106 enriching events with contextual information is shown, according to an exemplary embodiment. The cloud platform 106 receives an internal event 802, metadata 320, a device tree 322, and a raw event 314. The internal event 802 may be an event created by the building data platform 100 requiring enrichment. Each data element received can be enriched according to the workflow 800.

In step 806, in response to receiving an event, a process timer can be started. In step 808, the cloud platform 106 can get an event type for the event from an event type storage 812 and a projection type from a projection type storage 814. In this regard, a projection type specific to the event can be retrieved. The specific projection identified can be retrieved in step 810 and entities and relationships specific for enriching the event can be retrieved from the graph projection. Based on the entities and relationships, a custom enrichment can be generated in step 816 for the event.

In some embodiments, some events may not be associated with any event type and/or projection type. In response to identifying an event that cannot be enriched, the cloud platform 106 can add the event to a dead letter 820. The dead letter 820 can be reviewed by users and/or systems to identify errors in the operation of the cloud platform 106 and/or issues with the systems creating the events.

Figure 9:
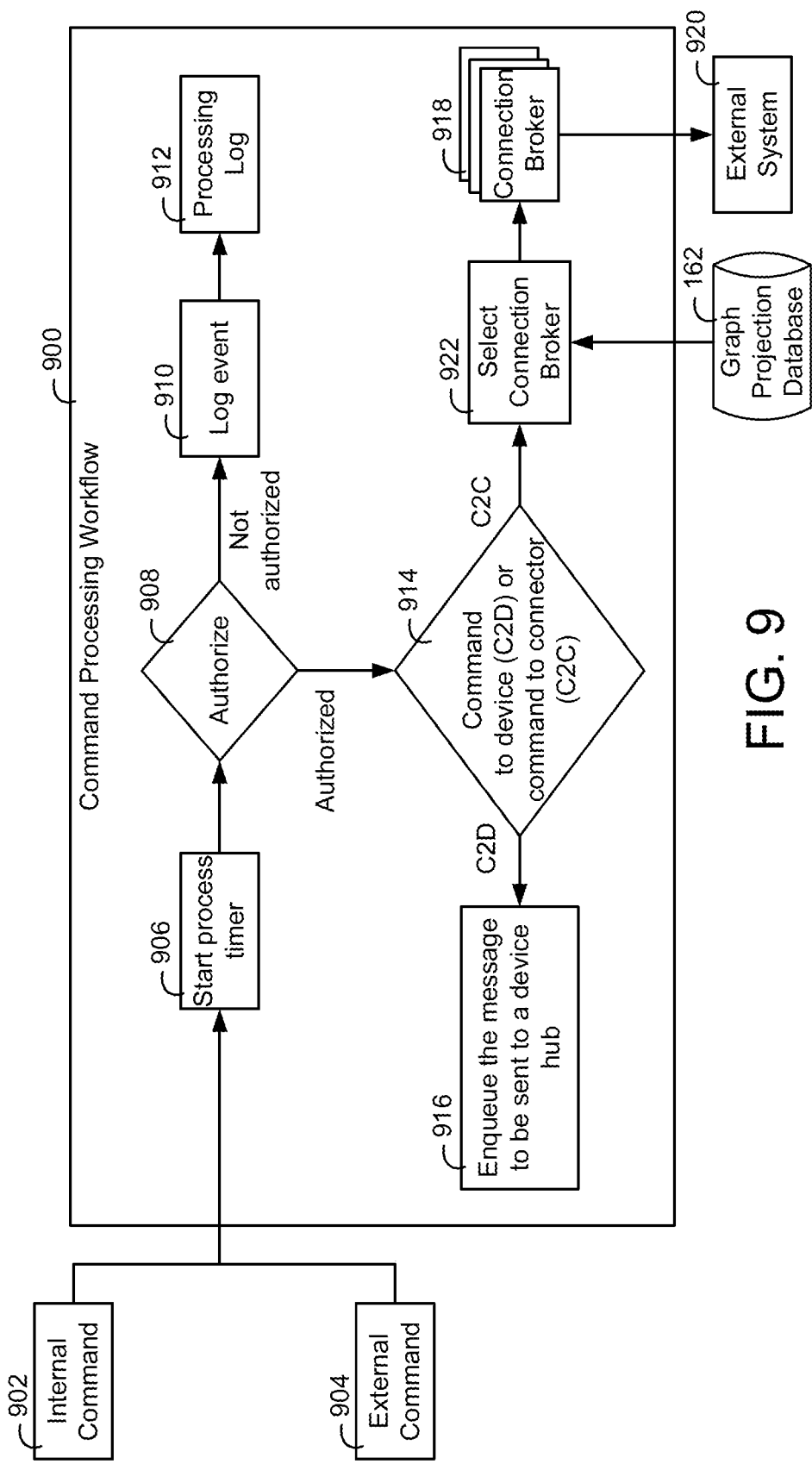
FIG. 9 is a flow diagram of a command processing workflow performed by the cloud platform of FIG. 1 where commands are sent to devices or are communicated to an external system via a connection broker, according to an exemplary embodiment.

Referring now to FIG. 9, a command processing workflow 900 performed by the cloud platform 106 where commands are sent to devices or are communicated to an external system via a connection broker is shown, according to an exemplary embodiment. The cloud platform 106 can receive an internal command 902 and/or an external command 904. The internal command 902 can be a command generated by a component of the building data platform 100. The external command 904 can be a command generated by an external device or system, e.g., the user device 176.

In step 906, the internal command 902 and/or the external command 904 can be received and a process timer started. In step 908, the cloud platform 106 can authorize the command to determine whether the entity requesting the command is authorized to perform the command. For example, the cloud platform 106 can search a graph projection of the graph projection database 162 for policies and capabilities to determine whether the requesting entity has access to make the command that the entity is making.

If the command is not authorized, in step 910 the event can be logged in a processing log 912. In step 914, the cloud platform 106 can determine whether the command is a command for a device of the building subsystems 122, e.g., a command to device (C2D) command or a command for an external system that will be handled via a connector, a command to connector (C2C) command. In response to the command being a C2D command, the cloud platform 106 can enqueue the message to be sent to a device via a device hub in step 916. The cloud platform 106 can consult a graph projection to identify the device hub responsible for handling commands for the device.

If the command is a C2C command, the cloud platform 106 can select a connection broker 918 in step 922. The connection broker 918 can be a component configured to communicate and integrate with external systems, e.g., the external system 920. For example, an office program suite, a virtual meeting platform, an email server, etc. can all integrate with the building data platform 100 via the connection broker 918. The cloud platform 106 can select the appropriate connection broker for the command by searching a graph projection of the graph projection database 162.

Figure 10:
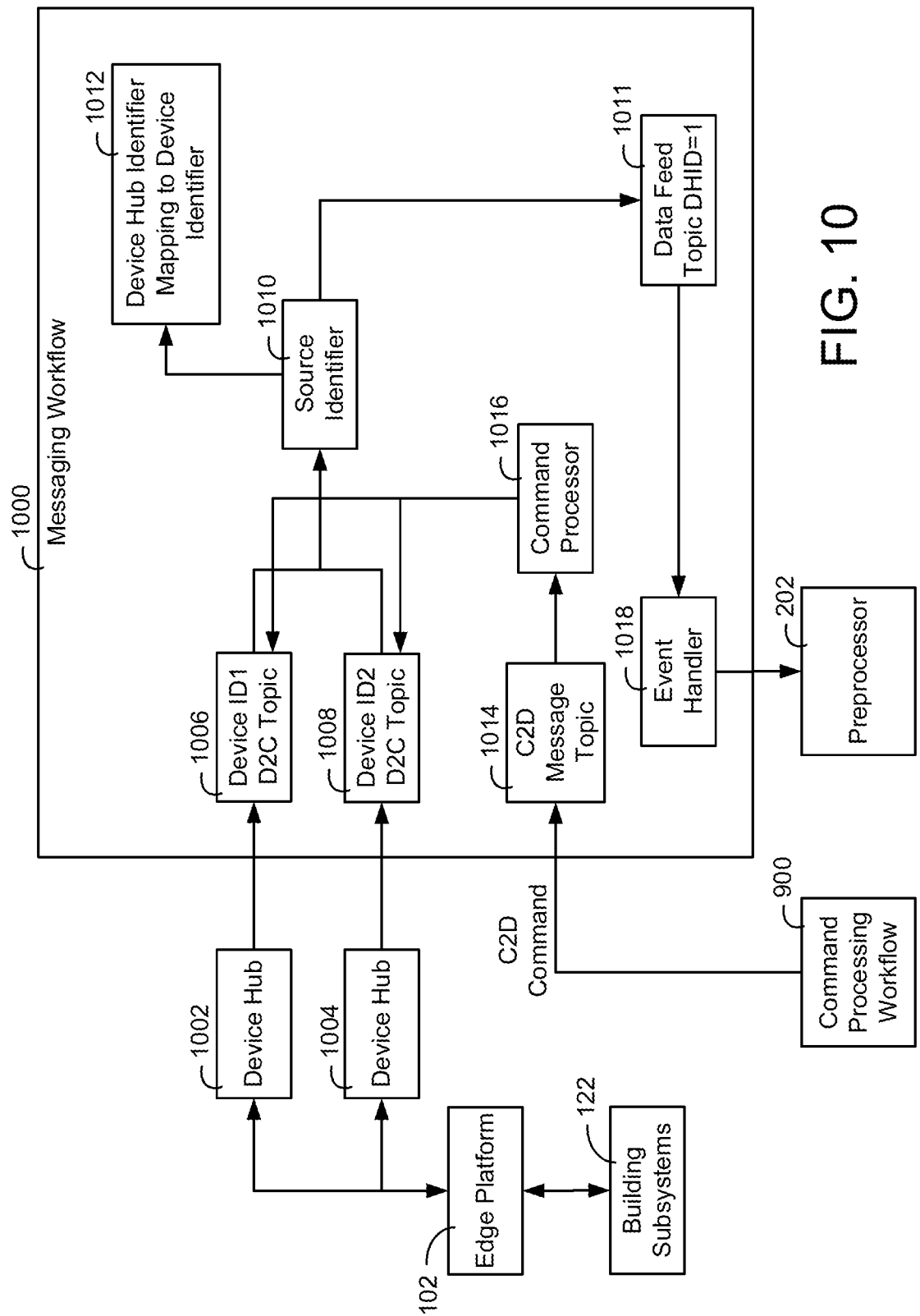
FIG. 10 is a flow diagram of a messaging workflow performed by the cloud platform of FIG. 1 where messages of building systems are received via the edge platform of FIG. 1 and commands for the building systems are communicated to the building subsystems via the edge platform, according to an exemplary embodiment.

Referring now to FIG. 10, a messaging workflow 1000 performed by the cloud platform 106 where messages of building subsystems 122 are received via the edge platform 102 and commands for the building subsystems 122 are communicated to the building subsystems 122 via the edge platform 102 is shown, according to an exemplary embodiment. The cloud platform 106 can receive data events from building subsystems 122 via an edge platform 102 through device hubs 1002 and 1004 specific to devices of the building subsystems 122.

The device hubs 1002 and 1004 can post events into topics 1006 and 1008. A source identifier 1010 subscribed to the topics 1006 and 1008 can look up an identifier of the device hub based on an identifier of the device and post the event into a data feed topic 1011 associated with the device hub in a device hub identifier mapping to device identifier 1012. An event handler 1018 can provide the event to the preprocessor 202.

The C2D command of the command processing workflow 900. The command can be posted in a C2D message topic 1014. A command processor 1016 subscribed to the C2D message topic 1014 can read the C2D messages and provide the C2D commands to the appropriate device topics, e.g., topic 1006 or topic 1008. The device hubs 1002 and/or 1004 can pick up the C2D commands and operate the building subsystems 122 via the C2D command.

Referring now to FIG. 11, a graph projection 1100 of the twin manager 108 including application programming interface (API) data, capability data, policy data, and services is shown, according to an exemplary embodiment. The graph projection 1100 includes nodes 1102-1140 and edges 1150-1172. The nodes 1102-1140 and the edges 1150-1172 are defined according to the key 1101. The nodes 1102-1140 represent different types of entities, devices, locations, points, persons, policies, and software services (e.g., API services). The edges 1150-1172 represent relationships between the nodes 1102-1140, e.g., dependent calls, API calls, inferred relationships, and schema relationships (e.g., BRICK relationships).

The graph projection 1100 includes a device hub 1102 which may represent a software service that facilitates the communication of data and commands between the cloud platform 106 and a device of the building subsystems 122, e.g., door actuator 1114. The device hub 1102 is related to a connector 1104, an external system 1106, and a digital asset "Door Actuator" 1108 by edge 1150, edge 1152, and edge 1154.

The cloud platform 106 can be configured to identify the device hub 1102, the connector 1104, the external system 1106 related to the door actuator 1114 by searching the graph projection 1100 and identifying the edges 1150-1154 and edge 1158. The graph projection 1100 includes a digital representation of the "Door Actuator," node 1108. The digital asset "Door Actuator" 1108 includes a "Device-NameSpace" represented by node 1108 and related to the digital asset "Door Actuator" 1108 by the "Property of Object" edge 1156.

The "Door Actuator" 1114 has points and timeseries. The "Door Actuator" 1114 is related to "Point A" 1116 by a "has_a" edge 1160. The "Door Actuator" 1114 is related to "Point B" 1118" by a "has_A" edge 1158. Furthermore, timeseries associated with the points A and B are represented by nodes "TS" 1120 and "TS" 1122. The timeseries are related to the points A and B by "has_a" edge 1164 and "has_a" edge 1162. The timeseries "TS" 1120 has particular samples, sample 1110 and 1112 each related to "TS" 1120 with edges 1168 and 1166 respectively. Each sample includes a time and a value. Each sample may be an event received from the door actuator that the cloud platform 106 ingests into the entity, relationship, and event database 160, e.g., ingests into the graph projection 1100.

The graph projection 1100 includes a building 1134 representing a physical building. The building includes a floor represented by floor 1132 related to the building 1134 by the "has_a" edge from the building 1134 to the floor 1132. The floor has a space indicated by the edge "has_a" 1170 between the floor 1132 and the space 1130. The space has particular capabilities, e.g., is a room that can be booked for a meeting, conference, private study time, etc. Furthermore, the booking can be canceled. The capabilities for the floor 1132 are represented by capabilities 1128 related to space 1130 by edge 1180. The capabilities 1128 are related to two different commands, command "book room" 1124 and command "cancel booking" 1126 related to capabilities 1128 by edge 1184 and edge 1182 respectively.

If the cloud platform 106 receives a command to book the space represented by the node, space 1130, the cloud platform 106 can search the graph projection 1100 for the capabilities for the 1128 related to the space 1128 to determine whether the cloud platform 106 can book the room.

In some embodiments, the cloud platform 106 could receive a request to book a room in a particular building, e.g., the building 1134. The cloud platform 106 could search the graph projection 1100 to identify spaces that have the capabilities to be booked, e.g., identify the space 1130 based on the capabilities 1128 related to the space 1130. The cloud platform 106 can reply to the request with an indication of the space and allow the requesting entity to book the space 1130.

The graph projection 1100 includes a policy 1136 for the floor 1132. The policy 1136 is related set for the floor 1132 based on a "To Floor" edge 1174 between the policy 136 ad the floor 1132. The policy 1136 is related to different roles for the floor 1132, read events 1138 and send command 1140. The policy 1136 is set for the entity 1103 based on has edge 1151 between the entity 1103 and the policy 1136.

The twin manager 108 can identify policies for particular entities, e.g., users, software applications, systems, devices, etc. based on the policy 1136. For example, if the cloud platform 106 receives a command to book the space 1130. The cloud platform 106 can communicate with the twin manager 108 to verify that the entity requesting to book the space 1130 has a policy to book the space. The twin manager 108 can identify the entity requesting to book the space as the entity 1103 by searching the graph projection 1100. Furthermore, the twin manager 108 can further identify the edge has 1151 between the entity 1103 and the policy 1136 and the edge 1178 between the policy 1136 and the command 1140.

Furthermore, the twin manager 108 can identify that the entity 1103 has the ability to command the space 1130 based on the edge 1174 between the policy 1136 and the edge 1170 between the floor 1132 and the space 1130. In response to identifying the entity 1103 has the ability to book the space 1130, the twin manager 108 can provide an indication to the cloud platform 106.

Furthermore, if the entity makes a request to read events for the space 1130, e.g., the sample 1110 and the sample 1112, the twin manager 108 can identify the edge has 1151 between the entity 1103 and the policy 1136, the edge 1178 between the policy 1136 and the read events 1138, the edge 1174 between the policy 1136 and the floor 1132, the "has_a" edge 1170 between the floor 1132 and the space 1130, the edge 1168 between the space 1130 and the door actuator 1114, the edge 1160 between the door actuator 1114 and the point A 1116, the "has_a" edge 1164 between the point A 1116 and the TS 1120, and the edges 1168 and 1166 between the TS 1120 and the samples 1110 and 1112 respectively.

Referring now to FIG. 12, a graph projection 1200 of the twin manager 108 including application programming interface (API) data, capability data, policy data, and services is shown, according to an exemplary embodiment. The graph projection 1200 includes the nodes and edges described in the graph projection 1100 of FIG. 11. The graph projection 1200 includes a connection broker 1254 related to capabilities 1128 by edge 1298*a*. The connection broker 1254 can be a node representing a software application configured to facilitate a connection with another software application. In some embodiments, the cloud platform 106 can identify the system that implements the capabilities 1128 by identifying the edge 1298*a* between the capabilities 1128 and the connection broker 1254.

The connection broker 1254 is related to an agent that optimizes a space 1256 via edge 1298*b*. The agent represented by the node 1256 can book and cancel bookings for the space represented by the node 1130 based on the edge 1298*b* between the connection broker 1254 and the node 1256 and the edge 1298*a* between the capabilities 1128 and the connection broker 1254.

The connection broker 1254 is related to a cluster 1208 by edge 1298*c*. Cluster 1208 is related to connector B 1201 via edge 1298*e* and connector A 1206 via edge 1298*d*. The connector A 1206 is related to an external subscription service 1204. A connection broker 1210 is related to cluster 1208 via an edge 1211 representing a rest call that the connection broker represented by node 1210 can make to the cluster represented by cluster 1208.

The connection broker 1210 is related to a virtual meeting platform 1212 by an edge 1254. The node 1212 represents an external system that represents a virtual meeting platform. The connection broker represented by node 1210 can represent a software component that facilitates a connection between the cloud platform 106 and the virtual meeting platform represented by node 1212. When the cloud platform 106 needs to communicate with the virtual meeting platform represented by the node 1212, the cloud platform 106 can identify the edge 1254 between the connection broker 1210 and the virtual meeting platform 1212 and select the connection broker represented by the node 1210 to facilitate communication with the virtual meeting platform represented by the node 1212.

A capabilities node 1218 can be connected to the connection broker 1210 via edge 1260. The capabilities 1218 can be capabilities of the virtual meeting platform represented by the node 1212 and can be related to the node 1212 through the edge 1260 to the connection broker 1210 and the edge 1254 between the connection broker 1210 and the node 1212. The capabilities 1218 can define capabilities of the virtual meeting platform represented by the node 1212. The capabilities may be an invite bob command represented by node 1216 and an email bob command represented by node 1214. The capabilities 1218 can be linked to a node 1220 representing a user, Bob. The cloud platform 106 can facilitate email commands to send emails to the user Bob via the email service represented by the node 1204. Furthermore, the cloud platform 106 can facilitate sending an invite for a virtual meeting via the virtual meeting platform represented by the node 1212.

The node 1220 for the user Bob can be associated with the policy 1136 via the "has" edge 1264. Furthermore, the node 1220 can have a "check policy" edge 1266 with a portal node 1224. The portal node 1224 has an edge 1268 to the policy node 1136. The portal node 1224 has an edge 1223 to a node 1226 representing a user input manager (UIM). The UIM node 1226 has an edge 1223 to a device API node 1228. The door actuator node 1114 has an edge 1274 to the device API node 1228. The door actuator 1114 has an edge 1235 to the connector virtual object 1234. The device API node 1228 can be an API for the door actuator 1114.

The device API node 1228 is related to a transport connection broker 1230 via an edge 1229. The transport connection broker 1230 is related to a device hub 1232 via an edge 1278. The device hub represented by node 1232 can be a software component that hands the communication of data and commands for the door actuator 1114. The cloud platform 106 can identify where to store data within the graph projection 1200 received from the door actuator by identifying the nodes and edges between the points 1116 and 1118 and the device hub node 1232. Similarly, the cloud platform 1208 can identify commands for the door actuator that can be facilitated by the device hub represented by the node 1232, e.g., by identifying edges between the device hub node 1232 and an open door node 1252 and an lock door node 1250. The door actuator 114 has an edge "has mapped an asset" 1180 between the node 1114 and a capabilities node 1248. The capabilities node 1248 and the nodes 1252 and 1250 are linked by edges 1296 and 1294.

The device hub 1232 is linked to a cluster 1236 via an edge 1284. The cluster 1236 is linked to connector A 1240 and connector B 1238 by edges 1286 and the edge 1288. The connector A 1240 and the connector B 1238 is linked to an external system 1244 via edges 1288 and 1290. The external system 1244 is linked to a door actuator 1242 via an edge 1292.

Referring now to FIG. 13, a graph projection 1300 of the twin manager 108 including equipment and capability data for the equipment is shown, according to an exemplary embodiment. The graph projection 1300 includes nodes 1302-1356 and edges 1260-1398*f*. The cloud platform 106 can search the graph projection 1300 to identify capabilities of different pieces of equipment.

A building 120 node 1304 represents a particular building that includes two floors. A floor 1 node 1302 is linked to the building 120 node 1304 via edge 1360 while a floor 2 node 1306 is linked to the building 120 node 1304 via edge 1362. The floor 2 includes a particular room 2023 represented by edge 1364 between floor 2 node 1306 and room 2023 node 1308. Various pieces of equipment are included within the room 2023. A light represented by light node 1316, a bedside lamp node 1314, a bedside lamp node 1312, and a hallway light node 1310 are related to room 2023 node 1308 via edge 1366, edge 1372, edge 1370, and edge 1368.

The light represented by light node 1316 is related to a light connector 1326 via edge 1384. The light connector 1326 is related to multiple commands for the light represented by the light node 1316. The commands may be a brightness setpoint 1324, an on command 1326, and a hue setpoint 1328. The cloud platform 106 can receive a request to identify commands for the light represented by the light 1316 and can identify the nodes 1324-1328 and provide an indication of the commands represented by the node 1324-1328 to the requesting entity. The requesting entity can then send commands for the commands represented by the nodes 1324-1328.

The bedside lamp node 1314 is linked to a bedside lamp connector 1381 via an edge 1313. The connector 1381 is related to commands for the bedside lamp represented by the bedside lamp node 1314 via edges 1392, 1396, and 1394. The command nodes are a brightness setpoint node 1332, an on command node 1334, and a color command 1340. The hallway light 1310 is related to a hallway light connector 1346 via an edge 1398*d*. The hallway light connector 1346 is linked to multiple commands for the hallway light node 1310 via edges 1398*g*, 1398*f*, and 1398*e*. The commands are represented by an on command node 1352, a hue setpoint node 1350, and a light bulb activity node 1348.

The graph projection 1300 includes a name space node 1322 related to a server A node 1318 and a server B node 1320 via edges 1374 and 1376. The name space node 1322 is related to the bedside lamp connector 1381, the bedside lamp connector 1344, and the hallway light connector 1346 via edges 1382, 1380, and 1378.

Figure 14:
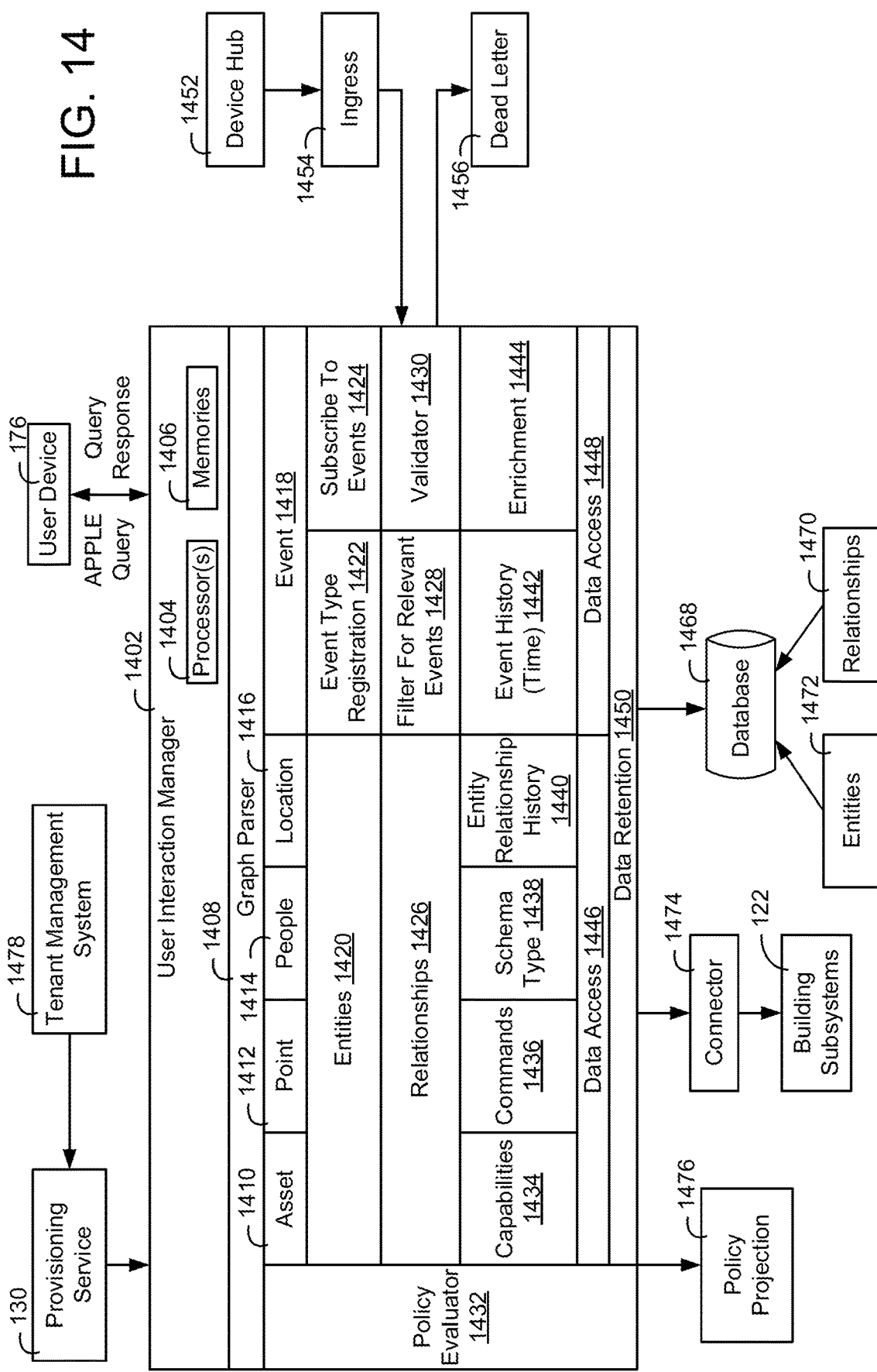
FIG. 14 is a block diagram of a user interaction manager that handles user queries and requests, according to an exemplary embodiment.

Referring now to FIG. 14, a block diagram of a user interaction manager 1402 that handles user queries and requests is shown, according to an exemplary embodiment. The user interaction manager 1402 can be a component of the cloud platform 106. The user interaction manager 1402 in some embodiments, is a system separate from the cloud platform 106. The user interaction manager 1402 includes processor(s) 1404 and memories 1406. The processor(s)

1404 and the memories 1406 can be similar to, or the same as, the processors and memories described with reference to FIG. 1.

The user interaction manager 1402 receives an APPLE query from the user device 176. The user interaction manager 1402 can be configured to query the graph based on the APPLE query and generate a query response based on the APPLE query and return the query response to the user device 176. Although the user device 176 is shown in FIG. 14 to send the APPLE query to the user interaction manager 1402 and receive the query response, any computing system can send a query and receive a query response from the user interaction manager 1402, e.g., the applications 110, the building subsystems 122, etc.

The APPLE query can include an asset parameter 1410, a point parameter 1412, a people parameter 1414, a location parameter 1416, and an event parameter 1418 that a query parser 1408 of the user interaction manager 1402 can utilize in querying a graph projection. The graph parser 1408 can query the graph with entities 1420 and/or relationships 1426 which can indicate capabilities 1434, commands 1436, schema type 1438 and/or entity relationship history 1440.

The user interaction manager 1402 can analyze event type registration 1422, subscriptions to events 1424, filtering for relevant events 1428, validating events 1430, identifying event history 1442, and perform event enrichment 1444. For example, events received at an ingress 1454 from a device hub 1452 can be validated according to a schema. If the validator 1430 determines that the entity is not of a valid schema, the validator 1430 can add the event to a dead letter 1456.

A policy evaluator 1432 of the user interaction manager 1402 can determine whether the user of the user device 176 (or another system or application) has the appropriate policies to view information of the graph and/or make the commands indicated by the user device 176. The policy evaluator 1432 can determine whether or not to implement a command based on command policies for the user device 176 which may be indicated by a graph projection. Furthermore, the policy evaluator 1432 can determine whether or not to respond to a query based on whether the user device 176 has access to view the queried information. The policy evaluator 1432 can be configured to generate a policy projection 1476. Data access 1446 and 1448 can provide access to assets, points, people, locations, and events. The data access 1446 and/or 1448 can retrieve data of the building subsystems 122 via the connector 1474 and/or via the database 1468 including entities 1472 and relationships 1470. A data retention layer 1450 can retain a record of all queries and query responses.

The user interaction manager 1402 can provide a UI for the provisioning service 130 to provision tenants. A tenant management system can provide tenant and/or subscription services for generating new customer subscriptions, e.g., subscriptions for a tenant of a building. Similarly, the provisioning service 130 can receive policies and/or device management commands from the tenant management system 1478 for creating a graph projection for the customer subscription.

Figure 15:
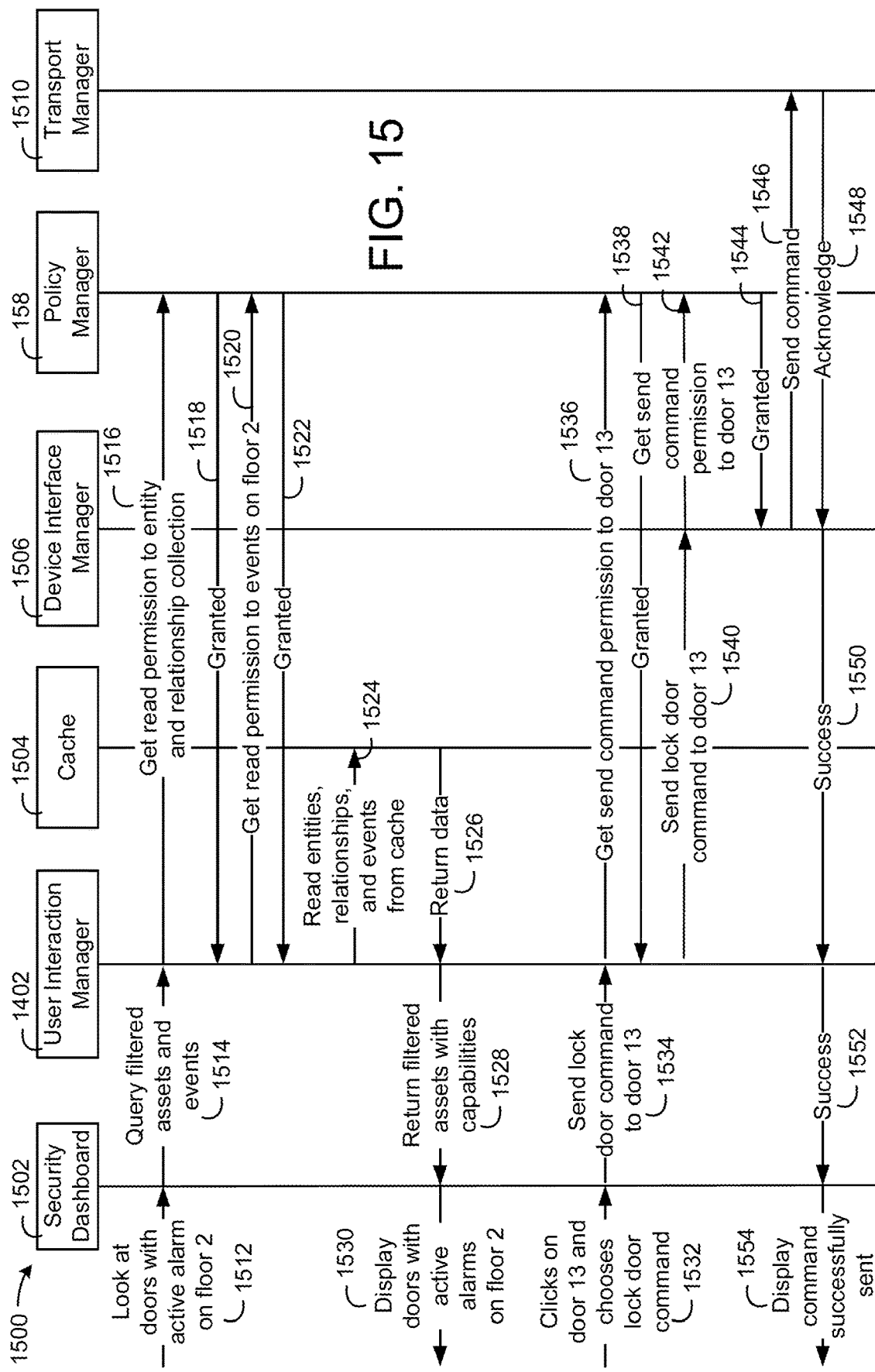
FIG. 15 is a flow diagram of a process of a security dashboard communicating with the building data platform of FIG. 1 to review information about equipment and command the equipment, according to an exemplary embodiment.

Referring now to FIG. 15, a process 1500 of a security dashboard 1502 communicating with the building data platform 100 to review information about equipment and command the equipment is shown, according to an exemplary embodiment. The process 1500 can be performed by the building data platform 100. In some embodiments, the twin manager 108, the applications 110, and/or the cloud platform 106 can perform the process 1500. In FIG. 15, a security dashboard 1502, the user interaction manager 1402, a cache 1504, a device interface manager 1506, the policy manager 158, and a transport manager 1510 are shown to perform the process 1500. The aforementioned components can be components of the applications 110, the twin manager 108, and the cloud platform 106.

In step 1512, the security dashboard 1502 can receive a command from a user to look at doors with active alarms on a particular floor, a second floor of a building. In some embodiments, the security dashboard 1502 is an application run by the applications 110. In some embodiments, the user interacts with the security dashboard 1502 via the user device 176.

In step 1514, the security dashboard 1502 queries the user interaction manager 1402 for assets and events, in particular, doors (assets) with an active alarm (event) on a second floor (asset). In step 1516, the user interaction manager 1402 can get read permissions to an entity and relationship collection from the policy manager 158. The policy manager 158 can determine which entities and/or events the user has access to based on policies indicated by a graph projection of the graph projection database 162. The policy manager 158 can determine whether the user has access to read entities and/or relationships.

In response to the user having access to read the entities and/or relationships, the policy manager 158 can send a granted indication in step 1518 to the user interaction manager 1402. In step 1520, the user interaction manager can get read permissions for events on the second floor from the policy manager 158. The policy manager 158 can determine whether the user has access to the events of the second floor by searching a graph projection and can respond to the user interaction manager 1402 with a granted message in step 1522 in response to determining that the user has access to the events of the second floor.

Responsive to receiving the access to read the entities, relationships, and events of the second floor, the user interaction manager 1402 can read the entities relationships, and events from the cache 1504. In some embodiments, the user interaction manager 1402 can read the entities, relationships, and events from a graph projection in step 1524.

In step 1526, the cache 1504 can return the requested data of the step 1534 to the user interaction manager 1402. In step 1528, the user interaction manager 1402 can return the filtered assets with capabilities of the assets. For example, all doors on the second floor can be returned in step 1528 along with a capability to command each door to lock or unlock. In step 1530, the security dashboard 1502 can display doors with active alarms on the second floor along with capabilities of the doors.

In step 1532, a user can click a particular door displayed in the step 1530, e.g., a door 13, and select the command to lock the door. In step 1534, the security dashboard 1502 can send a lock door command for door 13 to the user interaction manager 1402. The user interaction manager 1402 can get a send command permission for the door 13 from the policy manager 158 in step 1536. The policy manager 158 can determine, based on a graph projection, whether the user has access to command the door 13 to lock. In response to detecting that the user does have a policy to lock the door 13, the policy manager 158 can send a granted message to the device interface manager 1506 in step 1538. The device manager 1506 can send the command to lock the door 13 to a transport manager 1510 in steps 1540-1546. The transport manager 1510 can facilitate the command to lock the door 13. Before implementing the command, the device interface manager 1506 can communicate with the policy manager 158 to verify that the permission to command the door and the policy manager 158 can send a granted message in step 1544 to the device interface manager 1506 in response to determining that the permission exists.

An acknowledge message can be sent to the device interface manager 1506 in step 1548 by the transport manager 1510 indicating that the command has been sent. The device interface manager 1506 can send a success message 1550 to the user interaction manager 1402. The user interaction manager 1402 can send a success message to the security dashboard 1502 in step 1552. The security dashboard 1502 can display a message to the user that the command has been successfully sent to the door 13 in step 1554.

Figure 16:
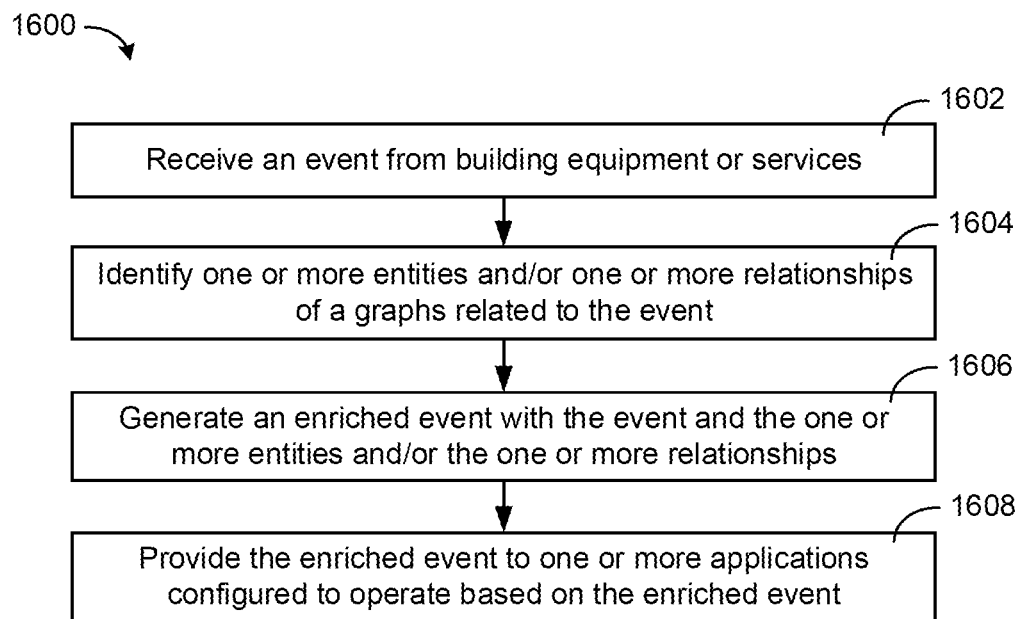
FIG. 16 is a flow diagram of a process where an event of building equipment is enriched with contextual information of a graph that can be performed by the cloud platform of FIG. 1, according to an exemplary embodiment.

Referring now to FIG. 16, a flow diagram of a process 1600 where an event of building equipment is enriched with contextual information of a graph that can be performed by the cloud platform 106 is shown, according to an exemplary embodiment. In some embodiments, the cloud platform 106 can be configured to perform the process 1600. Furthermore, any computing device or system described herein can be configured to perform the process 1600.

In step 1602, the cloud platform 106 receives an event from building equipment or services. In some embodiments, the cloud platform 106 receives non-event data, e.g., a stream of timeseries data, a message, etc. and normalizes the data into event data. The event can include one or more parameters, e.g., a data value (e.g., a temperature, an equipment status, etc.), a time at which the event occurred, etc. In some embodiments, the cloud platform 106 receives the event from an event source, for example, cloud data, NC4, a weather data service, the cloud platform 106 itself (e.g., an event, an enriched event, etc.), and/or any other system or device.

In step 1604, the cloud platform 106 can identify one or more entities and/or one or more relationships of a graph related to the event. The entities could be an indication of a location of the event (e.g., what room, what floor, what building the event occurred in), the building entities that consume the data of the event, other entities affected by the event (e.g., a temperature setpoint change of one room affecting the temperature of an adjacent room), etc. The relationships can indicate how the event is related to the entities. For example, a relationship, "isLocatedIn," could be added to indicate that the sensor producing the event is located in a specific space.

In some embodiments, the cloud platform 106 identifies the one or more entities and the one or more relationships from a graph projection. The graph projection can be a graph projection specific to a particular subscriber (e.g., user or organization) of the cloud platform 106. In some embodiments, the cloud platform 106 receives the graph projection from the graph projection database 162.

In step 1606, the cloud platform 106 generates an enriched event with the event and the one or more entities and the one or more relationships of the step 1604. The cloud platform 106 can add multiple attributes to the event based on the entities and the relationships. In some embodiments, the cloud platform 106 generates an enriched event package including all of the data of the enriched event and the one or more entities and one or more relationships identified in the step 1604.

In step 1608, the cloud platform 106 can provide the enriched event of the step 1066 to one or more applications configured to operate based on the enriched event. In some embodiments, the applications 110 can receive the enriched event and operate based on the data of the event and the contextual information (e.g., the entities and relationships) enriching the event. For example, for an application that controls the temperature of a space, an enriched event can include a temperature measurement of the space in addition to an identification of the space and the VAV box for the space. The application can generate a command for the VAV box based on the temperature measurement and communicate the temperature measurement to the identified VAV box of the enriched event.

Figure 17:
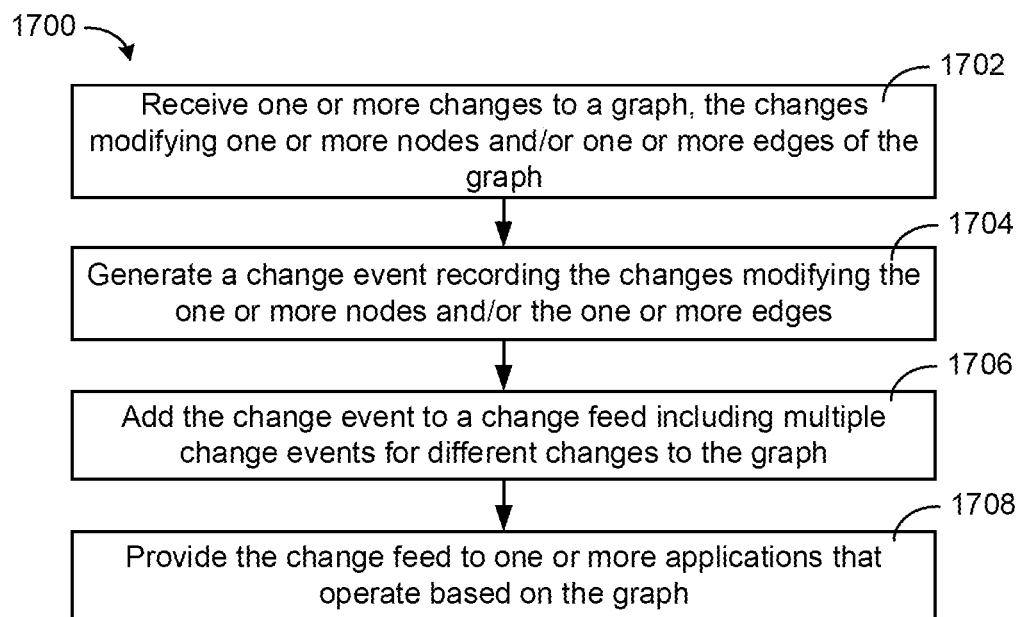
FIG. 17 is a flow diagram of a process where a change feed of events that record modifications to a graph that can be performed by the twin manager of FIG. 1, according to an exemplary embodiment.

Referring now to FIG. 17, a process 1700 where a change feed of events that record modifications to a graph that can be performed by the twin manager 108 is shown, according to an exemplary embodiment. The twin manager 108 can be configured to perform the process 1700. In some embodiments, components of the twin manager 108 are configured to perform the process 1700, for example, the change feed generator 152 and/or the graph projection database 162. In some embodiments, any computing device described herein is configured to perform the process 1700.

In step 1702, the twin manager 108 receives one or more changes to a graph. The changes may modify one or more nodes or one or more edges of the graph. For example, the changes may be to add a new node or edge, delete an existing node or edge, or modify an existing node or edge of the graph. In some embodiments, the modification is received by the twin manager 108 from the user device 176, e.g., the user provides the twin manager 108 with a modification to a graph. In some embodiments, the modification is received as an event indicating a change to the graph, e.g., event is metadata 320 or the device tree 322.

In step 1704, the twin manager 108 generates a change feed event recording the changes modifying the one or more nodes and/or the one or more edges. The event can be a data package of information including an event time, a time at which the event occurred. In some embodiments, the event includes an indication of how the graph has changed, e.g., what nodes and/or edges of the graph have changed and how those nodes and/or edges have changed. The twin manager 108 can implement the changes of step 1702 to the graph and also generate an event recording the change to the graph.

In step 1706, the twin manager 108 can add the event to a change feed. The change feed can include multiple change events for different changes to the graph. The change feed may be a topic that some applications and/or systems subscribe to, e.g., the applications 110. In step 1706, one or more applications that operate based on the graph can receive the change feed. In this regard, the applications and/or systems can receive the change feed event and update their storage of the graph based on the change feed. This can allow the application and/or system to update their graph without receiving the entire graph, just an indication of the change. Furthermore, the twin manager 108 and/or any other system can generate the graph at one or more different times based on the events of the change feed to track the configuration of the graph at multiple different times.

Figure 18:
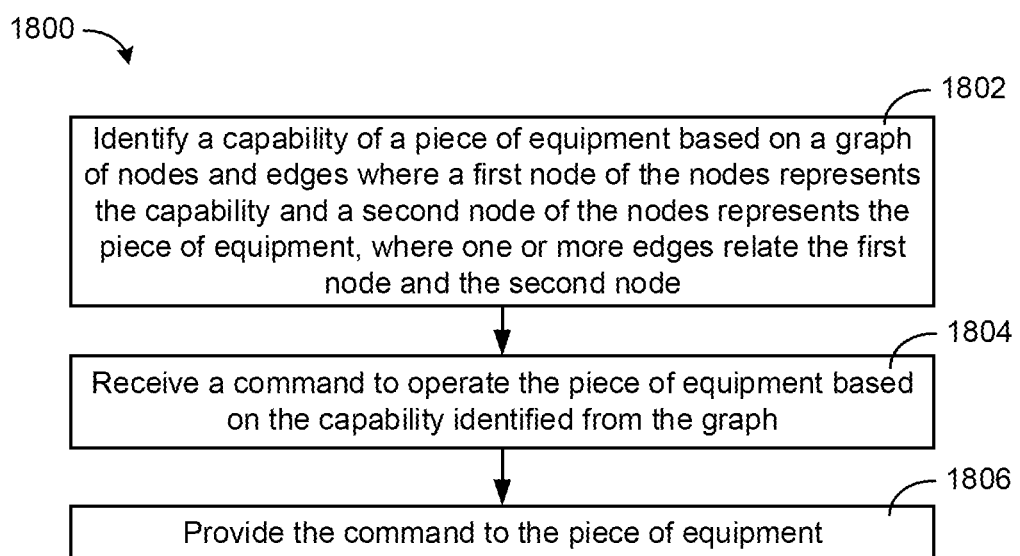
FIG. 18 is a flow diagram of a process where a graph identifying capabilities of a piece of equipment is used to operate the piece of equipment that can be performed by the cloud platform of FIG. 1, according to an exemplary embodiment.

Referring now to FIG. 18, a flow diagram of a process 1800 where a graph identifying capabilities of a piece of equipment is used to operate the piece of equipment that can be performed by the cloud platform 106 is shown, according to an exemplary embodiment. In some embodiments, the cloud platform 106 is configured to perform the process 1800. In some embodiments, a component of the cloud platform 106, e.g., the command processor 136 is configured to perform the process 1800. Any computing device described herein can be configured to perform the process 1800.

In step 1802, the cloud platform 106 can identify a capability of a piece of equipment based on a graph of nodes and edges where a first node of the nodes represents the capability and a second node of the nodes represents the piece of equipment where one or more edges relate the first node and the second node. In some embodiments, the cloud platform 106 may receive a request for information about the capabilities of a piece of equipment, e.g., from a user request via the user device 176 or from a device of the building subsystems 122 (e.g., a thermostat may request to control a VAV box). The cloud platform 106 can identify the capabilities, the operational commands that the piece of equipment can perform by identifying capability nodes related to a node of the piece of equipment through one or more edges and/or nodes between the nodes for the capabilities and the node for the piece of equipment. The cloud platform 106 can analyze a graph projection received from the twin manager 108 to identify the capabilities.

In some embodiments, an entity can have capabilities originating from different systems. For example, a room could be an entity with a capability for temperature control, based on HVAC systems for the room. The room could also have a booking capability to reserve the room based on a room booking and/or meeting scheduling system.

In step 1804, the cloud platform 106 can receive a command to operate the piece of equipment based on the capability identify from the graph in the step 1802. In some embodiments, the cloud platform 106 communicates the capability to the requesting entity, e.g., the user device 176, the applications 110, a device of the building subsystems 122, etc. The requesting entity can review the capability and issue a command for the capability.

In step 1806, the cloud platform 106 can provide the command to the piece of equipment. In some embodiments, the cloud platform 106 identifies a software component configured to manage messaging for the piece of equipment. The cloud platform 106 may identify the software component from the graph. For example, a node of the graph may represent the software component and one or more edges or nodes may relate the software component node and the node representing the piece of equipment. The cloud platform 106 can identify the software component by identifying the edges and/or nodes relating the software component node and the node representing the piece of equipment. The cloud platform 106 can provide the command to the software component to handle commanding the piece of equipment.

Figure 19:
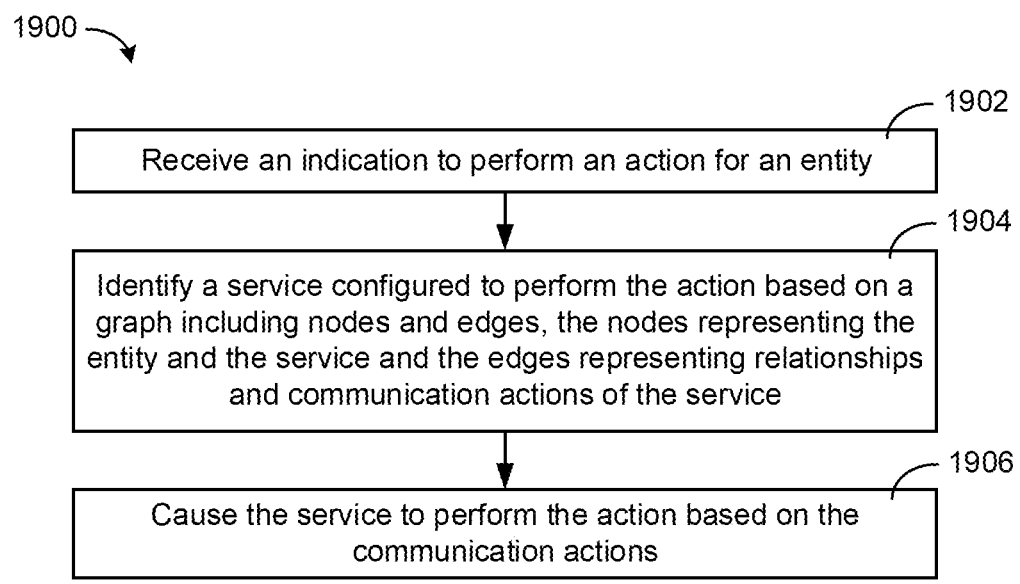
FIG. 19 is a flow diagram of a process where the cloud platform of FIG. 1 operates different services related by a graph, according to an exemplary embodiment.

Referring now to FIG. 19, a process 1900 where the cloud platform 106 operates different services related by a graph is shown, according to an exemplary embodiment. In some embodiments, the process 1900 is performed by the cloud platform 106. In some embodiments, any computing device described herein is configured to perform the process 1900.

In step 1902, the cloud platform 106 receives an indication to perform an action for an entity. The action could be controlling a piece of building equipment. Implementing a command with an external system, e.g., generating a virtual meeting via a virtual meeting platform, send an email via an email service, etc.

In step 1904, the cloud platform 106 can identify a service configured to perform the action based on a graph including nodes and edges. For example, if the command is to send an email, the cloud platform 106 may identify an email service by identifying an email service node of the graph. If the action is to command a piece of building equipment to operate, the cloud platform 106 could identify a node of the graph representing a device hub that handles messages for the piece of building equipment.

The nodes of the graph can represent various devices or software components. The edges can represent communication actions between the various devices or software components. For example, the edges could represent API calls between the various software components. Referring to FIG. 12, API calls may exist for a device hub 1232 to implement a control command for a door actuator 1242. The API calls may be between other connecting software components, e.g., cluster 1236, connector A 1240, connector B 1238, and external system 1244. To implement a control command for door actuator 1242, the device hub 1232 may make an API call 1284 to the cluster 1236 which may in turn make API calls 1286 and/or 1288 to connectors A 1240 and connector B 1238. Connector A 1240 may make an API call to external system 1244, API call 1288. Similarly, connector B 1238 may make an API call 1290 to external system 1244. External system 1244 may make an API call 1292 to the door actuator 1242 to implement the requested command.

Similarly, if the command is to send an email via the email service 1204, a connection broker 1254 may broker the connection for the cloud platform 106 with the email service 1204 and may make one or more API calls to implement the email command. The connection broker 1254 may make an API call 1298C to the cluster 1208 which may make an API call 1298d to a connector A that makes an API call 1298f with the email service 1204 to send an email.

In step 1906, the cloud platform 106 causes the service identified in step 1904 to perform the operation based on the communication actions represented by the edges. For example, the cloud platform 106 can identify a set of API calls that implement the action. The API calls can be identified in part based on the graph. For example, to implement sending an email, the cloud platform 106 can identify API call 1298c make by connection broker 1254, API call 1298d made by cluster 1208, and API call 1298f made by connector A 1206. The cloud platform 106 can cause each service (i.e., connection broker 1254, cluster 1208, and connector A 1206) to make the appropriate API call to implement the action.

Figure 20:
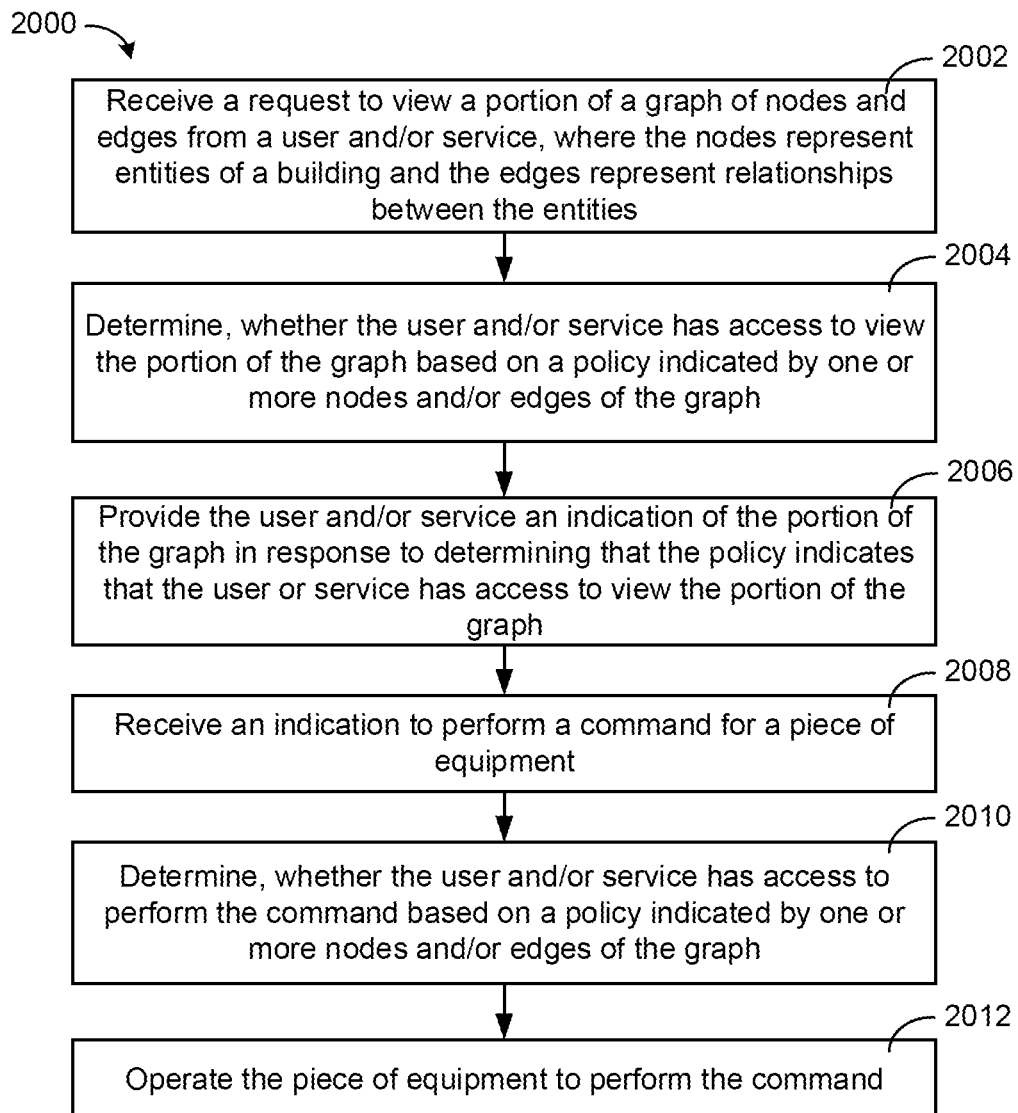
FIG. 20 is a flow diagram of a process where a user or service is provided with information and control abilities based on policies stored within a graph that can be performed by the cloud platform of FIG. 1, according to an exemplary embodiment.

Referring now to FIG. 20, a process 2000 where a user or service is provided with information and control abilities based on policies stored within a graph that can be performed by the cloud platform 106 is shown, according to an exemplary embodiment. The cloud platform 106 can be configured to perform the process 2000. In some embodiments, any computing device or system described herein can be configured to perform the process 2000.

In step 2002, the cloud platform 106 receives a request to view a portion of a graph of nodes and edges from a user and/or service. The nodes can represent entities of a building while the edges can represent relationships between the entities of the building. The request can be received from a user via the user device 176. The request can be received from the applications 110 and/or the building subsystems 122, in some embodiments.

In step 2004, the cloud platform 106 can determine whether the user and/or service has access to view the portion of the graph based on a policy indicated by one or more nodes and/or relationships of the graph. For example, the graph can indicate a policy for viewing information of the graph. For example, referring to FIG. 11, an entity 1103 has 1151 the policy 1136 to read events 1138 to the floor 1132. In this regard, if the user and/or service is the entity with a policy to read events, the user and/or service could view the events 110 and/or 1112.

The policy of the user and/or service could cascade through the graph, for example, if the user and/or service has a policy to read information for a higher level node, lower level nodes are also available to the user and/or service. For example, the cloud platform 106 could identify that the entity 1103 has 1151 the policy 1136 to the floor 1132 via edge 1174. Because the door actuator 1114 is an asset of the space 1130 indicated by the edge 1168 and that the space 1130 is a space of the floor 1132 indicated by the edge 1170, the cloud platform 106 can identify that the entity 1103 has access to the events of the door actuator 1114.

In step 2006, the cloud platform 106 can provide a user and/or service an indication of the portion of the graph in response to determining that the policy indicates that the user and/or service has access to view the portion of the graph. The cloud platform 106 can cause a display device of the user device 176 to display the indication of the portion of the graph in some embodiments. In step 2008, the cloud platform 106 can receive a command for a piece of equipment. The command may be a command to operate the piece of equipment, in some embodiments. In some embodiments, the command is a command to perform an action on behalf of a user, e.g., send an email to a user, schedule a meeting with the user, etc.

In step 2010, the cloud platform 106 can determine whether the user or service has access to perform the command based on a policy indicated by one or more nodes and/or edges of the graph. For example, a policy of the graph can indicate that the user and/or service has access to operate the piece of equipment.

For example, referring to FIG. 12, the user bob 1220 has a send command policy for a particular floor, e.g., Bob 1220 has 1264 policy 1136 for the send command 1140 via the edge 1178. The policy 1136 is set for the floor 1132 via the edge 1174. Because the entity 1103 has a send command policy for the floor 1132, any piece of equipment on the floor can be commanded by the entity 1103. For example, the door actuator 1114 is a piece of equipment of a space 1130 indicated by edge 1168. The space 1130 is a space of the floor 1132 indicated by the edge 1170. The door actuator 1114 has a capability 1248 indicated by edge 1180, the command can be an open door command 1252 or a lock door command 1250 related to the capabilities 1248 of the door actuator 1114 via the edges 1296 and 1294.

The cloud platform 106 can determine that the user Bob 1220 has the ability to command the door actuator 1114 via the relationships between the door actuator 1114 and the floor 1132 that the policy 1136 is set for. Because the user Bob 1220 has the ability to make commands for the floor 1132, all components related to the floor 1132, e.g., are located on the floor 1132, can be available to the user, e.g., the door actuator 1114 being a device of the space 1130 via the edge 1168 and the space 1130 being an area of the floor 1132 via the edge 1170.

In step 2012, the cloud platform 106 can operate the piece of equipment to perform the command. The cloud platform 106 can, in some embodiments, identify the services and/or communication actions to implement the command as described in FIG. 19. For example, the cloud platform 106 can utilize the graph to identify the services that handle messaging for the devices and can identify the communication actions that the service performs to implement the command.

Figure 21:
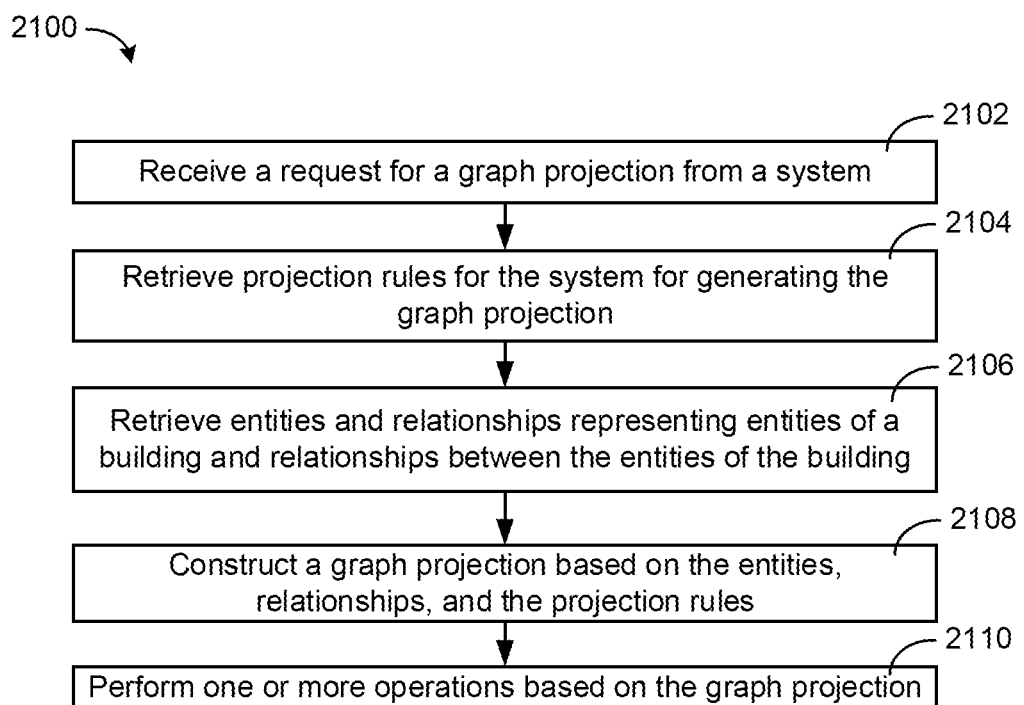
FIG. 21 is a flow diagram of a process where a graph projection is constructed for a system based on projection rules, according to an exemplary embodiment.

Referring now to FIG. 21, a process 2100 where a graph projection is constructed by the twin manager 108 is shown, according to an exemplary embodiment. In some embodiments, the twin manager 108 is configured to perform the process 2100. In some embodiments, components of the twin manager 108, e.g., the graph projection manager 156, is configured to perform the process 2100. In some embodiments, any computing device described herein is configured to perform the process 2100.

In step 2102, the twin manager 108 can receive a request for a graph projection from a system. For example, a user via the user device 176 may request a graph projection be generated. In some embodiments, the cloud platform 106 receives an indication of a new subscribing customer and the cloud platform 106 provides a request to the twin manager 108 to generate a new projection for the subscribing customer. In some embodiments, the twin manager 108 receives a request from the applications 110 for a graph projection to be generated for a specific application of the applications 110.

In step 2104, the twin manager 108 retrieves projection rules for the system for generating the graph projection. The projection rules can be an ontology specific for the system. For example, the ontology can define what types of nodes can be related in what particular ways. For example, one ontology may indicate that one type of node (e.g., thermostat) should be related to another type of node (e.g., a space). The ontology can indicate each type of node and what second types of nodes that each type of node can be related to. Furthermore, the projection rules can indicate policies for the system. For example, the projection rules can identify what nodes and/or edges that the system has access to view.

In step 2106, the twin manager 108 can retrieve entities and/or relationships representing entities of a building and relationships between the entities of the building. The twin manager 108 can retrieve all entities and/or relationships from the entity, relationship, and event database 160. In some embodiments, the twin manager 108 retrieves only the entities and/or relationships that the projection rules indicate should be included within the projection graph, e.g., only entities and/or relationships that correspond to the ontology or only entities and/or relationships that the system has an access policy to.

In step 2108, the twin manager 108 can construct the graph projection based on the entities and relationships retrieved in the step 2106 and the projection rules retrieved in the step 2104. In some embodiments, the twin manager 108 can construct the graph projection by generating nodes for the entities and generating edges between the nodes to represent the relationships between the entities.

In some embodiments, the twin manager 108 generates the graph projection based on the ontology. For example, the ontology may indicate that building nodes should have an edge to room nodes. Another ontology may indicate that building nodes should have an edge to floor nodes and floor nodes should have an edge to room nodes. Therefore, for entity data that indicates a building A has a floor A and that floor A has a room A, with the first ontology, a node for the building A can be generated along with an edge from the building A node to a room A node. For the second ontology, a building A node with an edge to a floor A node can be generated. Furthermore, the floor A node can have an edge to a room A node.

In step 2110, the building data platform 100 can perform one or more operations based on the graph projection. In some embodiments, the building data platform 100 can perform event enrichment with contextual information of the graph projection (e.g., as described in FIG. 16). In some embodiments, the building data platform 100 can generate a change feed based on changes to the graph projection (e.g., as described in FIG. 17). In some embodiments, the building data platform 100 can utilize the graph projection to command and control entities represented by the graph projection (e.g., as described in FIG. 20). In some embodiments, the building data platform 100 can utilize the graph projection to identify services and/or communication commands to implementations (e.g., as described in FIG. 19).

Figure 22:
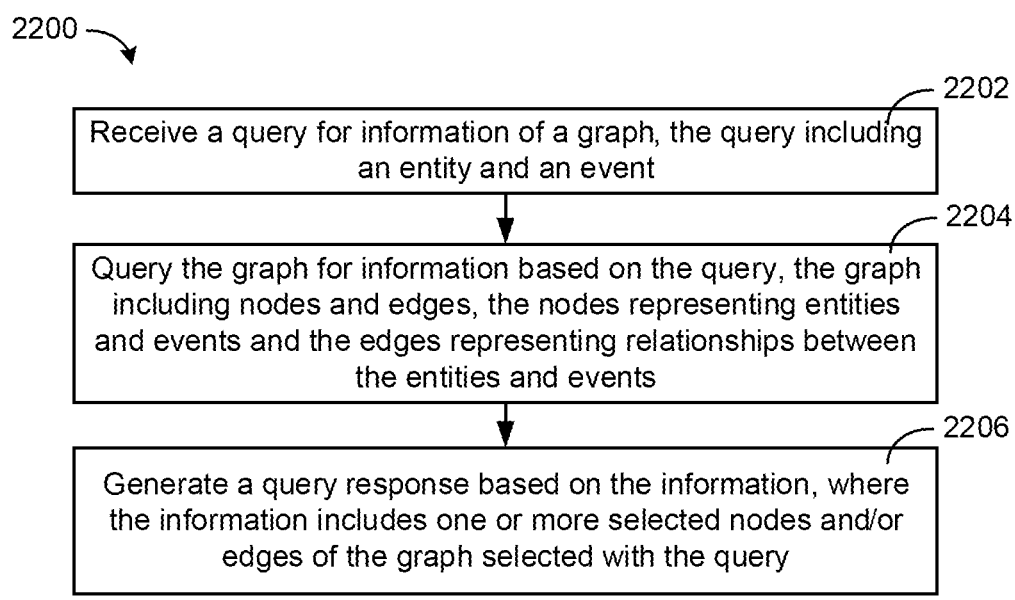
FIG. 22 is a flow diagram of a process where a graph is queried based on entity and event, according to an exemplary embodiment.

Referring now to FIG. 22, a process 2200 where a graph is queried based on an entity and an event is shown, according to an exemplary embodiment. The cloud platform 106 can be configured to perform the process 2200. In some embodiments, any computing device described herein can be configured to perform the process 2200.

In step 2202, the cloud platform 106 receives a query for information of a graph, the query including an entity and an event. The query can be formed from parameters for an asset, point, place, location, and event ("APPLE"). The query can indicate an entity, one of an asset, point, place, and location while the query can further indicate an event. In this regard, the query can search for certain entities with a particular event, for example, a floor (type of asset) with an active door alarm (event), a door (type of asset) with an active door alarm (event), a building (type of asset) with a temperature measurement exceeding a particular amount (event), etc.

In step 2204, the cloud platform 106 queries the graph for information based on the query received in the step 2202 where the graph includes nodes and edges, the nodes representing entities and events and the edges representing relationships between the entities and the events. For example, the query can be run against the graph to identify an entity associated with a particular event.

For example, referring now to FIG. 11, if the query is to find a space with a door actuator value of 1 at a particular time, "a," the cloud platform 106 can be configured to search the edges and nodes to first all spaces within the graph. Next, the cloud platform 106 can select spaces of the graph that are linked to an event node for a door actuator with a value of 1 at a particular time, "a." For example, the cloud platform 106 can determine that the space 1130 has an edge 1168 to the door actuator 1114 and that the door actuator 1114 has an edge 1160 to a point A 1116 and that the point A 1116 has an edge to the TS 1120 which in turn has an edge 1168 to the event node 1110 which has a value of 1 at a time "a."

In step 2206, the cloud platform 106 can generate a query response based on the information queried in the step 2204. The query response can include one or more nodes and/or edges of the graph selected by the query. For example, the query response could identify the entity of the query. Furthermore, the query response could identify the entity of the query and one or more nodes and/or edges relating the entity to the event of the query. The cloud platform 106 can return the query response to a system that originally made the query, e.g., to the user device 176, the applications 110, the building subsystems 122, etc.

Figure 23:
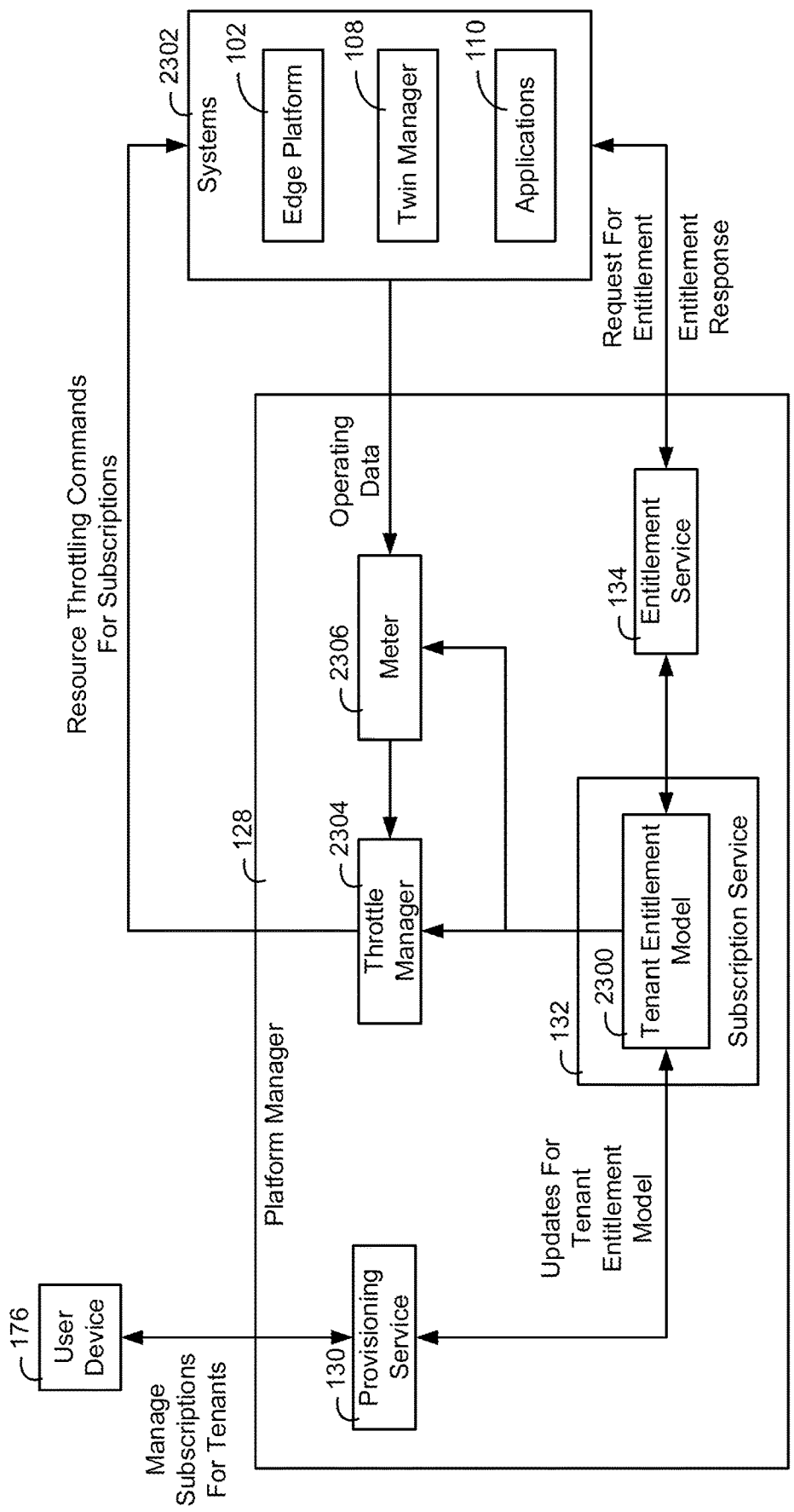
FIG. 23 is a block diagram of a platform manager of the cloud platform of FIG. 1 managing tenant and subscription entitlements with a tenant entitlement model, according to an exemplary embodiment.

Referring now to FIG. 23, the platform manager 128 of the cloud platform 106 managing tenant and subscription entitlements with a tenant entitlement model 2300 is shown, according to an exemplary embodiment. The platform manager 128 can be configured to manage entitlements of various tenants and/or tenant subscriptions for the building data platform 100. The provisioning service 130 can receive data from a user device 176 to create, end, or update a tenant and/or tenant subscription. The provisioning service 130 can cause the subscription service 132 to update the tenant entitlement model 2300 appropriately.

In some embodiments, the provisioning service 130 is configured to handle license purchases and/or license activation for a tenant and/or tenant subscription. A user, via the user device 176, can purchase a license for a particular tenant subscription through the provisioning service 130. Responsive to the purchase of the license, the provisioning service 130 can add the entitlement for the tenant subscription to the tenant entitlement model 2300, activating the license purchased.

The tenant entitlement model 2300 can indicate tenants, each tenant indicating a billing boundary. Each tenant can further include one or multiple subscriptions, particular implementations of the building data platform 100 for the tenant. For example, a retail chain that includes multiple stores could be a tenant while each store could have a particular subscription. Each subscription can be tied to a particular geographic operating zone, e.g., an indication of computing resources within the geographic operating zone that the subscription utilizes. Each subscription can further indicate entitlements for the subscription, e.g., services, data, or operations of the building data platform 100 that the subscription is authorized to utilize.

The entitlement service 134 can receive requests for entitlements from systems 2302 (e.g., the edge platform 102, the twin manager 108, and/or applications 110). The request may be a question whether a particular subscription has authorization for a particular entitlement, for example, the question could be whether a particular subscription has access to make a command responsive to systems 2302 requesting to make the command. In some embodiments, while the systems 2302 are operating (e.g., processing a control command, enriching an event, generating a user interface, performing a control algorithm), they may encounter an action that requires an entitlement. Responsive to encountering the action requiring the entitlement, the systems 2302 can communicate with the entitlement service 134 to determine whether the particular subscription that the systems 2302 are performing the action for has an entitlement for the action.

The platform manager 128 includes a throttle manager 2304 configured to perform throttling operations for particular tenants and/or tenant subscriptions. For example, a particular tenant may have an entitlement to make a certain number of commands per minute, receive a certain amount of event data from building systems a minute, utilize a particular amount of processing power to run applications, etc. The throttle manager 2304 can receive operating data from the systems 2302, in some embodiments through a meter 2306 of the platform manager 128. In some embodiments, the meter 2306 receives the operating data, analyzes the operating data to determine metrics (e.g., commands per minute, storage utilized, etc.) for particular tenant subscriptions.

The throttle manager 2304 can communicate a resource throttling command for particular customer subscriptions to the systems 2302. For example, if a customer subscription has an entitlement for a particular number of event enrichment operations and the operating data indicates that the particular number of event enrichment operations have been performed, the throttle manager 2304 can send a throttle command for event enrichment (e.g., stop all enrichment for the tenant subscription, cause the enrichment to be slowed, etc.). In some embodiments, the throttle manager 2303 could slow down operating commands of a particular tenant subscription in response to receiving more than a particular number of requests to perform operating commands in a particular time period (e.g., 1,000 requests in a minute).

The meter 2306 can be configured to generate metrics indicating the operations of the systems 2302 for the tenant subscriptions and/or for the tenants. The meter 2306 can receive the operating data from the systems 2302 and determine which tenant subscription the operating data is associated with. For example, the systems 2302 may record which tenant subscription is associated with the operating data and provide an indication of the tenant subscription to the meter 2306. The operating data can be a control command, an amount of events received by the systems 2302 from building systems of a building, etc. The metrics generated by the meter 2306 can indicate computational resources used by particular tenant subscriptions, storage resources used by particular tenant subscriptions, number of computing request or commands made, etc. In some embodiments, the meter 2306 is configured to generate a bill for particular tenants and/or tenant subscriptions based on the metrics to scale bills of tenant subscriptions based on their usage of the systems 2302.

In some embodiments, the meter 2306 generates metrics for one or multiple tenant subscriptions. The metrics can be API request per second, day, month, and total amount of data transferred. The metrics can indicate number of messages processed and/or computational cycles used. The metrics can indicate amount data storage used and/or amount of data persisted. The metrics can indicate events per second, per day, and/or per month. Furthermore, the metrics can indicate event subscriptions per second, per day, and/or per month. A tenant may have one or multiple event subscriptions indicating how the data platform 100 handles and/or enriches particular events.

Figure 24:
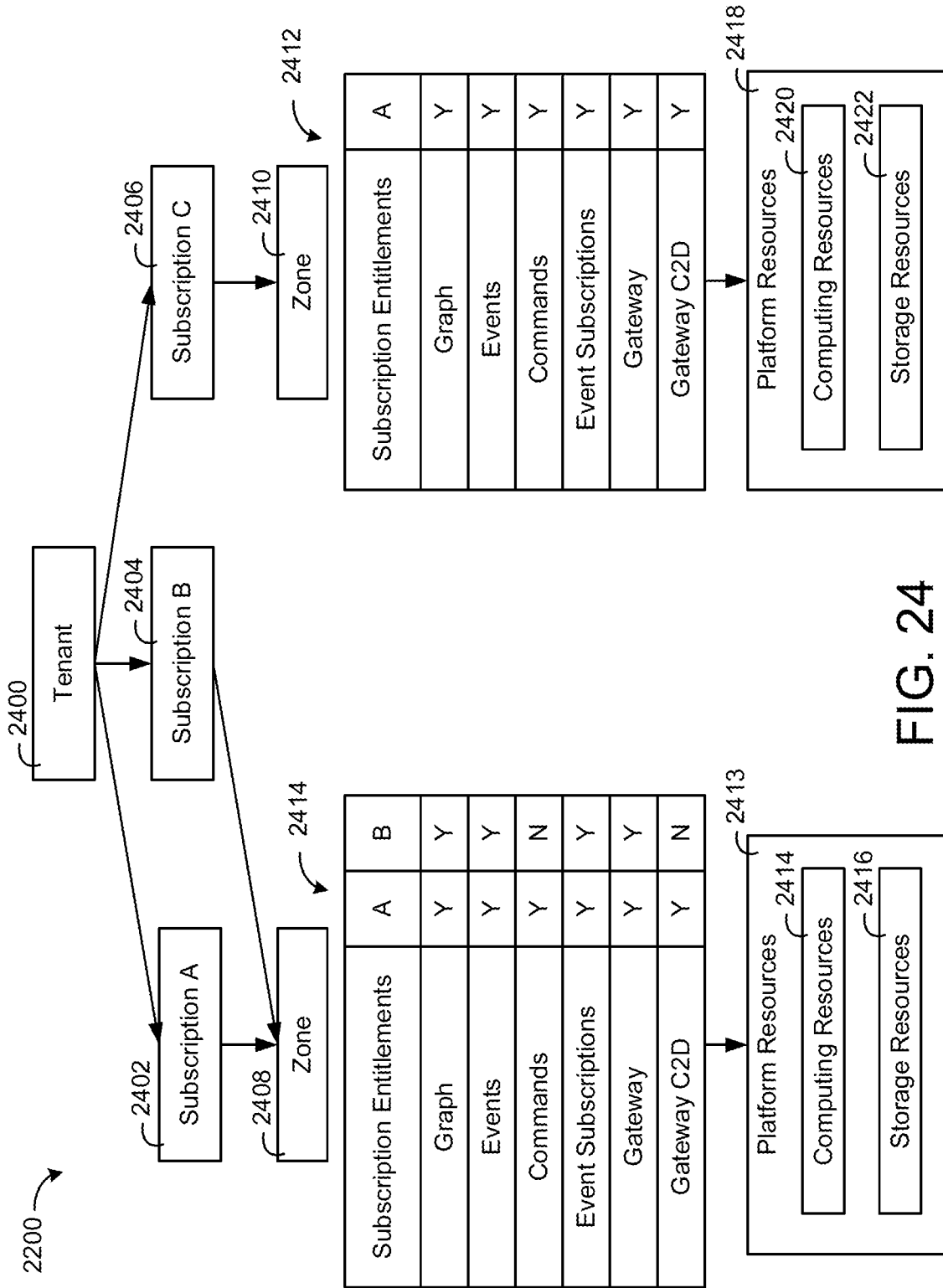
FIG. 24 is a block diagram of the tenant entitlement model in greater detail, according to an exemplary embodiment.

Referring now to FIG. 24, the tenant entitlement model 2200 shown in greater detail, according to an exemplary embodiment. In some embodiments, the tenant entitlement model 2200 is a graph data structure, one or more tables, or other data storage structures. The tenant can be a billing boundary. The tenants can have multiple subscriptions, e.g., multiple sites of a single entity, multiple floors of a building rented to various companies, etc. The tenant 2400 is shown to include three separate subscriptions, subscription A 2402, subscription B 2404, and subscription C 2406. The tenant 2400 can be a particular account associated with a globally unique identifier (GUID) linked to particular subscription identifiers.

Each of the subscriptions 2402-2406 can be associated with a particular geographic zone, e.g., zone 2408 and zone 2410. The zones can be particular geographic regions such as cities, counties, states, countries, continents, country groupings (e.g., Asia Pacific (APAC), Europe, the Middle East and Africa (EMEA), etc.), etc. Each of the subscriptions 2402-2406 can be linked to one of the zones 2408 and 2410. Each of the geographic zones 2408 and 2410 can be associated with computational resources (e.g., servers, processors, storage devices, memory, networking infrastructure, etc.) located within each of the zones for implementing the building data platform 100. The computational resources within each zone can be shared amount subscriptions for the zone.

In some embodiments, the building data platform 100 can implement DNS style data routing to the computational resources of the zones based on subscription identifiers for the subscriptions 2402-2406. The zones 2408 and 2410 can resolve data residency concerns, e.g., that data of a particular subscription does not leave a particular geographic district, e.g., leave a country.

Each of the zones 2408 and 2410 can indicate entitlements for subscriptions linked to the zones 2408 and 2410. For example, a table 2414 can indicate entitlements for the subscription A 2402 and the subscription B 2404 linked to the zone 2408. A table 2412 can indicate entitlements for subscriptions of the zone 2410, e.g., the subscription C 2406.

The tables 2414 and 2412 can indicate all entitlements offered by the building data platform 100 for the particular zone and whether each subscription has authorization for the particular entitlement. The entitlements can indicate what services, resources, and/or what computing, storage, and/or networking usage levels the subscriptions 2402-2406 are entitled to.

For example, the building data platform 100 includes platform resources 2413 and 2418 for the zones 2408 and 2410 respectively. In the zone 2408, the platform resources 2413 include computing resources 2414 and storage resources 2416. In the zone 2410, the platform resources 2418 include computing resources 2420 and storage 2422. The building data platform 100 can facilitate resource scaling providing the subscription A 2402 and the subscription B 2404 various amounts of the platform resources 2413 according to entitlements for the subscription A 2402 and the subscription B 2404 respectively. Each subscription can be assigned an amount of resource based on whether the subscription is assigned, via the entitlements, a premium resource usage tier or a lower level resource usage tier.

The entitlements can be a set of available capabilities within one of the zones 2408 and 2410 that the subscriptions 2402-2406 are assigned or are not assigned. The entitlements can be availability of the graph, events, commands, event subscriptions, gateway operations, and/or gateway cloud to device (C2D) communication. In some embodiments, the ability to create an event subscription, e.g., an ER collection, graph, and/or enrichment rule for a particular event or type of events can be available to some subscriptions but not to others. The platform manager 128 can provide an API, e.g., through the provisioning service 130, the subscription service 132, and/or the entitlement service 134, for managing the entitlements of the tenant entitlement model 2300.

Figure 25:
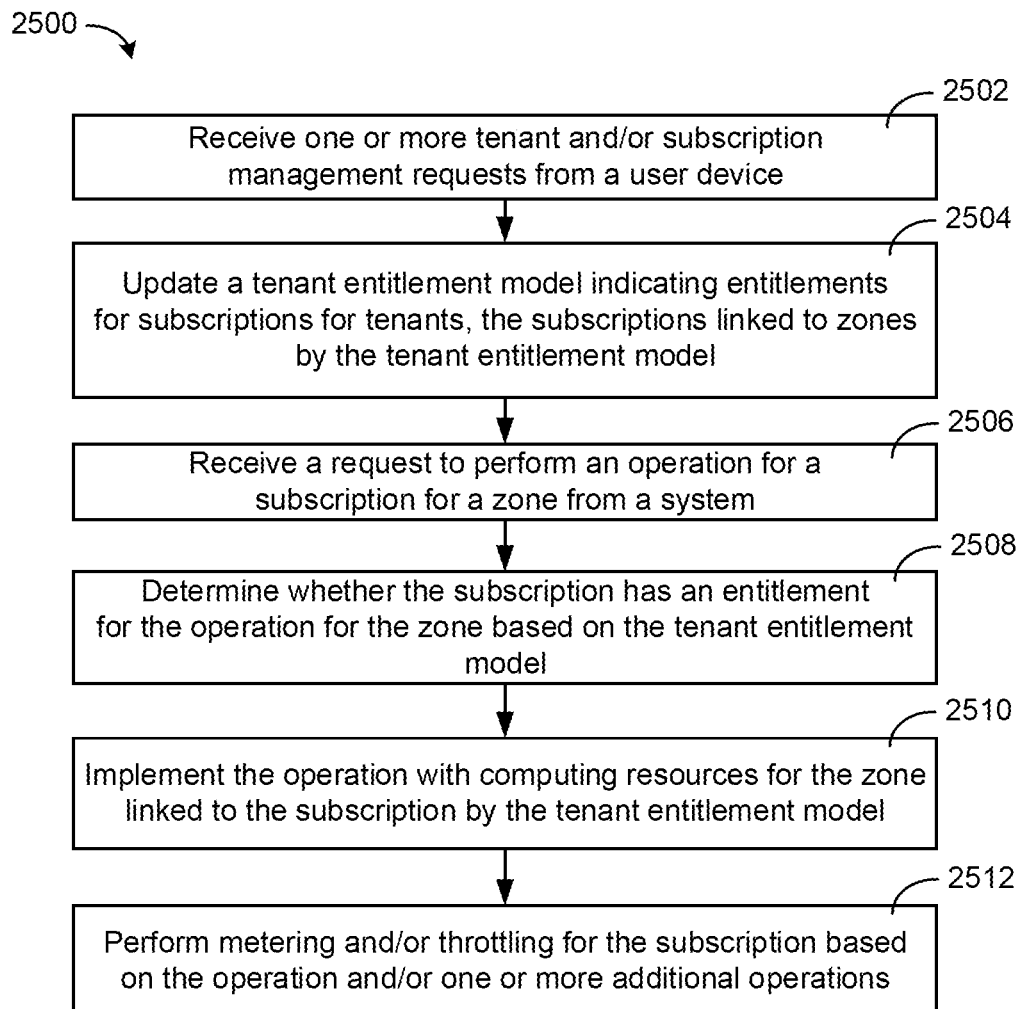
FIG. 25 is a flow diagram of a process of managing tenant and subscription entitlements with the tenant entitlement model, according to an exemplary embodiment.

Referring now to FIG. 25, a process 2500 of managing tenant and subscription entitlements with the tenant entitlement model 2300 is shown, according to an exemplary embodiment. In some embodiments, the platform manager 128 is configured to perform the process 2500. Any computing device or system described herein can be configured to perform the process 2500, in some embodiments.

In step 2502, the platform manager 128 is configured to receive one or more tenant and/or subscription management requests from the user device 176. For example, the requests can be to create a new tenant and/or new subscription for a tenant, remove an existing tenant and/or existing subscription, update entitlements for subscriptions, etc. In some embodiments, the requests are associated with purchases, e.g., purchasing an entitlement for a particular subscription. In some embodiments, the request can indicate management of subscription zone relationships, e.g., a management of what zone an existing or new subscription is set for. In some embodiments, the entitlements set for the subscription are limited to the entitlements available for a particular zone that the subscription is linked to. In step 2504, the platform manager 128 can update the tenant entitlement model 2300 based on the request received in the step 2502.

In step 2506, the platform manager 128 receives a request to perform an operation for a subscription for a zone from one of the systems 2302. For example, one of the systems 2302 can provide the request to the platform manager 128 to determine whether an operation is available for a subscription. For example, the twin manager 108 may process a command request to command a particular piece of equipment of the building subsystems 122 for a particular subscription. The twin manager 108 can send a request to the platform manager 128 for confirmation of whether the subscription has a command entitlement for a particular zone.

In response to receiving the request of the step 2508, the platform manager 128 can determine whether the subscription has the entitlement for the operation for the zone based on the tenant entitlement model 2200. For example, the platform manager 128 can search entitlements for the particular zone that the subscription is linked to in order to determine whether the subscription has the entitlement for the operation. The platform manager 128 can respond to the system with an indication of whether or not the subscription has the entitlement.

In step 2510, the building data platform 100 can implement the operation with computing resources for the zone linked to the subscription by the tenant entitlement model. For example, the platform manager 128 can respond to the system where the system is a component of the building data platform 100 with an indication that the subscription has the entitlement. The system can proceed with performing the operation. Furthermore, the subscription may be tied to a zone which is linked to computing resources of the building data platform 100. The operation can be performed on the computing resources tied to the zone.

In step 2512, the platform manager 128 can perform metering and/or throttling for the subscription based on the operation and/or one or more additional operations. The platform manager 128 can track all operational data associated with the subscription and build operation metrics via the meter 2306. The metrics can indicate resource usage of the subscription. Based on the metrics, the platform manager 128 can generate bills based on the metrics to charge the subscription an amount according to the resource usage. Furthermore, based on the metrics the platform manager 128 can implement resource throttling to control the amount of computing and/or storage resources used by the subscription.

Figure 26:
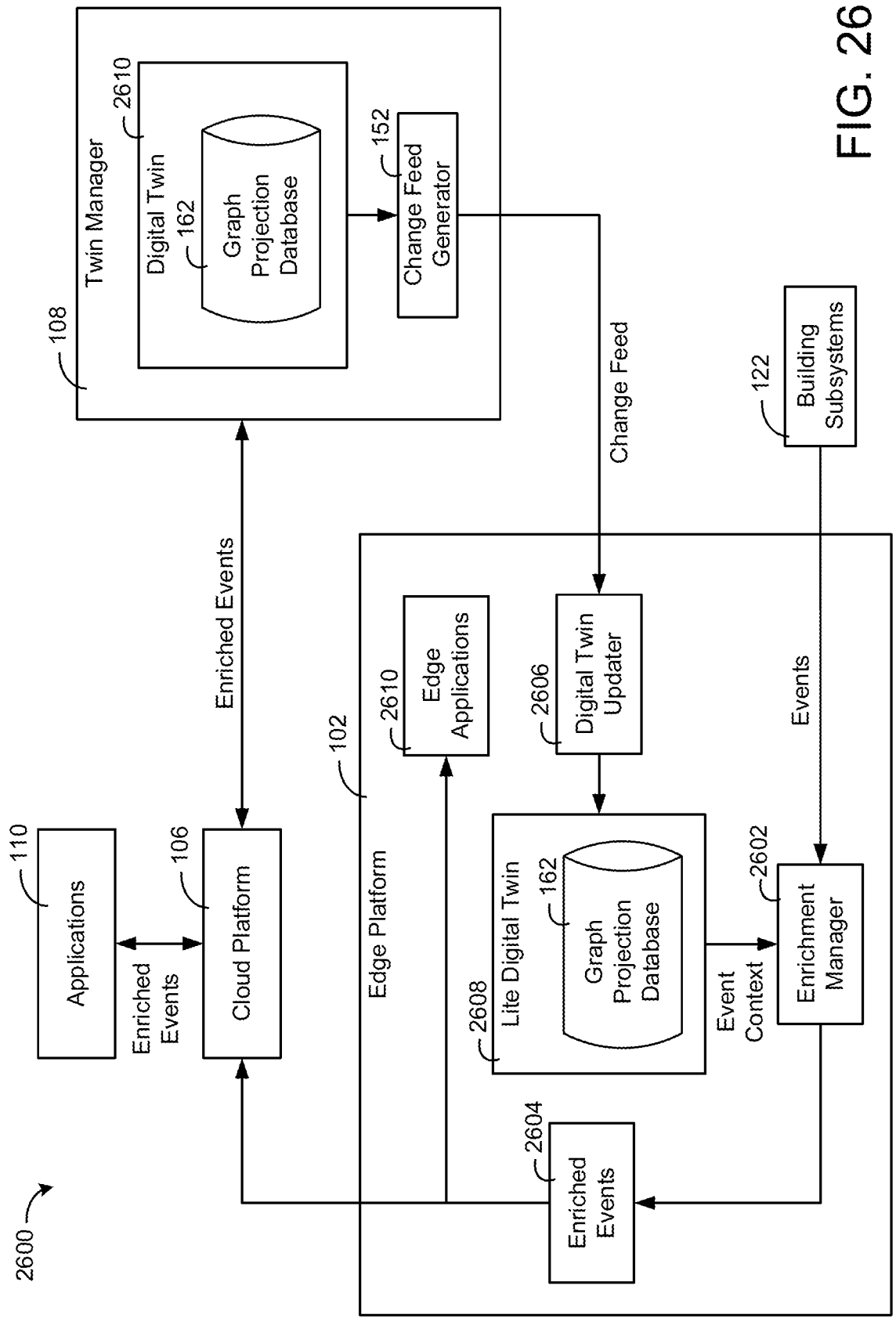
FIG. 26 is a block diagram of the edge platform of FIG. 1 performing event enrichment at the edge before the events are communicated to the cloud, according to an exemplary embodiment.

Referring now to FIG. 26, a system 2600 including the edge platform 100 performing event enrichment at the edge platform 102 before the events are communicated to the cloud platform 106 is shown, according to an exemplary embodiment. The system 2600 includes the building subsystems 122, the edge platform 102, the cloud platform 106, the applications 110, and the twin manager 108. The edge platform 102 can receive events from the building subsystems 122 and enrich the events before passing the events on to the cloud platform 106. Because the edge platform 102 is located on-premises, e.g., on the edge, the events can be enriched before being passed on to other cloud systems and/or used in edge based analytics run on the edge platform 102. In some embodiments, processors, memory devices, and/or networking devices of the edge platform 102 are located on-premises within a building.

The edge platform 102 can receive events from the building subsystems 122. The events can be data packages describing an event that has occurred with a timestamp of when the event occurred. The events can be raw events that are composed of content that is emitted from a producing system. However, the event may not include any intent or knowledge of the system that consumes it. The event can be of a particular event type. An enrichment manager 2602 of the edge platform 102 can receive the events from the building subsystems 122. The enrichment manager 2602 can be the same as, or similar to, the enrichment manager 138.

The enrichment manager 2602 can enrich the events received from the building subsystems 122 based on event context received and/or retrieved from a lite digital twin 2608 of the edge platform 102. For example, the enrichment manager 2602 can add entity and/or entity relationship information associated with the event to the event to generate the enriched events 2604. The event enrichment can be the same as or similar to the enrichment described with referenced to FIGS. 1-3 and FIG. 8. The enriched events 2604 can be an event with additional added properties or attributes that provide context regarding the event.

In some embodiments, the enrichment manager 2602 includes multiple event streams. The event streams can be data enrichment processing streams for particular events and/or particular types of events. Each event stream can be linked to a tenant and/or tenant subscription. Each event stream can indicate one or more rules for enriching an event, e.g., an indication of the information to add to the event. In this regard, one event can be applied to multiple event streams and receive different enrichments to generate multiple enriched events. Each enriched event can be provided to a different application or end system.

The edge platform 102 includes edge applications 2610. The edge applications 2610 can be similar to or the same as the applications 110. While the applications 110 may be run on a cloud system, the edge applications 2610 can be run locally on the edge platform 102. The edge applications 2610 can operate based on the enriched events 2604 and may not need to consult a digital twin to acquire context regarding an event since the enriched events 2604 may already include the needed context. In some embodiments, the edge application 2610 perform analytics (e.g., aggregation, data monitoring, etc.), control algorithms, etc. for the building subsystems 122.

For example the edge applications 2610 can generate control decisions for the building subsystems 122 based on the enriched events 2604, e.g., temperature setpoints for zones, fan speed settings for fans, duct pressure setpoints, ventilation commands, etc. In some embodiments, the edge applications 2610 include models, e.g., machine learning models for predicting characteristics and/or conditions and/or for operating the building subsystems 122. In some embodiments, the machine learning is performed at the edge platform 102 which results in higher scores than machine learning performed in the cloud since a greater amount of data can be collected faster and used for training at the edge.

In some embodiments, the enrichment manager 2602 only operates when the twin manager 108 is not operating and enriching events. For example, the edge platform 102 can receive an indication that there is an error with cloud systems, e.g., network issues, computing issues, etc. In this regard, the edge platform 102 can take over enriching the events with the enrichment manager 2602 and operating on the events with the edge applications 2610. In this regard, the enrichment and application operation can dynamically move between the edge platform 102 and the cloud. Furthermore, load balancing can be implemented so that some events are enriched and operated on by edge applications 2610 while other events are passed to the cloud platform 106 and/or the twin manager 108 for enrichment and provided to the applications 110 for operation.

In some embodiments, by performing enrichment at the edge platform 102, analytics can be performed at the edge platform 102 based on the enriched events. In this regard, lower latencies can be realized since analytics and/or control algorithms can be performed quickly at the edge platform 102 and data does not need to be communicated to the cloud. In some embodiments, the edge applications 2610 and/or machine learning models of the edge applications 2610 can be built in the cloud and communicated to the edge platform 102 and additional learning can be performed at the edge platform 102.

The edge platform 102 includes the lite digital twin 2608. The lite digital twin 2608 can be a version of a digital twin 2610 of the twin manager 108. The digital twins 2610 and/or 2608 can be virtual representations of a building and/or the building subsystem 122 of the building. The digital twin 2610 and/or the digital twin 2608 can be or can include the graph projection database 162, e.g., one or more graph data structures. The digital twin 2610 and/or the lite digital twin 2608 can be the graphs shown in FIGS. 11-13. In some embodiments, the lite digital twin 2608 is a projection that does not include all nodes and edges of a full projection graph. The lite digital twin 2608 may only include the nodes or edges necessary for enriching the events and can be built on projection rules that define the information needed that will be used to enrich the events.

In some embodiments, the lite digital twin 2608 can be synchronized, in whole or in part, with the digital twin 2610. The lite digital twin 2608 can include less information than the digital twin 2610, e.g., less nodes or edges. The lite digital twin 2608 may only include the nodes and/or edges necessary for enriching events of the building subsystems 122. In some embodiments, changes or updates to the digital twin 2610 can be synchronized to the lite digital twin 2608 through a change feed of change feed events. The change feed can indicate additions, removals, and/or reconfigurations of nodes or edges to the graph projection database 162. Each change feed event can indicate one update to the digital twin 2610.

A digital twin updater 2606 can receive the events of the change feed from the change feed generator 152 and update the lite digital twin 2608 based on each change feed event. The updates made to the lite digital twin 2608 can be the same updates as indicated by the events of the change feed. In some embodiments, the digital twin updater 2606 can update the lite digital twin 2608 to only include the nodes and edges necessary for enrichment of the events, and thus include less nodes and edges than the digital twin 2610.

In some embodiments, the digital twin updater 2606 filters out change feed events if the change feed events do not pertain to information needed to enrich the events. In this regard, the digital twin updater 2606 can store a list of information needed for enrichment, e.g., the digital twin updater 2606 can include all event subscriptions or enrichment rules. The digital twin updater 2606 can determine whether a change feed event updates information pertaining to event enrichment and only update the lite digital twin 2608 responsive to determining that the change feed event updates information needed for enrichment. In some embodiments, when a new event subscription and/or new enrichment rule is created, the digital twin updater 2606 can communicate with the digital twin 2610 to retrieve noes or edges needed for the new event subscription and/or enrichment rules.

Figure 27:
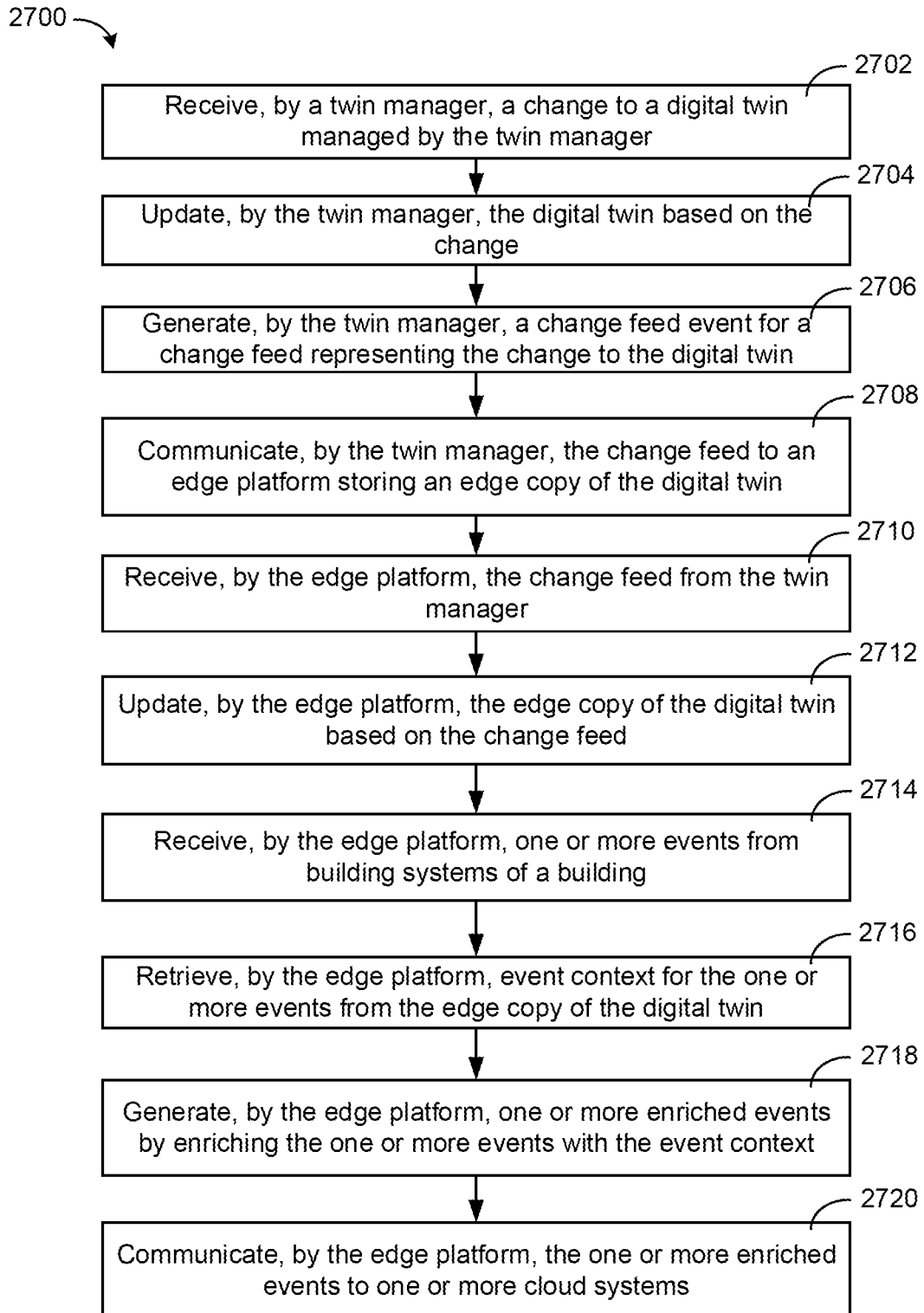
FIG. 27 is a flow diagram of a process of performing event enrichment at the edge by the edge platform of FIG. 1 before the events are communicated to the cloud, according to an exemplary embodiment.

Referring now to FIG. 27, a process 2700 of performing event enrichment at the edge by the edge platform 102 before the events are communicated to the cloud is shown, according to an exemplary embodiment. In some embodiments, the edge platform 102 is configured to perform the process 2700. Furthermore, any computing system or device as described herein can be configured to perform the process 2700.

In step 2702, the twin manager 108 can receive a change to the digital twin 2610 managed by the twin manager 108. The change can be an addition, removal, or reconfiguration of an edge and/or node. In step 2704, the twin manager 108 can update the digital twin 2610 based on the change. Furthermore, in step 2706, the twin manager 108 can generate a change feed event for a change feed representing the change to the digital twin. In some embodiments, the change feed event can summarize the change. In step 2708, the twin manager 108 can communicate the change feed to the edge platform 102 for synchronizing the digital twin 2610 with the lite digital twin 2608 of the edge platform 102.

In step 2710, the edge platform 102 can receive the change feed from the twin manager 108. The edge platform 102 can be subscribed to the change feed and can receive all change feed events posed to the change feed by the twin manager 108. In step 2712, the edge platform 102 can update the lite digital twin 2608 based on the change feed event. In some embodiments, the edge platform 102 can determine, responsive to receiving the change feed event, whether the change feed event affects enrichment performed by the edge platform 102. Responsive to determining that the change feed event affects nodes or edges of the lite digital twin 2608 used in enrichment, the edge platform 102 can update the lite digital twin 2608 based on the change feed event.

In step 2714, the edge platform 102 can receive one or more events from building systems of a building. For example, the building subsystems 122 can generate events, e.g., data collection events, operational command decisions, etc. The events can describe information created for the building subsystems 122 and include a timestamp indicating when the information was created.

In step 2716, the edge platform 102 can retrieve event context from the lite digital twin 2608 for the one or more events. The event context can indicate attributes describing the event. In step 2718, the edge platform 102 can generate the enriched events 2604 by enriching the one or more events with the event context retrieved in the step 2718. Enriching the events can include adding additional attributes (the event context) to the events. In step 2720, the edge platform can communicate the one or more enriched events 2604 to the cloud, e.g., the cloud platform 106.

Figure 28:
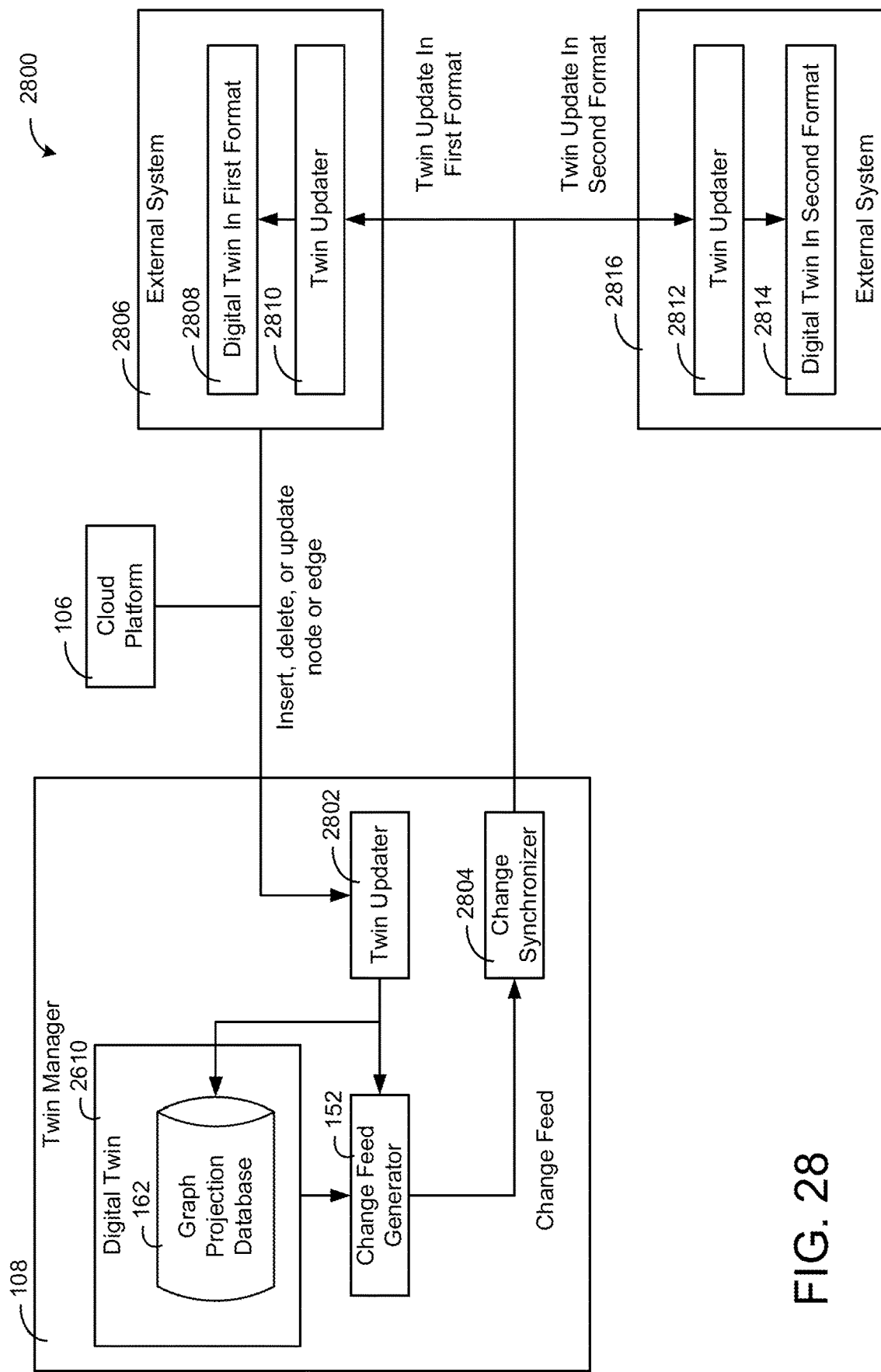
FIG. 28 is a block diagram of the twin manager of FIG. 1 synchronizing a digital twin of the twin manager with digital twins of other external systems, according to an exemplary embodiment.

Referring now to FIG. 28, a system 2800 including the twin manager 108 synchronizing the digital twin 2610 of the twin manager 108 with digital twins of other external systems is shown, according to an exemplary embodiment. The twin manager 108 can act as a master record of a digital twin of a building and/or building subsystems and use a change feed to update digital twins of other systems, e.g., an external system 2806 and 2816. Furthermore, in some embodiments, the twin manager 108 can receive updates to the digital twin of one external system, e.g., the external system 2806 and synchronize the changes to other external systems, e.g., the external system 2816. This synchronization can allow for data sharing between all of the digital twins since each digital twin is up-to-date.

The twin manager 108 includes the digital twin 2619 and the change fee generator 152. Furthermore, the twin manager 108 includes a twin updater 2802 and a change synchronizer 2804. The twin updater 2802 can receive updates to the graph projection database 162, e.g., updates to nodes or edges of the graph, e.g., insertion, deletion, or reconfiguration of nodes or edges. The updates can be received from the cloud platform 106 as part of the event processing shown in FIG. 3 where updates to the graph are learned from events. In some embodiments, the updates can originate from other systems, e.g., the external system 2806 or 2816. For example, the external system 2806 could make an update to a digital twin 2808 in a first format stored by the external system 2806 and communicate the change to the twin updater 2802. In some embodiments, the external system 2806 can use a change feed to communicate the update to the twin manager 108.

The change synchronizer 2804 can synchronize the digital twin 2610 with the digital twin 2808 of the external system 2806 and a digital twin 2814 of the external system 2816. The change synchronizer 2804 can make updates to the digital twin 2808 and the digital twin 2814. In some embodiments, the change synchronizer 2804 makes different types of updates based on the format of the digital twins 2808 and 2814. For example, the change synchronizer 2804 can make a twin update in a first format for the digital twin 2808 and a twin update in a second format for the digital twin 2814 to make the same update across the twins 2808 and 2814.

In some embodiments, the change synchronizer 2804 uses a change feed of change feed events to update the digital twin 2808 and the digital twin 2814. In some embodiments, the change synchronizer 2804 receives a change feed of change feed events from the change feed generator 152. Responsive to receiving a new change feed event, the change synchronizer 2804 can make the change indicated by the change feed event in the digital twin 2808 and the digital twin 2814. In some embodiments, the change synchronizer 2804 communicates the change feed to the external system 2806 and/or the external system 2814 causing the external system 2806 and the external system 2816 to update the digital twins 2808 and 2814.

The external system 2806 can receive updates from the change synchronizer 2804 and update the digital twin 2808 according to the updates. Similarly, a twin updater 2812 of the external system 1816 can receive updates from the change synchronizer 2804 and update the digital twin 2814. In some embodiments, the updates received from the change synchronizer 2804 are in a format associated with the digital twin stored by the external systems 2806 and/or 2816. In some embodiments, the update is a change feed event and/or a change feed of change feed events.

In some embodiments, the building data platform 100 can generate lite graph projection of the digital twin 2610 and the digital twin in the first format 2808 and the digital twin in the second format 2814. The projections can be built based on projection rules and therefore may not include all of the nodes and edges as a full graph projection. The same projection rules can be used for the twin manager 108 and the external system 2806 and/or the external system 2816. The building data platform 100 can compare the projections against each other to confirm that the twins of the twin manager 108 and the external system 2806 and/or 2816 are the same. By comparing the projections instead of the full twins, an easier feasible comparison can be performed.

Figure 29:
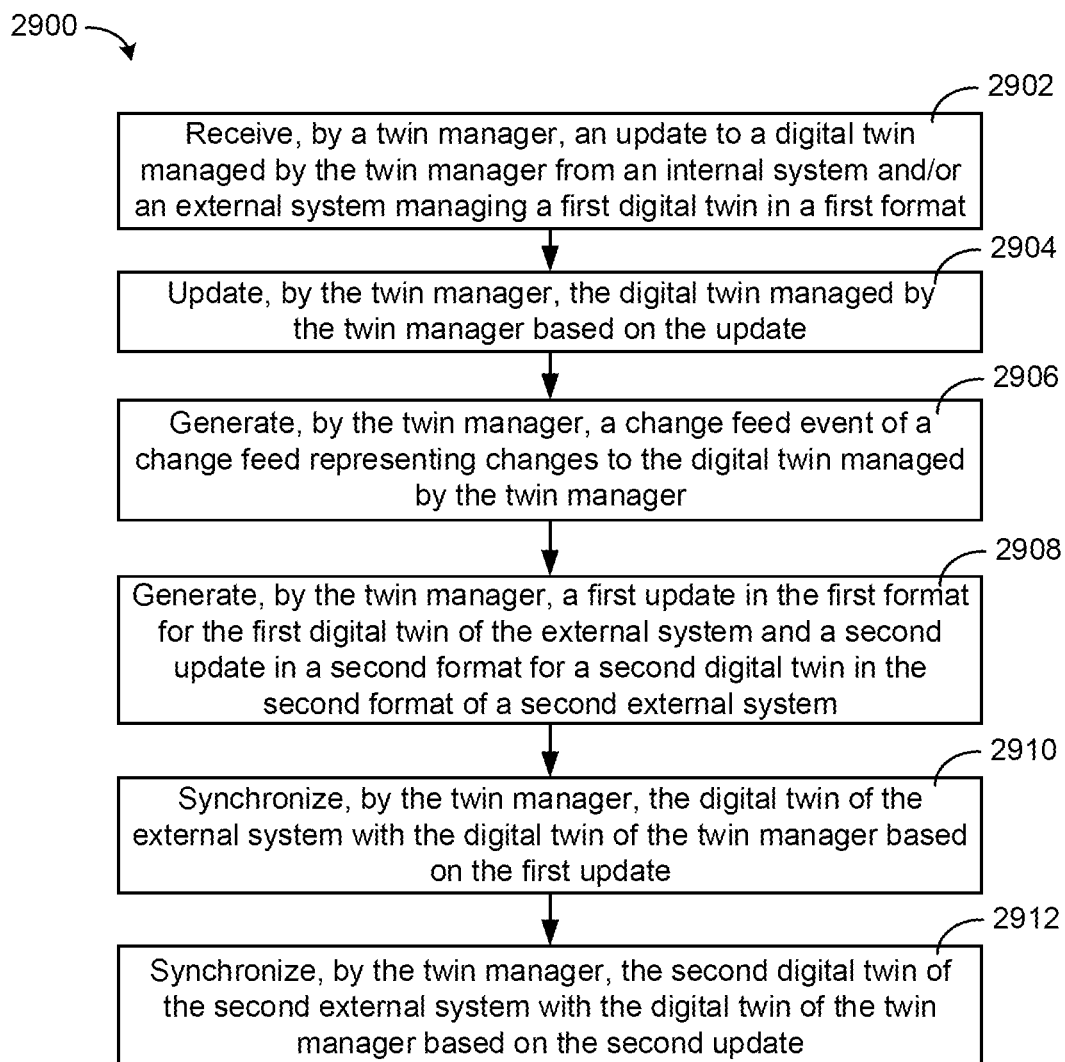
FIG. 29 is a flow diagram of a process of synchronizing a digital twin of the twin manager with digital twins of other external system, according to an exemplary embodiment.

Referring now to FIG. 29, a process 2900 of synchronizing the digital twin 2610 of the twin manager 108 with digital twins 2808 and 2814 of other external systems 2806 and 2816 is shown, according to an exemplary embodiment. In some embodiments, the twin manager 108 is configured to perform the process 2900. Any computing device or system described herein can be configured to perform the process 2900, in some embodiments.

In step 2902, the twin manager 108 receives an update to the digital twin 2610. The update can be received from an internal system, e.g., a component of the building data platform 100. For example, events processed by the cloud platform 106 can be analyzed to derive updates to the digital twin 2610 as described in FIG. 3. Similarly, in some embodiments, a user via the user device 176 can provide the update to the digital twin 2610 to the twin manager 108. In some embodiments, an external system can provide the update, e.g., the external system 2806 and/or the external system 2816. In this regard, the external system 2806 can make an update to the digital twin 2808 and communicate the update made to the digital twin 2808 to the twin manager 108.

In step 2904, the twin manager 108 updates the digital twin 2610 based on the update received in the step 2902. In step 2906, the twin manager 108 generates a change feed event of a change feed based on the update. The change feed event represents the changes made to the digital twin 2610. In some embodiments, the change feed is a topic where multiple change feed events are posted for consuming systems to receive.

In step 2908, the twin manager 108 generates a first update in a first format for the digital twin 2808 based on the change feed event. Furthermore, the twin manager 108 generates a second update in a second format for the digital twin 2814 based on the change feed event. In step 2910, the twin manager 108 can synchronize the digital twin 2808 of the external system 2806 with the update in the first format by communicating with the external system 2806. In step 2912, the twin manager 108 can synchronize the digital twin 2814 of the external system 2816 with the update in the second format by communicating with the external system 2816.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed:

1. A building system of a building comprising one or more memory devices having instructions stored thereon, that, when executed by one or more processors, cause the one or more processors to:
post an event to a topic based on data received from a piece of building equipment, the event indicating a command that the piece of building equipment is capable of performing;
responsive to the event being posted to the topic, insert at least a first node storing the command that the piece of building equipment is capable of performing into a building graph data structure including a plurality of nodes and a plurality of edges between the plurality of nodes, the plurality of nodes representing entities of the building and the plurality of edges representing relationships between the entities of the building, wherein the building graph data structure includes:
a second node of the plurality of nodes representing the piece of building equipment, and
an edge of the plurality of edges between the first node and the second node indicating that the piece of building equipment has a capability to perform the command;
execute a software application to query the building graph data structure to dynamically detect the inserted first node indicating that the piece of building equipment has the capability to perform the command by identifying the second node representing the piece of building equipment, the first node storing the command, and the edge between the first node and the second node indicating that the piece of building equipment has the capability to perform the command; and
transmit the command to the piece of building equipment to execute the command responsive to identifying the first node, the second node, and the edge between the first node and the second node.

2. The building system of claim 1, wherein the instructions cause the one or more processors to:
generate a graphical user interface element comprising the command retrieved from the first node responsive to identifying that the piece of building equipment has the capability to perform the command; and
transmit, responsive to an interaction with the graphical user interface element, the command to the piece of building equipment.

3. The building system of claim 1, wherein the building graph data structure includes:
a third node representing a capability set and a plurality of fourth nodes representing capabilities of the capability set, the capability set including the capability, wherein the first second node of the plurality of nodes representing the piece of building equipment is linked via a first edge of the plurality of edges to the third node of the plurality of nodes representing the capability set, wherein the third node representing the capability set is related via a plurality of second edges of the plurality of edges to the plurality of fourth nodes representing the capabilities, the plurality of fourth nodes including the first node representing the capability, the plurality of second edges including the edge;
wherein the instructions cause the one or more processors to:
identify, based on the building graph data structure, that the piece of building equipment has the capability by identifying the first edge relating the second node to the third node and identifying the edge of the plurality of second edges relating the third node to the first node representing the capability.

4. The building system of claim 1, wherein the capability is the command to execute a control operation that the piece of building equipment is configured to perform.

5. The building system of claim 1, wherein the instructions cause the one or more processors to:
identify whether a requesting system has a permission to make the command indicated by the capability by:
identifying a third node of the plurality of nodes representing the requesting system; and
identifying one or more particular edges of the plurality of edges between the third node and a fourth node of the plurality of nodes representing the permission to make the command.

6. The building system of claim 1, wherein the instructions cause the one or more processors to:
identify a device hub configured to facilitate messaging between the building system and the piece of building equipment based on the building graph data structure, wherein the plurality of nodes include a node representing the device hub; and
send the command indicated by the capability to the piece of building equipment through the device hub.

7. The building system of claim 1, wherein the instructions cause the one or more processors to:
identify a connection broker configured to facilitate a connection between the building system and the piece of building equipment, wherein the plurality of nodes include a node representing the connection broker; and
send the command indicated by the capability to the piece of building equipment through the connection broker.

8. The building system of claim 1, wherein the entities include a user of the building;
wherein the command is associated with the user and the piece of building equipment is configured to perform the command responsive to a reception of an input from a system associated with the user of the building.

9. The building system of claim 1, wherein the instructions cause the one or more processors to:
receive an input from a system associated with a user;
identify a node of the plurality of nodes representing the user;
identify a node of the plurality of nodes representing a permission of the user to perform the command;
identify an edge of the plurality of edges between the node representing the user and the node representing the permission; and
cause the piece of building equipment to perform the command responsive to an identification of the edge between the node representing the user and the node representing the permission.

10. A method, comprising:
posting, by one or more processing circuits, an event to a topic based on data received from a piece of building equipment, the event indicating a command that the piece of building equipment is capable of performing;
responsive to the event being posted to the topic, inserting, by the one or more processing circuits, at least a first node storing the command that the piece of building equipment is capable of performing into a building graph data structure including a plurality of nodes and a plurality of edges between the plurality of nodes, the plurality of nodes representing entities of a building and the plurality of edges representing relationships between the entities of the building, wherein the building graph data structure includes:
a second node of the plurality of nodes representing the piece of building equipment, and
an edge of the plurality of edges between the first node and the second node indicating that the piece of building equipment has a capability to perform the command;
executing, by the one or more processing circuits, a software application to query the building graph data structure to dynamically detect the inserted first node indicating that the piece of building equipment has the capability to perform the command by identifying the second node representing the piece of building equipment, the first node storing the command, and the edge between the first node and the second node indicating that the piece of building equipment has the capability to perform the command; and
transmitting, by the one or more processing circuits, the command to the piece of building equipment to execute the command responsive to identifying the first node, the second node, and the edge between the first node and the second node.

11. The method of claim 10, comprising:
generating, by the one or more processing circuits, a graphical user interface element comprising the command retrieved from the first node responsive to identifying that the piece of building equipment has the capability to perform the command; and
transmitting, by the one or more processing circuits, responsive to an interaction with the graphical user interface element, the command to the piece of building equipment.

12. The method of claim 10, wherein the building graph data structure includes:
a third node representing a capability set and a plurality of fourth nodes representing capabilities of the capability set, the capability set including the capability, wherein the second node of the plurality of nodes representing the piece of building equipment is linked via a first edge of the plurality of edges to the third node of the plurality of nodes representing the capability set, wherein the third node representing the capability set is related via a plurality of second edges of the plurality of edges to the plurality of fourth nodes representing the capabilities, the plurality of fourth nodes including the first node representing the capability, the plurality of second edges including the edge;
where the method includes:
identifying, by the one or more processing circuits, based on the building graph data structure, that the piece of building equipment has the capability by identifying the first edge relating the first node to the third node and identifying the edge of the plurality of second edges relating the third node to the first node representing the capability.

13. The method of claim 10, wherein the capability is the command to execute a control operation that the piece of building equipment is configured to perform.

14. The method of claim 10, comprising:
identifying, by the one or more processing circuits, whether a requesting system has a permission to make the command indicated by the capability by:
identifying a third node of the plurality of nodes representing the requesting system; and
identifying one or more particular edges of the plurality of edges between the third node and a fourth node of the plurality of nodes representing the permission to make the command.

15. The method of claim 10, comprising:
identifying, by the one or more processing circuits, a device hub configured to facilitate messaging between the one or more processing circuits and the piece of building equipment based on the building graph data structure, wherein the plurality of nodes include a node representing the device hub; and
sending, by the one or more processing circuits, the command indicated by the capability to the piece of building equipment through the device hub.

16. The method of claim 10, comprising:
identifying, by the one or more processing circuits, a connection broker configured to facilitate a connection between the one or more processing circuits and the piece of building equipment, wherein the plurality of nodes include a node representing the connection broker; and sending, by the one or more processing circuits, the command indicated by the capability to the piece of building equipment through the connection broker.

17. The method of claim 10, wherein the entities include a user of the building;
wherein the command is associated with the user and the piece of building equipment is configured to perform the command responsive to a reception of an input from a system associated with the user of the building.

18. The method of claim 10, comprising:
receive an input from a system associated with a user;
identify a node of the plurality of nodes representing the user;
identify a node of the plurality of nodes representing a permission of the user to perform the command;
identify an edge of the plurality of edges between the node representing the user and the node representing the permission; and
cause the piece of building equipment to perform the command responsive to an identification of the edge between the node representing the user and the node representing the permission.

19. One or more non-volatile storage media storing instructions thereon, that, when executed by one or more processors, cause the one or more processors to:
post an event to a topic based on data received from a piece of building equipment, the event indicating a command that the piece of building equipment is capable of performing;
responsive to the event being posted to the topic, insert at least a first node storing the command that the piece of building equipment is capable of performing into a graph data structure including a plurality of nodes and a plurality of edges between the plurality of nodes, the plurality of nodes representing entities of an environment and the plurality of edges representing relationships between the entities of the environment, wherein the building graph data structure includes:
a first node of the plurality of nodes representing the piece of equipment, and
an edge of the plurality of edges between the first node and the second node indicating that the piece of equipment has a capability to perform the command;
execute a software application to query the graph data structure to dynamically detect the inserted first node indicating that the piece of equipment has the capability to perform the command by identifying the second node representing the piece of equipment, the first node storing the command, and the edge between the first node and the second node indicating that the piece of equipment has the capability to perform the command; and
transmit the command to the piece of equipment to execute the command responsive to identifying the first node, the second node, and the edge between the first node and the second node.

20. The one or more non-volatile storage media of claim 19, wherein the instructions cause the one or more processors to:
generate a graphical user interface element comprising the command retrieved from the second node responsive to identifying that the piece of equipment has the capability to perform the command; and
transmit, responsive to an interaction with the graphical user interface element, the command to the piece of equipment.

* * * * *